US011913236B2

(12) United States Patent
Pervan

(10) Patent No.: US 11,913,236 B2
(45) Date of Patent: Feb. 27, 2024

(54) MECHANICAL LOCKING SYSTEM FOR FLOOR PANELS

(71) Applicant: Ceraloc Innovation AB, Viken (SE)

(72) Inventor: Darko Pervan, Viken (SE)

(73) Assignee: Ceraloc Innovation AB, Viken (SE)

( * ) Notice: Subject to any disclaimer, the term of this patent is extended or adjusted under 35 U.S.C. 154(b) by 165 days.

(21) Appl. No.: 17/508,357

(22) Filed: Oct. 22, 2021

(65) Prior Publication Data

US 2022/0042320 A1 Feb. 10, 2022

Related U.S. Application Data

(60) Continuation of application No. 16/745,613, filed on Jan. 17, 2020, now Pat. No. 11,174,646, which is a (Continued)

(30) Foreign Application Priority Data

Dec. 22, 2014 (SE) .................................. 1451632-2

(51) Int. Cl.
*E04F 15/02* (2006.01)
*E04F 15/10* (2006.01)
(Continued)

(52) U.S. Cl.
CPC ........ *E04F 15/02038* (2013.01); *B26D 3/065* (2013.01); *E04C 2/40* (2013.01);
(Continued)

(58) Field of Classification Search
CPC . E04F 15/02038; E04F 15/102; E04F 15/107; E04F 2201/0146;
(Continued)

(56) References Cited

U.S. PATENT DOCUMENTS 753,791 A 3/1904 Fulghum
1,581,345 A 4/1926 Healy
(Continued)

FOREIGN PATENT DOCUMENTS

CA 2456513 A1 2/2003
CN 201 261 936 Y 6/2009
(Continued)

OTHER PUBLICATIONS

U.S. Appl. No. 16/883,071, Darko Pervan and Agne Pålsson, filed May 26, 2020, (Cited herein as US Patent Application Publication No. 2020/0284034 A1 of Sep. 10, 2020).
(Continued)

*Primary Examiner* — Beth A Stephan
(74) *Attorney, Agent, or Firm* — Boone IP Law

(57) ABSTRACT

Floor panels are shown, which are provided with a mechanical locking system that may be locked with a vertical displacement of a first panel against a second panel. The locking system includes a flexible strip that during locking bends upwardly or downwardly. The locking system includes a first and a second joint edge section with different locking functions. One section provides a horizontal locking and another section provides a vertical locking.

15 Claims, 27 Drawing Sheets

Related U.S. Application Data continuation of application No. 16/204,185, filed on Nov. 29, 2018, now Pat. No. 10,570,625, which is a continuation of application No. 15/726,754, filed on Oct. 6, 2017, now Pat. No. 10,161,139, which is a division of application No. 14/973,179, filed on Dec. 17, 2015, now Pat. No. 9,803,374.

(51) Int. Cl.
*B26D 3/06* (2006.01)
*E04C 2/40* (2006.01)

(52) U.S. Cl.
CPC .......... *E04F 15/102* (2013.01); *E04F 15/107* (2013.01); *E04F 2201/0146* (2013.01); *E04F 2201/0161* (2013.01); *E04F 2201/0176* (2013.01); *E04F 2201/042* (2013.01); *E04F 2201/043* (2013.01)

(58) Field of Classification Search
CPC ...... E04F 2201/0161; E04F 2201/0176; E04F 2201/042; E04F 2201/043; B26D 3/065; E04C 2/40
See application file for complete search history.

(56) References Cited

U.S. PATENT DOCUMENTS 3,077,703 A 2/1963 Bergstrom
3,619,961 A 11/1971 Sterrett et al.
3,720,027 A 3/1973 Christensen
3,889,736 A 6/1975 Firks
3,998,015 A 12/1976 Scott et al.
4,123,885 A 11/1978 Scott
4,426,820 A 1/1984 Terbrack
4,698,945 A 10/1987 Munn
4,953,341 A 9/1990 Joos
5,182,892 A 2/1993 Chase
5,274,979 A 1/1994 Tsai
5,456,053 A 10/1995 Fischer
5,616,389 A 4/1997 Blatz
5,735,097 A 4/1998 Cheyne
5,845,548 A 12/1998 Nelson
6,006,486 A 12/1999 Moriau et al.
6,209,278 B1 4/2001 Tychsen
6,385,936 B1 5/2002 Schneider
6,490,836 B1 12/2002 Moriau et al.
6,505,452 B1 1/2003 Hannig
6,715,253 B2 4/2004 Pervan
6,769,219 B2 8/2004 Schwitte et al.
6,772,568 B2 8/2004 Thiers et al.
6,808,777 B2 10/2004 Andersson
6,880,307 B2 4/2005 Schwitte et al.
6,918,220 B2 7/2005 Pervan
6,968,664 B2 11/2005 Thiers
7,051,486 B2 5/2006 Pervan
7,081,300 B2 7/2006 Laurence
7,121,058 B2 10/2006 Pålsson
7,127,860 B2 10/2006 Pervan et al.
7,454,875 B2 11/2008 Pervan et al.
7,484,338 B2 2/2009 Pervan et al.
7,550,192 B2 6/2009 Dempsey
7,568,322 B2 8/2009 Pervan
7,584,583 B2 9/2009 Bergelin et al.
7,617,651 B2 11/2009 Grafenauer
7,634,884 B2 12/2009 Pervan
7,637,068 B2 12/2009 Pervan
7,641,963 B2 1/2010 Grafenauer
7,677,005 B2 3/2010 Pervan
7,721,503 B2 5/2010 Pervan et al.
7,757,452 B2 7/2010 Pervan
7,793,471 B2 9/2010 Hill
7,802,411 B2 9/2010 Pervan
7,832,161 B2 11/2010 Ligabue
7,841,144 B2 11/2010 Pervan et al.
7,841,145 B2 11/2010 Pervan et al.
7,841,150 B2 11/2010 Pervan
7,861,482 B2 1/2011 Pervan et al.
7,866,110 B2 1/2011 Pervan
7,874,118 B2 1/2011 Schitter
7,886,497 B2 2/2011 Pervan
7,886,785 B2 2/2011 Young
7,896,571 B1 3/2011 Hannig et al.
7,900,416 B1 3/2011 Yokubison et al.
7,908,815 B2 3/2011 Pervan et al.
7,908,816 B2 3/2011 Grafenauer
7,930,862 B2 4/2011 Bergelin et al.
7,980,041 B2 7/2011 Pervan
8,011,163 B2 9/2011 Bazzano
8,033,074 B2 10/2011 Pervan
8,042,311 B2 10/2011 Pervan
8,061,104 B2 11/2011 Pervan
8,079,196 B2 12/2011 Pervan
8,099,924 B2 1/2012 Braun
8,112,967 B2 2/2012 Pervan et al.
8,122,670 B2 2/2012 Matthee
8,171,692 B2 5/2012 Pervan
8,181,416 B2 5/2012 Pervan et al.
8,220,217 B2 7/2012 Muehlebach
8,234,830 B2 8/2012 Pervan et al.
8,266,849 B2 9/2012 Bravo et al.
8,281,529 B2 10/2012 Cluff
8,302,361 B2 11/2012 Braun et al.
8,341,914 B2 1/2013 Pervan et al.
8,341,915 B2 1/2013 Pervan et al.
8,353,140 B2 1/2013 Pervan et al.
8,359,805 B2 1/2013 Pervan et al.
8,365,499 B2 2/2013 Nilsson et al.
8,381,477 B2 2/2013 Pervan et al.
8,387,327 B2 3/2013 Pervan
8,438,814 B2 5/2013 Thiers et al.
8,448,402 B2 5/2013 Pervan et al.
8,499,521 B2 8/2013 Pervan et al.
8,505,257 B2 8/2013 Boo et al.
8,511,040 B2 8/2013 Braun et al.
8,528,289 B2 9/2013 Pervan et al.
8,544,230 B2 10/2013 Pervan
8,544,231 B2 10/2013 Hannig
8,544,234 B2 10/2013 Pervan et al.
8,572,922 B2 11/2013 Pervan
8,596,013 B2 12/2013 Boo
8,601,909 B2 12/2013 Gelormino
8,627,862 B2 1/2014 Pervan et al.
8,640,424 B2 2/2014 Pervan et al.
8,650,826 B2 2/2014 Pervan et al.
8,677,714 B2 3/2014 Pervan
8,689,512 B2 4/2014 Pervan
8,707,650 B2 4/2014 Pervan
8,713,886 B2 5/2014 Boo et al.
8,733,065 B2 5/2014 Pervan
8,733,410 B2 5/2014 Pervan
8,756,899 B2 6/2014 Nilsson et al.
8,763,341 B2 7/2014 Pervan
8,769,905 B2 7/2014 Pervan
8,776,473 B2 7/2014 Pervan et al.
8,793,958 B2 * 8/2014 Theirs .................. E04F 15/107 52/390
8,806,832 B2 8/2014 Kell
8,844,236 B2 9/2014 Pervan et al.
8,857,126 B2 10/2014 Pervan et al.
8,863,473 B2 10/2014 Weber
8,869,485 B2 10/2014 Pervan
8,898,988 B2 12/2014 Pervan
8,925,264 B2 1/2015 Thrush et al.
8,925,274 B2 1/2015 Pervan et al.
8,959,866 B2 2/2015 Pervan
8,973,331 B2 3/2015 Boo
9,003,741 B2 4/2015 D'Agostino
9,027,306 B2 5/2015 Pervan
9,051,738 B2 6/2015 Pervan et al.
9,068,360 B2 6/2015 Pervan
9,091,077 B2 7/2015 Boo
9,103,126 B2 8/2015 Kell

(56) References Cited

U.S. PATENT DOCUMENTS

| | | | |
|---|---|---|---|
| 9,194,134 | B2 | 11/2015 | Nygren et al. |
| 9,212,492 | B2 | 12/2015 | Pervan et al. |
| 9,216,541 | B2 | 12/2015 | Boo et al. |
| 9,238,917 | B2 | 1/2016 | Pervan et al. |
| 9,249,581 | B2 | 2/2016 | Nilsson et al. |
| 9,260,870 | B2 | 2/2016 | Vermeulen |
| 9,284,737 | B2 | 3/2016 | Pervan et al. |
| 9,309,679 | B2 | 4/2016 | Pervan et al. |
| 9,316,002 | B2 | 4/2016 | Boo |
| 9,322,162 | B2 | 4/2016 | Olofsson et al. |
| 9,340,974 | B2 | 5/2016 | Pervan et al. |
| 9,347,469 | B2 | 5/2016 | Pervan |
| 9,359,774 | B2 | 6/2016 | Pervan |
| 9,366,036 | B2 | 6/2016 | Pervan |
| 9,376,821 | B2 | 6/2016 | Pervan |
| 9,382,716 | B2 | 7/2016 | Pervan et al. |
| 9,388,584 | B2 | 7/2016 | Pervan et al. |
| 9,428,919 | B2 | 8/2016 | Pervan et al. |
| 9,453,347 | B2 | 9/2016 | Pervan |
| 9,458,634 | B2 | 10/2016 | Derelov |
| 9,482,012 | B2 | 11/2016 | Nygren et al. |
| 9,540,826 | B2 | 1/2017 | Pervan et al. |
| 9,663,940 | B2 | 5/2017 | Boo |
| 9,725,912 | B2 | 8/2017 | Pervan |
| 9,771,723 | B2 | 9/2017 | Pervan |
| 9,777,487 | B2 | 10/2017 | Pervan et al. |
| 9,803,374 | B2 | 10/2017 | Pervan |
| 9,803,375 | B2 | 10/2017 | Pervan |
| 9,816,270 | B2 | 11/2017 | Pervan et al. |
| 9,856,656 | B2 | 1/2018 | Pervan |
| 9,856,657 | B2 | 1/2018 | Thiers |
| 9,874,027 | B2 | 1/2018 | Pervan |
| 9,945,130 | B2 | 4/2018 | Nygren et al. |
| 9,951,526 | B2 | 4/2018 | Boo et al. |
| 10,000,935 | B2 | 6/2018 | Kell |
| 10,006,210 | B2 | 6/2018 | Pervan et al. |
| 10,017,948 | B2 | 7/2018 | Boo |
| 10,047,527 | B2 | 8/2018 | Nilsson et al. |
| 10,113,319 | B2 | 10/2018 | Pervan |
| 10,125,488 | B2 | 11/2018 | Boo |
| 10,138,636 | B2 | 11/2018 | Pervan |
| 10,161,139 | B2 | 12/2018 | Pervan |
| 10,180,005 | B2 | 1/2019 | Pervan et al. |
| 10,214,915 | B2 | 2/2019 | Pervan et al. |
| 10,214,917 | B2 | 2/2019 | Pervan et al. |
| 10,240,348 | B2 | 3/2019 | Pervan et al. |
| 10,240,349 | B2 | 3/2019 | Pervan et al. |
| 10,246,883 | B2 | 4/2019 | Derelöv |
| 10,352,049 | B2 | 7/2019 | Boo |
| 10,358,830 | B2 | 7/2019 | Pervan |
| 10,378,217 | B2 | 8/2019 | Pervan |
| 10,458,125 | B2 | 10/2019 | Pervan |
| 10,480,196 | B2 | 11/2019 | Boo |
| 10,519,676 | B2 | 12/2019 | Pervan |
| 10,526,792 | B2 | 1/2020 | Pervan et al. |
| 10,526,793 | B2 | 1/2020 | Nilsson et al. |
| 10,538,922 | B2 | 1/2020 | Pervan |
| 10,570,625 | B2 | 2/2020 | Pervan |
| 10,640,989 | B2 | 5/2020 | Pervan |
| 10,655,339 | B2 | 5/2020 | Pervan |
| 10,669,723 | B2 | 6/2020 | Pervan et al. |
| 10,697,175 | B2 | 6/2020 | Pervan et al. |
| 10,724,251 | B2 | 7/2020 | Kell |
| 10,731,358 | B2 | 8/2020 | Pervan |
| 10,794,065 | B2 | 10/2020 | Boo et al. |
| 10,801,213 | B2 | 10/2020 | Nilsson |
| 10,828,798 | B2 | 11/2020 | Fransson |
| 10,933,592 | B2 | 3/2021 | Blomgren et al. |
| 10,934,721 | B2 | 3/2021 | Pervan et al. |
| 10,953,566 | B2 | 3/2021 | Fransson et al. |
| 10,968,639 | B2 | 4/2021 | Pervan et al. |
| 10,975,577 | B2 | 4/2021 | Pervan et al. |
| 10,995,501 | B2 | 5/2021 | Pervan |
| 11,045,933 | B2 | 6/2021 | Fransson et al. |
| 11,053,691 | B2 | 7/2021 | Pervan |
| 11,053,692 | B2 | 7/2021 | Pervan |
| 11,060,302 | B2 | 7/2021 | Ylikangas et al. |
| 11,066,835 | B2 | 7/2021 | Boo |
| 11,078,673 | B2 | 8/2021 | Pervan et al. |
| 11,174,646 | B2 | 11/2021 | Pervan |
| 2002/0112433 | A1 | 8/2002 | Pervan |
| 2003/0024199 | A1 | 2/2003 | Pervan |
| 2003/0084636 | A1 | 5/2003 | Pervan |
| 2003/0101681 | A1 | 6/2003 | Tychsen |
| 2004/0016196 | A1 | 1/2004 | Pervan |
| 2004/0068954 | A1 | 4/2004 | Martensson |
| 2004/0128934 | A1 | 7/2004 | Hecht |
| 2004/0139678 | A1 | 7/2004 | Pervan |
| 2004/0182036 | A1 | 9/2004 | Sjoberg et al. |
| 2004/0211143 | A1 | 10/2004 | Hannig |
| 2004/0250492 | A1 | 12/2004 | Becker |
| 2005/0160694 | A1 | 7/2005 | Pervan |
| 2005/0166514 | A1 | 8/2005 | Pervan |
| 2005/0210810 | A1 | 9/2005 | Pervan |
| 2006/0070333 | A1 | 4/2006 | Pervan |
| 2006/0101769 | A1 | 5/2006 | Pervan |
| 2006/0101773 | A1 | 5/2006 | Turner et al. |
| 2006/0156670 | A1 | 7/2006 | Knauseder |
| 2006/0236642 | A1 | 10/2006 | Pervan |
| 2006/0260254 | A1 | 11/2006 | Pervan et al. |
| 2007/0006543 | A1 | 1/2007 | Engström |
| 2007/0028547 | A1 | 2/2007 | Grafenauer |
| 2007/0062148 | A1 | 3/2007 | Nienhuis et al. |
| 2007/0193178 | A1 | 8/2007 | Groeke et al. |
| 2008/0000186 | A1 | 1/2008 | Pervan et al. |
| 2008/0000187 | A1 | 1/2008 | Pervan et al. |
| 2008/0010931 | A1 | 1/2008 | Pervan et al. |
| 2008/0010937 | A1 | 1/2008 | Pervan et al. |
| 2008/0028707 | A1 | 2/2008 | Pervan |
| 2008/0034708 | A1 | 2/2008 | Pervan |
| 2008/0041008 | A1 | 2/2008 | Pervan |
| 2008/0066415 | A1 | 3/2008 | Pervan |
| 2008/0104921 | A1 | 5/2008 | Pervan et al. |
| 2008/0110125 | A1 | 5/2008 | Pervan |
| 2008/0134607 | A1 | 6/2008 | Pervan |
| 2008/0134613 | A1 | 6/2008 | Pervan |
| 2008/0134614 | A1 | 6/2008 | Pervan |
| 2008/0155930 | A1 | 7/2008 | Pervan et al. |
| 2008/0216434 | A1 | 9/2008 | Pervan |
| 2008/0216920 | A1 | 9/2008 | Pervan |
| 2008/0236088 | A1 | 10/2008 | Hannig |
| 2008/0241440 | A1 | 10/2008 | Bauer et al. |
| 2008/0295432 | A1 | 12/2008 | Pervan et al. |
| 2009/0019808 | A1 | 1/2009 | Palsson et al. |
| 2009/0049787 | A1 | 2/2009 | Hannig |
| 2009/0133353 | A1 | 5/2009 | Pervan et al. |
| 2009/0193741 | A1 | 8/2009 | Cappelle |
| 2009/0193748 | A1 | 8/2009 | Boo et al. |
| 2009/0193753 | A1 | 8/2009 | Schitter |
| 2009/0249733 | A1 | 10/2009 | Moebus |
| 2010/0031594 | A1 | 2/2010 | Liu et al. |
| 2010/0037550 | A1 | 2/2010 | Braun |
| 2010/0058590 | A1 | 3/2010 | Braun |
| 2010/0083603 | A1 | 4/2010 | Goodwin |
| 2010/0218450 | A1 | 9/2010 | Braun et al. |
| 2010/0257809 | A1 | 10/2010 | Thiers et al. |
| 2010/0293879 | A1 | 11/2010 | Pervan et al. |
| 2010/0300029 | A1 | 12/2010 | Braun et al. |
| 2010/0300031 | A1 | 12/2010 | Pervan et al. |
| 2010/0319290 | A1 | 12/2010 | Pervan |
| 2010/0319291 | A1 | 12/2010 | Pervan et al. |
| 2011/0011020 | A1 | 1/2011 | Shen |
| 2011/0016822 | A1 | 1/2011 | Braun |
| 2011/0023303 | A1 | 2/2011 | Pervan |
| 2011/0030300 | A1 | 2/2011 | Liu |
| 2011/0030303 | A1 | 2/2011 | Pervan et al. |
| 2011/0041996 | A1 | 2/2011 | Pervan |
| 2011/0056167 | A1 | 3/2011 | Nilsson et al. |
| 2011/0088344 | A1 | 4/2011 | Pervan et al. |
| 2011/0088345 | A1 | 4/2011 | Pervan |
| 2011/0094178 | A1 | 4/2011 | Braun |
| 2011/0131909 | A1 | 6/2011 | Hannig |
| 2011/0154763 | A1 | 6/2011 | Bergelin et al. |
| 2011/0167750 | A1 | 7/2011 | Pervan |

(56) References Cited

U.S. PATENT DOCUMENTS

2011/0167751 A1 7/2011 Engstrom
2011/0209430 A1* 9/2011 Pervan .................... E04F 15/02 52/588.1
2011/0225922 A1 9/2011 Pervan et al.
2011/0252733 A1 10/2011 Pervan
2011/0258959 A1 10/2011 Braun
2011/0283650 A1 11/2011 Pervan et al.
2012/0017533 A1 1/2012 Pervan et al.
2012/0031029 A1 2/2012 Pervan et al.
2012/0036804 A1 2/2012 Pervan
2012/0067461 A1 3/2012 Braun
2012/0096801 A1 4/2012 Cappelle
2012/0151865 A1 6/2012 Pervan et al.
2012/0174515 A1 7/2012 Pervan
2012/0174520 A1 7/2012 Pervan
2012/0180408 A1 7/2012 Harris et al.
2012/0192521 A1 8/2012 Schulte
2012/0279161 A1 11/2012 Håkansson et al.
2012/0317916 A1 12/2012 Oh
2013/0008117 A1 1/2013 Pervan
2013/0008127 A1 1/2013 Braun et al.
2013/0014463 A1 1/2013 Pervan
2013/0019555 A1 1/2013 Pervan
2013/0042562 A1 2/2013 Pervan
2013/0042563 A1 2/2013 Pervan
2013/0042564 A1 2/2013 Pervan et al.
2013/0042565 A1 2/2013 Pervan
2013/0047536 A1 2/2013 Pervan
2013/0081349 A1 4/2013 Pervan et al.
2013/0111758 A1 5/2013 Nilsson et al.
2013/0111845 A1 5/2013 Pervan
2013/0145708 A1 6/2013 Pervan
2013/0160391 A1 6/2013 Pervan et al.
2013/0167458 A1 7/2013 Cerny et al.
2013/0192158 A1 8/2013 Cappelle et al.
2013/0232905 A2 9/2013 Pervan
2013/0239508 A1 9/2013 Pervan et al.
2013/0247501 A1 9/2013 Thiers et al.
2013/0263454 A1 10/2013 Boo et al.
2013/0263547 A1 10/2013 Boo
2013/0318906 A1 12/2013 Pervan et al.
2013/0333182 A1 12/2013 Pervan et al.
2014/0007539 A1 1/2014 Pervan et al.
2014/0020324 A1 1/2014 Pervan
2014/0033633 A1 2/2014 Kell
2014/0033634 A1 2/2014 Pervan
2014/0053497 A1 2/2014 Pervan et al.
2014/0059966 A1 3/2014 Boo
2014/0069043 A1 3/2014 Pervan
2014/0090335 A1 4/2014 Pervan et al.
2014/0109501 A1 4/2014 Pervan
2014/0109506 A1 4/2014 Pervan et al.
2014/0123586 A1 5/2014 Pervan et al.
2014/0190112 A1 7/2014 Pervan
2014/0208677 A1 7/2014 Pervan et al.
2014/0223852 A1 8/2014 Pervan
2014/0237924 A1 8/2014 Nilsson et al.
2014/0237931 A1 8/2014 Pervan
2014/0250813 A1 9/2014 Nygren et al.
2014/0260060 A1 9/2014 Pervan et al.
2014/0283477 A1 9/2014 Hannig
2014/0305065 A1 10/2014 Pervan
2014/0366476 A1 12/2014 Pervan
2014/0366477 A1 12/2014 Kell
2014/0373478 A2 12/2014 Pervan et al.
2014/0373480 A1 12/2014 Pervan et al.
2015/0000221 A1 1/2015 Boo
2015/0013260 A1 1/2015 Pervan
2015/0059281 A1 3/2015 Pervan
2015/0089896 A2 4/2015 Pervan et al.
2015/0121796 A1 5/2015 Pervan
2015/0152644 A1 6/2015 Boo
2015/0167318 A1 6/2015 Pervan
2015/0211239 A1 7/2015 Pervan
2015/0233125 A1 8/2015 Pervan et al.
2015/0267418 A1 9/2015 Vermeulen et al.
2015/0267419 A1 9/2015 Pervan
2015/0300029 A1 10/2015 Pervan
2015/0330088 A1 11/2015 Derelov
2015/0337537 A1 11/2015 Boo
2015/0368910 A1 12/2015 Kell
2016/0032596 A1 2/2016 Nygren et al.
2016/0060879 A1 3/2016 Pervan
2016/0069088 A1 3/2016 Boo et al.
2016/0076260 A1 3/2016 Pervan et al.
2016/0090744 A1 3/2016 Pervan et al.
2016/0108624 A1 4/2016 Nilsson et al.
2016/0153200 A1 6/2016 Pervan
2016/0168866 A1 6/2016 Pervan et al.
2016/0186426 A1 6/2016 Boo
2016/0194884 A1 7/2016 Pervan et al.
2016/0201336 A1 7/2016 Pervan
2016/0251859 A1 9/2016 Pervan et al.
2016/0251860 A1 9/2016 Pervan
2016/0281368 A1 9/2016 Pervan et al.
2016/0281370 A1 9/2016 Pervan et al.
2016/0326751 A1 11/2016 Pervan
2016/0340913 A1 11/2016 Derelöv
2017/0037641 A1 2/2017 Nygren et al.
2017/0081860 A1 3/2017 Boo
2017/0254076 A1 9/2017 Pervan et al.
2017/0254096 A1 9/2017 Pervan
2017/0321433 A1 11/2017 Pervan et al.
2017/0362834 A1 12/2017 Pervan et al.
2018/0001509 A1 1/2018 Myllykangas et al.
2018/0001510 A1 1/2018 Fransson
2018/0001573 A1 1/2018 Blomgren et al.
2018/0002933 A1 1/2018 Pervan
2018/0016783 A1 1/2018 Boo
2018/0030737 A1 2/2018 Pervan
2018/0030738 A1 2/2018 Pervan
2018/0119431 A1 5/2018 Pervan et al.
2018/0178406 A1 6/2018 Fransson et al.
2018/0313093 A1 11/2018 Nilsson et al.
2019/0024387 A1 1/2019 Pervan
2019/0048592 A1 2/2019 Boo
2019/0048596 A1 2/2019 Pervan
2019/0063076 A1 2/2019 Boo et al.
2019/0093370 A1 3/2019 Pervan et al.
2019/0093371 A1 3/2019 Pervan
2019/0119928 A1 4/2019 Pervan et al.
2019/0127989 A1 5/2019 Kell
2019/0127990 A1 5/2019 Pervan et al.
2019/0169859 A1 6/2019 Pervan et al.
2019/0211568 A1 7/2019 Nilsson
2019/0232473 A1 8/2019 Fransson et al.
2019/0271165 A1 9/2019 Boo
2019/0376298 A1 12/2019 Pervan et al.
2019/0394314 A1 12/2019 Pervan et al.
2020/0087927 A1 3/2020 Pervan
2020/0102756 A1 4/2020 Pervan
2020/0109569 A1 4/2020 Pervan
2020/0149289 A1 5/2020 Pervan
2020/0173175 A1 6/2020 Pervan
2020/0181923 A1 6/2020 Quist et al.
2020/0224430 A1 7/2020 Ylikangas et al.
2020/0263437 A1 8/2020 Pervan
2020/0263439 A1 8/2020 Nilsson
2020/0284034 A1 9/2020 Pervan et al.
2020/0284045 A1 9/2020 Kell
2020/0318667 A1 10/2020 Derelöv
2020/0354969 A1 11/2020 Pervan et al.
2020/0362567 A1 11/2020 Nilsson et al.
2021/0047840 A1 2/2021 Pervan
2021/0047841 A1 2/2021 Pervan et al.
2021/0071428 A1 3/2021 Pervan
2021/0087831 A1 3/2021 Nilsson et al.
2021/0087832 A1 3/2021 Boo
2021/0087833 A1 3/2021 Ylikangas et al.
2021/0087834 A1 3/2021 Ylikangas et al.

(56) References Cited

U.S. PATENT DOCUMENTS

| | | | |
|---|---|---|---|
| 2021/0310256 | A1 | 10/2021 | Boo |
| 2022/0025658 | A1 | 1/2022 | Kell |

FOREIGN PATENT DOCUMENTS

| | | | |
|---|---|---|---|
| CN | 201665978 | U | 12/2010 |
| DE | 25 16 843 | A1 | 10/1976 |
| DE | 103 05 695 | A1 | 9/2004 |
| DE | 10 2004 001 363 | A1 | 8/2005 |
| DE | 10 2005 028 072 | A1 | 12/2006 |
| DE | 10 2007 020 271 | A1 | 8/2008 |
| DE | 10 2007 062 430 | B3 | 7/2009 |
| DE | 10 2008 031 167 | A1 | 1/2010 |
| DE | 10 2009 048 050 | B3 | 1/2011 |
| DE | 20 2010 010 620 | U1 | 11/2011 |
| EP | 0 085 196 | A1 | 8/1983 |
| EP | 1 350 904 | A2 | 10/2003 |
| EP | 1 350 904 | A3 | 10/2003 |
| EP | 1 396 593 | A2 | 3/2004 |
| EP | 1 420 125 | A2 | 5/2004 |
| EP | 1 437 457 | A2 | 7/2004 |
| EP | 1 437 457 | A3 | 7/2004 |
| EP | 1 512 808 | A1 | 3/2005 |
| EP | 1 640 530 | A2 | 3/2006 |
| EP | 1 980 683 | A2 | 10/2008 |
| GB | 2 436 570 | A | 10/2007 |
| WO | WO 00/20705 | A1 | 4/2000 |
| WO | WO 01/53628 | A1 | 7/2001 |
| WO | WO 01/75247 | A1 | 10/2001 |
| WO | WO 01/88306 | A1 | 11/2001 |
| WO | WO 01/98603 | A2 | 12/2001 |
| WO | WO 01/98604 | A1 | 12/2001 |
| WO | WO 03/012224 | A1 | 2/2003 |
| WO | WO 03/016654 | A1 | 2/2003 |
| WO | WO 03/025307 | A1 | 3/2003 |
| WO | WO 03/089736 | A1 | 10/2003 |
| WO | WO 2004/016876 | A2 | 2/2004 |
| WO | WO 2004/053258 | A1 | 6/2004 |
| WO | WO 2007/015669 | A2 | 2/2007 |
| WO | WO 2007/141605 | A2 | 12/2007 |
| WO | WO 2008/004960 | A2 | 1/2008 |
| WO | WO 2008/004960 | A3 | 1/2008 |
| WO | WO 2008/004960 | A8 | 1/2008 |
| WO | WO 2008/116623 | A1 | 10/2008 |
| WO | WO 2009/033623 | A1 | 3/2009 |
| WO | WO 2010/015516 | A2 | 2/2010 |
| WO | WO 2010/081532 | A1 | 7/2010 |
| WO | WO 2010/086084 | A1 | 8/2010 |
| WO | WO 2010/087752 | A1 | 8/2010 |
| WO | WO 2010/100046 | A1 | 9/2010 |
| WO | WO 2010/143962 | A2 | 12/2010 |
| WO | WO 2011/038709 | A1 | 4/2011 |
| WO | WO 2012/084604 | A1 | 6/2012 |
| WO | WO 2013/030686 | A2 | 3/2013 |
| WO | WO 2014/209213 | A1 | 12/2014 |

OTHER PUBLICATIONS

U.S. Appl. No. 17/220,101, Christian Boo, filed Apr. 1, 2021, (Cited herein as US Patent Application Publication No. 2021/0310256 A1 of Oct. 7, 2021).

International Search Report and Written Opinion dated Mar. 31, 2016 in PCT/SE2015/051367, Patent-och registreringsverket, Stockholm, SE, 18 pages.

Extended European Search Report dated May 9, 2018 in EP 15873741.1, European Patent Office, Munich, DE, 7 pages.

Extended European Search Report dated Feb. 7, 2020 in EP 19209651.9, European Patent Office, Munich, DE, 7 pages.

Välinge Innovation AB, Technical Disclosure entitled "Mechanical locking for floor panels with Vertical Folding," IP.com No. IPCOM000179246D, Feb. 10, 2009, IP.com PriorArtDatabase, 59 pp.

Välinge Innovation AB, Technical Disclosure entitled "Mechanical locking for floor panels with a flexible bristle tongue," IP.com No. IPCOM000145262D, Jan. 12, 2007, IP.com PriorArtDatabase, 57 pages.

* cited by examiner

KNOWN TECHNOLOGY

KNOWN TECHNOLOGY

KNOWN TECHNOLOGY

KNOWN TECHNOLOGY

MECHANICAL LOCKING SYSTEM FOR FLOOR PANELS

CROSS REFERENCE TO RELATED APPLICATIONS

The present application is a continuation of U.S. application Ser. No. 16/745,613, filed on Jan. 17, 2020, which is a continuation of U.S. application Ser. No. 16/204,185, filed on Nov. 29, 2018, now U.S. Pat. No. 10,570,625, which is a continuation of U.S. application Ser. No. 15/726,754, filed on Oct. 6, 2017, now U.S. Pat. No. 10,161,139, which is a divisional of U.S. application Ser. No. 14/973,179, filed on Dec. 17, 2015, now U.S. Pat. No. 9,803,374, which claims the benefit of Swedish Application No. 1451632-2, filed on Dec. 22, 2014. The entire contents of U.S. application Ser. No. 16/745,613, U.S. application Ser. No. 16/204,185, U.S. application Ser. No. 15/726,754, U.S. application Ser. No. 14/973,179 and Swedish Application No. 1451632-2 are hereby incorporated herein by reference in their entirety.

TECHNICAL FIELD

The disclosure generally relates to the field of mechanical locking systems for floor panels and building panels. The disclosure includes panels, floorboards, locking systems and production methods.

FIELD OF APPLICATION

Embodiments of the present disclosure are particularly suitable for use in floating floors, which are formed of floor panels having one or more upper layers comprising, e.g., thermoplastic or thermosetting material or wood veneer, an intermediate core of wood-fibre-based material or plastic material and preferably a lower balancing layer on the rear side of the core. Embodiments of the disclosure may also be used for joining building panels which preferably contain a board material for instance wall panels, ceilings, furniture components and similar.

The following description of prior-art technique, problems of known systems and objects and features of the disclosure will therefore, as a non-restrictive example, be aimed above all at this field of application and in particular at laminate floors comprising an HDF core and formed as rectangular floor panels with long and shorts edges intended to be mechanically joined to each other on both long and short edges.

The long and short edges are mainly used to simplify the description of the disclosure. The panels may be square. Floor panels are generally produced with the surface layer pointing downwards in order to eliminate thickness tolerances of the core material. Some embodiments and production methods are shown with the surface pointing upwards in order to simplify the description.

It should be emphasized that embodiments of the disclosure may be used in any floor panel on long and/or short edges and it may be combined with all types of known locking systems on long or short edges that lock the panels in the horizontal and/or vertical direction.

BACKGROUND

Relevant parts of this background description are also a part of embodiments of the disclosed invention.

Several floor panels on the market are installed in a floating manner with mechanical locking systems formed at the long and short edges. These systems comprise locking means, which lock the panels horizontally and vertically. The mechanical locking systems are usually formed by machining of the core of the panel. Alternatively, parts of the locking system may be formed of a separate material, for instance aluminum or plastic material, which is integrated with the floor panel, i.e. joined with the floor panel in connection with the manufacture thereof.

Laminate flooring usually comprise a 6-8 mm wood based core, a 0.2 mm thick upper decorative surface layer of laminate and a 0.1 mm thick lower balancing layer. The laminate surface and the balancing layer comprise melamine-impregnated paper. The most common core material is fibreboard with high density and good stability usually called HDF—High Density Fibreboard. The impregnated surface and balancing papers are laminated to the core with heat and pressure. HDF material is hard and has a low flexibility, especially in the vertical direction perpendicular to the fibre orientation.

Recently a new type of powder based laminate floors has been introduced. Impregnated paper is replaced with a dry powder mix comprising wood fibres, melamine particles, aluminum oxide and pigments. The powder is applied on an HDF core and cured under heat and pressure. Generally high quality HDF is used with a high resin content and low water swelling. Advanced decors may be formed with digital printing. Water based ink is injected into the powder prior to pressing.

Luxury vinyl tile, LVT, flooring with a thickness of 3-6 mm usually comprises a transparent wear layer which may be coated with an ultraviolet, UV, cured polyurethane, PU, lacquer and a decorative plastic foil under the transparent foil. The wear layer and the decorative foil are laminated to one or several core layers comprising a mix of thermoplastic material and mineral fillers. The plastic core may be rather soft and flexible but also rather rigid depending on the filler content.

Wood Plastic Composite floors, generally referred to as WPC floors, are similar to LVT floors. The core comprises thermosetting material mixed with wood fibre fillers and is generally stronger and much more rigid than the mineral based LVT core.

Thermoplastic material such as PVC, PP or PE may be combined with a mix of wood fibres and mineral particles and this may provide a wide variety of floor panels with different densities and flexibilities.

Moisture resistant HDF with a high resin content, and WPC floors, comprise stronger and more flexible core materials than conventional HDF based laminate floors and they are generally produced with a lower thickness.

The above mentioned floor types comprise different core materials with different flexibility, density and strengths. Locking systems formed in one piece with the core must be adapted to such different material properties in order to provide a strong and cost efficient locking function.

Definition of Some Terms

In the following text, the visible surface of the installed floor panel is called “front side” or “floor surface”, while the opposite side of the floor panel, facing the sub floor, is called “rear side”. The edge between the front and rear side is called “joint edge”. By “horizontal plane” is meant a plane, which extends parallel to the front side. Immediately juxtaposed upper parts of two adjacent joint edges of two joined floor panels together define a “vertical plane” perpendicular to the horizontal plane. By “vertical locking” is meant locking parallel to the vertical plane. By "horizontal locking" is meant locking parallel to the horizontal plane.

By "up" is meant towards the front side, by "down" towards the rear side, by "inwardly" mainly horizontally towards an inner and center part of the panel and by "outwardly" mainly horizontally away from the center part of the panel.

By "essentially vertical" surface or wall is meant a surface or a wall that is inclined less than 45 degrees with respect to a vertical plane.

By "essentially horizontal" surface is meant a surface that is inclined less than 45 degrees with respect to a horizontal plane.

By locking angle of a surface locking panels in the horizontal direction is meant the angle of the surface relative to a vertical plane.

By locking angle of a surface locking panels in the vertical direction is meant the angle of the surface relative a horizontal plane.

A tangent line defines the inclination of a curved wall or surface.

Related Art and Problems Thereof

For mechanical joining of long edges as well as short edges in the vertical direction and horizontal direction perpendicular to the edges several methods may be used. One of the most used methods is the angle-snap method. The long edges are installed by angling. Horizontal snapping locks the short edges. The vertical connection is generally a tongue and a groove and the horizontal connection is a strip with a locking element in one edge that cooperates with a locking groove in the adjacent edge. Locking by snapping is obtained with a flexible strip that during the initial stage of locking bends downwards and during the final stage of locking snaps upwards such that the locking element is inserted into the locking groove.

Similar locking systems may also be produced with a rigid strip and they are connected with an angling-angling method where both short and long edges are angled into a locked position.

Advanced so-called "fold down locking systems" with a separate and flexible tongue on a short edge, generally called "5G systems", have been introduced where both the long and short edges are locked with an angling action. A floor panel of this type is presented in WO 2006/043893. It discloses a floor panel with a short edge locking system comprising a locking element cooperating with a locking groove, for horizontal locking, and a flexible bow shaped so called "banana tongue" cooperating with a tongue groove, for locking in a vertical direction. The flexible bow shaped tongue is inserted during production into a displacement groove formed at the edge. The tongue bends horizontally along the edge during connection and makes it possible to install the panels by vertical movement. Long edges are connected with angling and a vertical scissor movement caused by the same angling action connects short edges. The snapping resistance is low and only a low thumb pressure is needed to press the short edges together during the final stage of the angling. Such a locking is generally referred to as "vertical folding".

Similar floor panels are further described in WO 2007/015669. This invention provides a fold down locking system with an improved flexible tongue so called "bristle tongue" comprising a straight outer tongue edge over substantially the whole length of the tongue. An inner part of the tongue comprises bendable protrusions extending horizontally along the tongue body.

The above known fold down "5G system" has been very successful and has captured a major market share of the premium world laminate and wood flooring markets. The locking is strong and reliable mainly due to the flexibility and pretension of the separate flexible tongue that allows a locking with large overlapping essentially horizontal locking surfaces.

The 5G system and similar system have been less successful in the low priced market segments. The major reason is that the cost of the separate tongues and investments in special inserting equipment that is needed to insert a flexible tongue into a displacement groove are regarded as rather high in relation to the rather low price of the floor panels.

Several attempts have been made to provide a fold down locking system based on a vertical snapping function that may be produced in one piece with the core in the same way as the one piece horizontal snap systems. All such attempts have failed especially when a floor panel comprises an HDF core. This is not a coincidence. The failure is based on major problems related to material properties and production methods. Several of the known locking systems are based on theoretical geometries and designs that have not been tested in industrial applications. One of the main reasons behind the failure is that bending of vertically protruding parts that are used for the vertical locking of edges is limited to about 50% of the floor thickness or to about 4 mm in an 8 mm thick laminate floor panel. As comparison it may be mentioned that a protruding strip for horizontal snapping may extend over a substantial distance from the upper edge and may protrude 8-10 mm beyond the upper edge. This may be used to facilitate a downward bending of the strip and the locking element. Other disadvantages compared to horizontal snapping are that HDF comprises a fibre orientation substantially parallel with the floor surface. The material properties are such that bending of horizontally protruding parts is easier to accomplish than bending of vertically protruding parts. Furthermore, lower parts of an HDF board comprise a higher density and a higher resin content than middle parts and such properties are also favorable for the horizontal snapping systems where the strip is formed in the lower part of the core.

Another circumstance that has supported market introduction of the horizontal snap systems is the fact that a hammer and a knocking block may be used to snap the short edges. Fold down systems are so called tool-less systems and the vertical locking must be accomplished with hand pressure only.

It would be a major advantage if a one-piece fold down locking system may be formed with a quality and locking function similar to the advanced 5G systems.

SUMMARY OF THE DISCLOSURE

An objective of embodiments of the present disclosure is to provide an improved and more cost efficient fold down locking system for vertical and horizontal locking of adjacent panels wherein the locking system is produced in one piece with the core.

A first specific objective is to provide a locking system wherein a horizontally extending flexible strip may be used to accomplish the vertical and horizontal locking.

A second specific objective is to provide a locking system with essentially horizontally extending locking surfaces for the vertical locking such that a strong locking force may be obtained in the vertical direction.

A third specific objective is to prevent separation forces between the edges during locking and to decrease the snapping resistance such that a tool-less installation may be obtained with low pressure against the short edges.

A fourth specific objective is to provide a cost efficient method to form locking elements in a double-end tenor comprising a lower chain and an upper belt that displace the panel in relation to several tool stations.

The above objects may be achieved by embodiments of the disclosure.

According to a first aspect of the disclosure a set of essentially identical floor panels are provided with a mechanical locking system comprising a strip extending horizontally from a lower part of a first edge and a downwardly open locking groove formed in an adjacent second edge. The strip comprises an upwardly protruding locking element that is configured to cooperate with the locking groove and locks the first and the second edge in a horizontal direction parallel to a main plane of the first and the second panel and in a vertical direction perpendicularly to the horizontal direction. The locking system is configured to be locked with a vertical displacement of the second edge against the first edge wherein the strip, preferably an outer portion of the strip, during an initial stage of the vertical displacement is configured to bend upwards towards the second panel and during a final stage of the vertical displacement is configured to bend downwards towards its initial unlocked position.

An upper portion of the locking element may be configured to be displaced during locking into a space provided between an outer groove wall of the locking groove and an inner surface of the locking element. The displacement may be caused by at least one of a bending, a compression and a twisting of the strip. Optionally, the upper portion of the locking element may during locking be further configured to be displaced out from the space.

Bending may comprise rotation and/or a displacement of at least portions of the strip.

According to one embodiment, the space between the outer groove wall and the inner surface is a cavity arranged in the inner surface of the locking element. According to another embodiment, the space is a cavity arranged in the outer groove wall of the locking groove. According to yet another embodiment, the space is partly a cavity arranged in the inner surface and partly a cavity arranged in the outer groove wall.

The strip may be configured to bend upwards towards a portion of a front side of the second panel. The portion may be an outer portion of the front side.

Optionally, the upward and/or downward bending of the strip may be combined with at least one of a twisting or a compression of the strip.

The strip may be configured to bend upwards from the unlocked position to an end position. Moreover, the strip may be configured to bend downwards from the end position and at least partly back to the unlocked position. In a non-limiting example, an outer, lower portion of the strip is displaced vertically upwards from the unlocked position to the end position by a first distance and then is displaced vertically downwards by a second distance, wherein the second distance is between 10% and 95% of the first distance, e.g. 40% or 50%. In another non-limiting example, the strip bends completely back to a position corresponding to the unlocked position so that the second distance is essentially the same as the first distance.

The first and second panels may comprise a pair of parallel short edges and a pair of parallel long edges, wherein the long edges are perpendicular to the short edges. The first and second edges may be short edges.

The main plane of the first and the second panel may be a horizontal plane that is essentially parallel with the front side and/or the rear side of the first and/or the second panel.

By a vertical displacement is meant that the edges of the panels are displaced against each other at least in a vertical direction. Optionally, however, the vertical displacement may also be combined with an angling action. According to one embodiment, the vertical displacement is a vertical scissor movement caused by the same angling action that is used to connect the edges of the panels that are perpendicular to the first and the second edges. For example, the first and second edges may be short edges and the perpendicular edges may be long edges. According to another embodiment, front sides of the first and second panels are essentially parallel to each other during the vertical displacement.

The first and the second edge may comprise a first edge section and a second edge section along the first and the second edge, wherein a cross section of the locking groove or a cross section of the locking element varies along the first edge and/or the second edge, in a locked position.

The cross section of the locking groove or of the locking element may be a cross section as seen from a side view of the floor panels.

There may be at least one first edge section and at least one second edge section. A shape of the each of the first edge sections may be similar. Moreover, a shape of each of the second edge sections may be similar. Alternatively, the shapes of the first edge sections and/or the second edge sections may vary.

The first edge sections and the second edge sections may be arranged alternately along the first and the second edge.

There may be a smooth transition between the first and the second edge sections along the edge. Alternatively, the transition between the first and the second edge sections along the edge may be stepped.

According to one embodiment, a first edge section is arranged at a first and/or a second corner section of the first and second edges. According to one embodiment, a second edge section is arranged at a first and/or a second corner section of the first and second edges.

In any of these embodiments, the first and second corner sections may be arranged adjacent to long edges of the panels.

According to one embodiment, the first and second edges are locked vertically by means of engagement of an upper locking surface provided on an outer surface of the locking element and a lower locking surface provided on an inner groove wall of the locking groove. In one example, the upper locking surface is provided along the entire first edge and the lower locking surface is provided along a part of the second edge. In another example, the upper locking surface is provided along a part of the first edge and the lower locking surface is provided along the entire second edge.

During the final stage the locking element may be snapped into the locked position such that the upper and lower locking surfaces engage with each other in the locking position. Alternatively, the locking element may assume the locked position by means of a smooth displacement upwards and/or downwards such that the upper and lower locking surfaces engage with each other in the locking position. For example, the latter may be achieved with a beveled upper and/or lower locking surface. The strip may also be pressed down by a lower part of the second panel that presses against an upper part of the protruding strip and/or the locking element.

According to a second aspect of the disclosure a set of essentially identical rectangular floor panels each comprising long edges and a first short edge and a second short edge are provided. The first short edge and the second short edge are provided with a mechanical locking system comprising a strip extending horizontally from a lower part of a first short edge and a downwardly open locking groove formed in the second short edge. The strip comprises an upwardly protruding locking element that is configured to cooperate with the locking groove for locking the first short edge and the second short edge in a horizontal direction parallel to the main plane of the panels and in a vertical direction perpendicularly to the horizontal direction. The locking element comprises an inner surface, an outer surface and a top surface. The inner surface is positioned closer to an upper edge of the first panel than the outer surface. The locking groove comprises an outer groove wall, an inner groove wall and an upper groove wall, the outer groove wall being positioned closer to an upper edge of the second panel than the inner groove wall. The locking element comprises an upper locking surface and the locking groove comprises a lower locking surface. In a locked position the first short edge and the second short edge comprise a first and a second joint edge section located along the first short edge and the second short edge. The first edge section is configured such that the outer groove wall of the locking groove and the inner surface of the locking element along are in contact with each other along a horizontal plane HP and lock the first short edge and the second short edge horizontally, and the second edge section is configured such that along the horizontal plane HP there is a space between the outer groove wall of the locking groove and the inner surface of the locking element. The upper locking surface of the locking element and the lower locking surface of the locking groove are configured to be in contact with each other and to lock the first short edge and the second short edge vertically.

Embodiments of the space between the outer groove wall and the inner surface are largely analogous to the embodiments described above in relation to the first aspect, wherein reference is made to the above. In addition, a length of the space in a length direction of the short edges may correspond to a length of the second edge section. Alternatively, the length of the space may be longer than the length of the second edge section.

The upper locking surface of the locking element and the lower locking surface of the locking groove may be configured to be in contact with each other in the second edge section.

The upper locking surface and the lower locking surface form an overlap in a direction parallel with the main plane of the panels and perpendicularly to the short edges. Preferably, there is an overlap only along a portion of the short edges, e.g. in the second edge section(s). In a first example, the overlap is constant along the short edges. More specifically, the overlap is constant in the second edge section(s). In a second example, the overlap varies along the short edges. The varying overlap may be periodic with a constant periodicity along the second edge section(s).

According to one embodiment, the upper locking surface extends along the entire first short edge. In a non-limiting example, there is no lower locking surface provided in the first edge section.

According to one embodiment, the lower locking surface extends along the entire second short edge. In a non-limiting example, there is no upper locking surface provided in the first edge section.

The upper locking surface or the lower locking surface may extend along a portion of the first and second short edge, respectively.

According to a non-limiting embodiment, the upper locking surface is arranged only in a middle section of the first short edge and the lower locking surface is provided along the entire second short edge. Thereby, the upper locking surface is missing from corner sections of the first short edge, wherein the middle section is a second edge section and the corner sections are first edge sections, the middle section being arranged between the corner sections. The overlap is thereby formed only in the middle section. According to this embodiment, the space is formed as a cavity in a middle portion of the outer groove wall and/or in a middle portion of the inner surface.

The upper edge of a panel may be a portion of the panel along a short edge thereof. The upper edge may be closer to the front side than the rear side of the panel. Moreover, the upper edge of the first panel may be provided in a side wall of an indentation provided along the first short edge of the first panel. A projection along the second short edge of the second panel may be adapted to be inserted in the indentation. Moreover, the upper edge of the second panel may be provided in the second short edge of the second panel.

The first edge section may be located closer to a long edge than the second edge section. Alternatively, the second edge section may be located closer to a long edge than the first edge section. The first and/or second edge sections may be arranged at corner sections in precise analogy to the first aspect explained above.

The locking system may be configured to be locked with a vertical displacement of the second short edge against the first short edge. The concept of "vertical displacement" has been defined above in relation to the first aspect.

The locking system may be configured such that a vertical displacement of the second short edge against the first short edge during an initial stage of the vertical displacement bends the strip upwards towards the second panel such that the upper locking surface and lower locking surface overlap each other.

The strip may be configured to bend upwards towards a portion of a front side of the second panel. The portion may be an outer portion of the front side. The upward bending of the strip may comprise at least one of an upward vertical displacement, a horizontal displacement inwards, and a rotation. Optionally, the upward bending may be combined with a twisting and/or a compression of the strip.

The lower locking surface may be essentially horizontal. Alternatively, the lower locking surface may be inclined. The angle of the lower locking surface with respect to a main plane of the second panel may be between 0° and 45° degrees, e.g. 15, 20° or 25°.

According to one embodiment, the lower locking surface is planar. According to an alternative embodiment, however, the lower locking surface may be curved. The curvature may be positive or negative, i.e. convex or concave, in a direction perpendicular to the vertical plane.

A shape of the lower locking surface may correspond to a shape of the upper locking surface—partly or entirely.

A tangent line TL to the lower locking surface may intersect the outer wall of the locking groove.

The upper locking surface may be located on the outer surface of the locking element. The lower locking surface may be located on the inner grove wall of the locking groove.

The upper locking surface may be spaced vertically upwards from an upper strip surface. The upper strip surface may be surface provided on the strip of the first short edge. The upper strip surface may be at least partially planar. Moreover, a portion of the upper strip surface may be curved. In a locked position, at least a portion of the upper strip surface may engage with a projection of the second short edge of the second panel. In particular, at least a portion of the upper strip surface may engage with the projection in a first edge section as well as in a second edge section.

According to a third aspect of the disclosure a set of essentially identical floor panels are provided with a mechanical locking system comprising a strip extending horizontally from a lower part of a first edge and a downwardly open locking groove formed in an adjacent second edge. The strip comprising an upwardly protruding locking element which is configured to cooperate with the locking groove for locking the first edge and the second edge in a horizontal direction parallel to a main plane of the panels and in a vertical direction perpendicularly to the horizontal direction. The locking element and the locking groove comprise an upper and a lower locking surface, which are configured to lock the panels vertically. The floor panels are characterized in that the upper locking surface is located on an upper part of the locking element facing an upper edge of the first panel, and that the upper locking surface is inclined or rounded and extends from the locking element and towards an inner part of the panel such that a tangent line to the upper locking surface of the locking element intersects the edge.

The upper part of the locking element may face the upper edge of the first panel. Moreover, the tangent line may intersect the first edge.

The tangent line may be specified in a cross-sectional side view of the panels. The tangent line may intersect the first edge at an upper part of the first edge.

In one non-limiting example, the upper locking surface is planar. In this case, the planar upper locking surface may be inclined with respect to a front side of the first panel by an angle between 0° and 45°, e.g. 20° or 25°. In another non-limiting example, the upper locking surface is rounded or, equivalently, curved. In this case, the curvature of the upper locking surface may be positive or negative, or put differently: the upper locking surface may be convex or concave in a direction perpendicular to the vertical plane. In case of a rounded upper locking surface, tangent lines at one or several points of the upper locking surface may intersect the first edge, as seen from a cross-sectional side view of the panels.

A shape of the upper locking surface may correspond to a shape of the lower locking surface—partly or entirely.

The locking system may be configured to be locked with a vertical displacement of the second edge against the first edge.

The locking system may be configured such that a vertical displacement of the second edge against the first edge during locking bends the strip downwards and turns the upper part of the locking element outwardly away from the upper edge.

The locking surfaces may be configured such that the upper and lower locking surfaces comprise upper and lower guiding surfaces that overlap each other during the downward bending of the strip.

According to a fourth aspect of the disclosure, there is provided a method for producing a locking system at edges of building panels. The building panels comprise a core and a locking surface formed in the core and extending essentially horizontally such that a tangent line to a part of the locking surface intersects an essentially vertical adjacent wall formed in the panel edge adjacent to the locking surface. The method comprises:

- forming a strip at a lower part of a first edge of a panel and a locking element at an outer part of the protruding strip,
- forming a locking groove in a second edge of the panel, and
- forming the essentially horizontal locking surface in a wall of the locking groove or on the locking element by displacing the panel against a fixed carving tool.

According to a fifth aspect of the disclosure, a set of essentially identical floor panels are provided with a mechanical locking system comprising a strip extending horizontally from a lower part of a first edge and a downwardly open locking groove formed in an adjacent second edge. The strip comprises an upwardly protruding locking element that is configured to cooperate with the locking groove and locks the first and the second edge in a horizontal direction parallel to a main plane of the first and the second panel and in a vertical direction perpendicularly to the horizontal direction. The locking system is configured to be locked with a vertical displacement of the second edge against the first edge, wherein an upper portion of the strip is configured to bend upwards towards the second panel.

Optionally, the upward bending of the strip may be combined with at least one of a twisting or a compression of the strip and/or the locking element.

The fifth aspect of the disclosure is largely analogous to the first aspect, except for the final stage of the vertical displacement downwards, wherein reference is made to the above embodiments and examples discussed in relation therewith.

Additionally, the locking element may assume the locked position by means of a smooth displacement upwards such that upper and lower locking surfaces may engage with each other in the locking position. Alternatively, it may snap into the locked position.

According to a sixth aspect of the disclosure, a set of essentially identical floor panels are provided with a mechanical locking system comprising a strip extending horizontally from a lower part of a first edge and a downwardly open locking groove formed in an adjacent second edge. The strip comprises an upwardly protruding locking element that is configured to cooperate with the locking groove and locks the first and the second edge in a horizontal direction parallel to a main plane of the first and the second panel and in a vertical direction perpendicularly to the horizontal direction. The locking system is configured to be locked with a vertical displacement of the second edge against the first edge, wherein a portion of the strip is configured to be displaced in a direction inwards by twisting and/or compressing the strip.

The sixth aspect of the disclosure is largely analogous to the first aspect, except that the upward and downward bending have been replaced by twisting and/or compression of the strip, wherein reference is made to the above embodiments and examples discussed in relation therewith. In particular, the portion of the strip may be a portion of the locking element, e.g. an upper portion of the locking element. Moreover, the upper portion of the locking element may be configured to be displaced during locking into a space provided between an outer groove wall of the locking groove and an inner surface of the locking element.

Additionally, the locking system may be further configured to be locked with a displacement of the portion of the strip in a direction outwards. For example, the strip may be untwisted and/or decompressed at least partly towards an initial unlocked position of the strip.

According to a seventh aspect of the disclosure, there is provided a set of essentially identical floor panels comprising a first panel and an adjacent second panel and being provided with a mechanical locking system comprising a strip extending horizontally from a lower part of a first edge of the first panel and a first downwardly open locking groove and a second downwardly open locking groove formed in a second edge of the second panel. The strip comprises a first upwardly protruding locking element and a second upwardly protruding locking element provided inwardly of the first locking element. Moreover, the second locking element is configured to cooperate with the second locking groove and to lock the first and the second edges in a horizontal direction perpendicular to a vertical plane defined by the joint adjacent first and second edges. The first locking element is configured to cooperate with the first locking groove and to lock the first and second edges in a vertical direction perpendicularly to said horizontal direction. The locking system is configured to be locked with a vertical displacement of the second edge against the first edge whereby an upper portion of the locking element is displaced into a space. The space is defined by a cavity between an outer groove wall of the first locking groove and an inner surface of the first locking element in a locked state of the panels.

According to one embodiment, the first and the second locking grooves are separated by a downwardly extending projection.

According to another embodiment, the first and the second locking groove are part of a common groove. The common groove may have an inner wall coinciding with a wall of the first locking groove and an outer wall coinciding with a wall of the second locking groove. Moreover, the common groove may have an intermediate wall connecting upper groove walls of the first and the second locking groove.

The seventh aspect of the disclosure is largely analogous to the first aspect, wherein reference is made to the above embodiments and examples discussed in relation therewith. In particular, it is understood that the upper portion of the locking element may optionally bend upwards, may be compressed and/or twisted, and may possibly also be bended downwards. Also, all the embodiments of the space according to the first aspect may be combined with the seventh aspect.

More generally, it is emphasized that the embodiments according to the various aspects of the disclosure may be combined in part or in their entirety with each other. Additionally, it is understood that in all of the above aspects the bending, twisting, compression, or deformation may be elastic or inelastic.

BRIEF DESCRIPTION OF THE DRAWINGS

The disclosure will in the following be described in connection to exemplary embodiments and in greater detail with reference to the appended exemplary drawings, wherein.

DETAILED DESCRIPTION

Figure 1A:
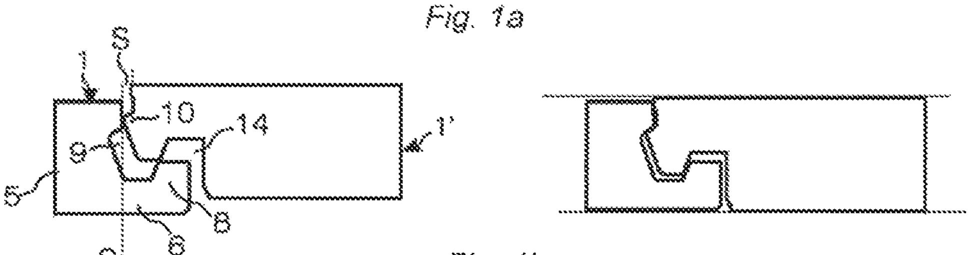
FIGS. 1*a*-1*g* illustrate a fold down locking systems according to known principles.

FIGS. 1*a*-1*f* show some examples of known fold down locking systems made in one piece with the core 5 that are intended to lock short edges with a vertical displacement of a second edge of a second panel 1' against a first edge of a first panel 1. All systems comprise a horizontally protruding strip 6 with a locking element 8 in the first edge of the first panel 1 that cooperates with a locking groove 14 in the second edge of the second panel 1' and locks the edges of the panels 1, 1' horizontally. Different methods are used to lock the edges vertically.

FIG. 1*a* shows that a small tongue 10 that cooperates with a tongue groove 9 may be used for the vertical locking.

Compression of the tongue 10 is required to accomplish the locking. The upper edges are, during the vertical displacement, spaced from each other with a space S that corresponds to the horizontal protrusion of the tongue 10. The adjacent edges must be pulled together during the final stage of the locking. The friction between the long edges, that during the final stage of the locking are practically aligned horizontally and are in a locked position, prevents such pulling together and there is a major risk that the edges are locked with a space or that the locking element 8 is damaged. A considerable pressure force is required to press the edges together and thickness tolerances may create further problems, especially if the second panel 1' is thicker than the first panel 1 and will hit the subfloor before the upper surfaces are aligned horizontally. The locking system is not suitable to lock panels comprising, for example, an HDF core or other non-compressible materials.

Figure 1B:
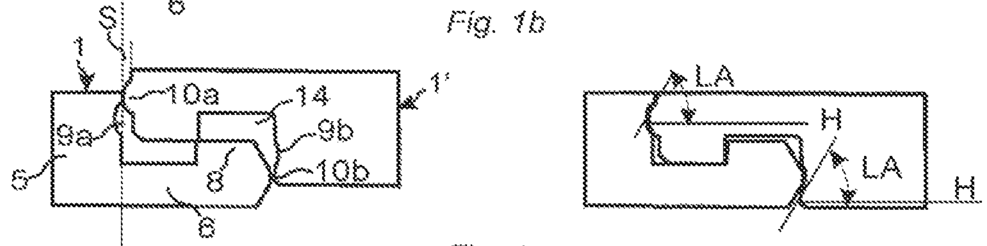

FIG. 1*b* shows a similar locking system with two tongues 10*a*, 10*b* and two tongue grooves 9*a*, 9*b*. This system requires material compression and creates edge separation during locking. The locking surfaces are almost vertical and have a locking angle LA of about 60 degrees with respect to a horizontal plane H. The protruding tongues are very small and protrude a few tenths of a millimeter and this corresponds to normal production tolerances resulting in locking system that are not possible to lock or without any overlapping locking surfaces.

Figure 1C:
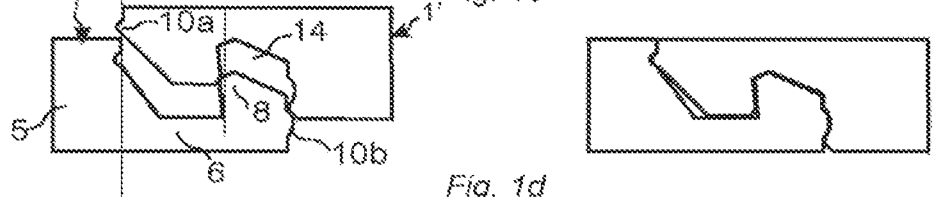

FIG. 1*c* shows a locking system with two tongues 10*a*, 10*b*. The locking element comprises a locking surface that is inclined upwardly towards the upper edge in order to increase the vertical locking strength. This locking system is even more difficult to lock than the locking systems described above and suffers from the same disadvantages.

Figure 1D:
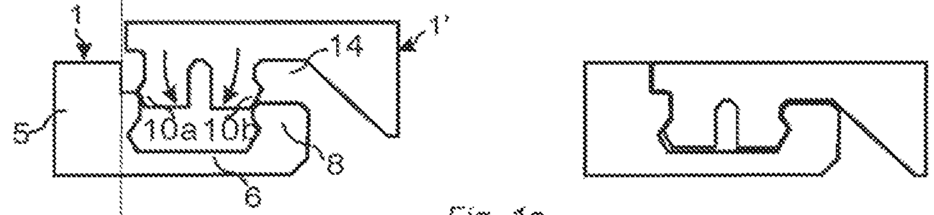

FIG. 1*d* shows an embodiment that is based on downwardly protruding locking elements that are intended to bend inwardly against each other such that two tongues 10*a*, 10*b* may be inserted into tongue grooves. The flexibility that may be obtained over the limited vertical extension of the locking elements in an HDF material is not sufficient to obtain a locking force necessary for flooring applications. However, the locking system eliminates separation forces during locking.

Figure 1E:
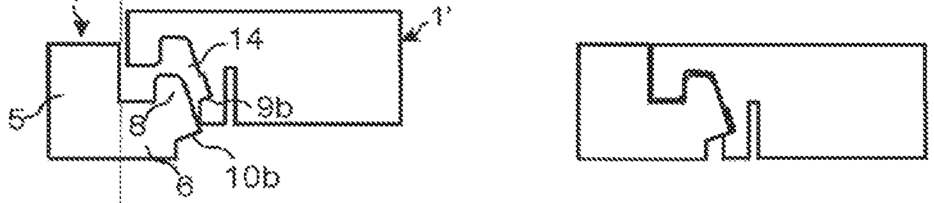

FIG. 1*e* shows a locking system wherein similar flexibility is obtained with a groove formed behind the locking groove 14. Such locking systems suffer from the same disadvantages as the locking system shown in FIG. 1*d*. Similar locking system may also comprise locking surfaces 10*b*, 9*b* that are shortened in regions, for example as described in WO 2010/100046, in order to reduce damages of the locking means during installation when material is compressed. In practice no reduction of damages may be obtained.

Figure 1F:
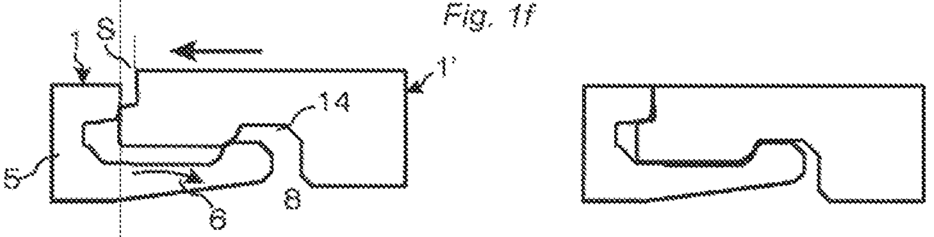

FIG. 1*f* shows a locking system comprising a strip 6 that is bended downwards during the vertical displacement. The locking system is intended to be used together with an installation method wherein the long edges of the first and the second panels are in an angled position such that the friction forces are reduced to a level where the locking element during upward snapping is capable to automatically pull the edges together. The major disadvantage is that the installation must be made with panels in angled position and this is more complicated than the conventional single action fold down installation.

Figure 1G:
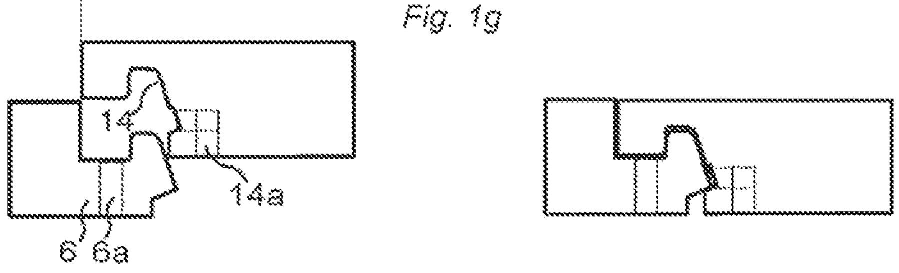

FIG. 1*g* shows locking systems that may comprise slits 6*a* in the locking strip, for example as described in US 2010/0037550 or slits 14*a* behind the locking groove, for example as described in WO 2008/116623. Such slits may increase the flexibility and the horizontal displacement possibilities of the locking elements considerably and a very easy locking may be obtained. The main problem is that such slits also increase the vertical flexibility and flexibility. This will result in a very low locking strength in the vertical direction. Therefore attempts to introduce such locking systems have failed.

Figure 2A:
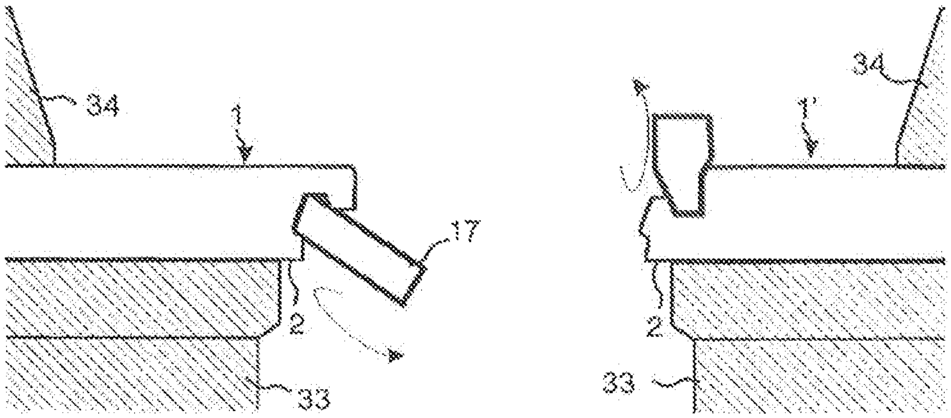
FIGS. 2*a*-2*c* illustrate known principles to form locking systems.
Figure 2B:
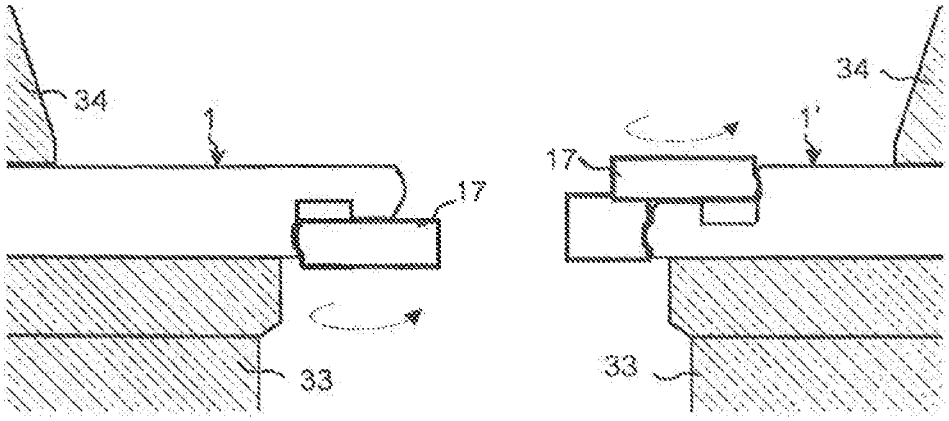
Figure 2C:
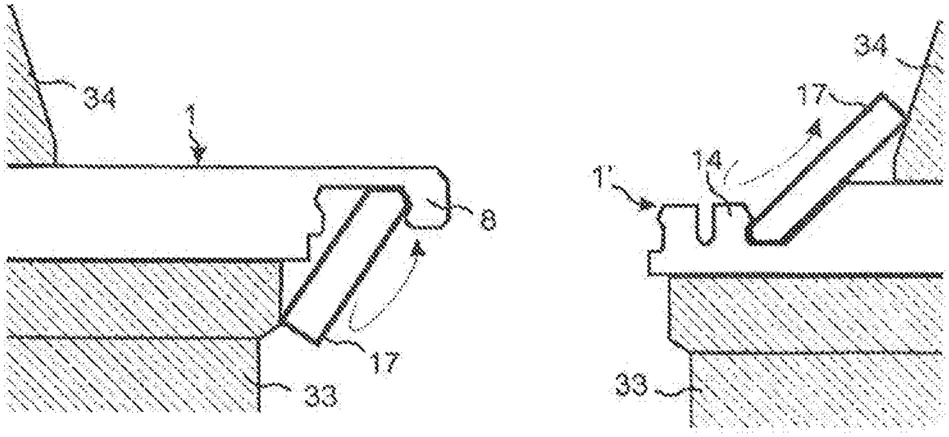

FIGS. 2*a*-2*c* show that the geometry of the locking systems is restricted in several ways by the production methods wherein double-end tenors comprising a chain 33, a belt 34 and several large rotating tools 17 with a diameter of about 20 cm are used. FIGS. 2*a* and 2*b* show that efficient production methods require that grooves and protrusions are formed with rotating tools 17 that rotate vertically or horizontally or that are angled away from the chain 33 and the belt 34. FIG. 2*c* shows that only essentially vertical locking surfaces may be formed on an inner part of the locking element 8 or on the locking groove 14 and that very small rotating tools with a low milling capacity may be used. Several of the known locking systems are not possible to produce in a cost efficient way.

Figure 3A:
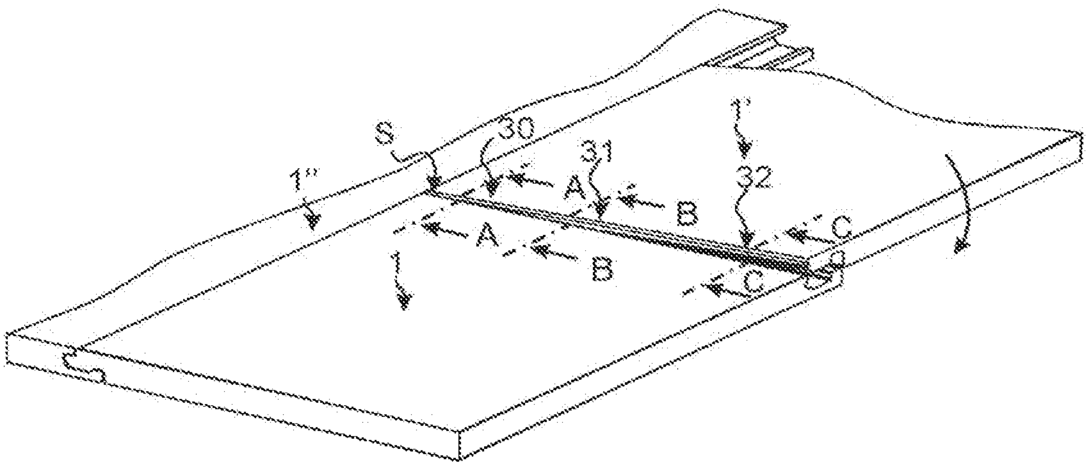
FIGS. 3*a*-3*e* illustrate vertical folding and edge separation.
Figure 3B:
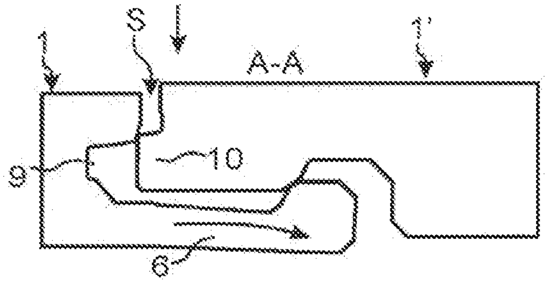
Figure 3C:
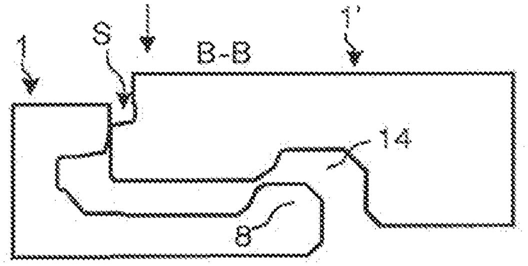
Figure 3D:
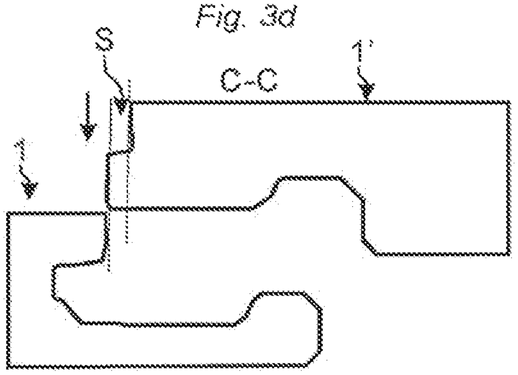
Figure 3E:
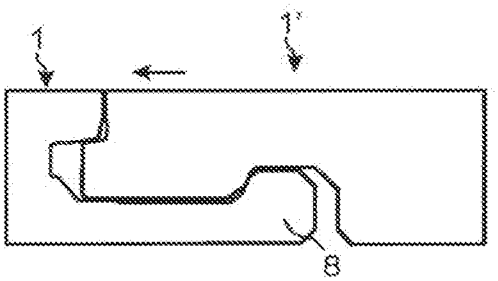

FIGS. 3*a*-3*e* explain the separation forces that may occur during vertical folding when a second panel 1' is angled against a previously installed panel 1" in a previous row and wherein this angling action also connects a short edge of the second panel 1' to a short edge of a first panel 1 as shown in FIG. 3*a*. The short edges are locked with a scissor like movement wherein the short edges are gradually locked from one long edge to the other long edge. The adjacent short edges of the first and the second panels 1, 1' have along their edges a start section 30 that becomes active during a first initial step of the folding action, a middle section 31 that becomes active during a second stage of the folding action and an end section 32 that becomes active during a final third step of the folding action. The shown locking system is based on an embodiment with a strip 6 that during vertical displacement bends downwards and thereafter snaps upwards. FIG. 3*b* shows that one part of the edge, that is close to the long edge where the angling takes place, is almost in locked position, as shown by the cross section A-A, when the locking element 8 and the locking groove 14 of middle sections B-B are still spaced from each other vertically, as shown in FIG. 3*c*, and when edge sections C-C that are most distant to the long edge where angling takes place are spaced from each other vertically without any contact between the cross sections C-C as shown in FIG. 3*d*. FIG. 3*e* shows the final step of the locking when the edges must be pulled together with a pulling force that is sufficient to overcome the friction between long edges of the first installed panel 1" and the second panel 1'. The friction may be substantial, especially when the panels are long or when a high friction material is used as a core. The high friction is to a large extent caused by the geometry of the long edge locking system that must be formed with a tight fit between the tongue and the tongue groove in order to avoid squeaking sound.

Figure 4A:
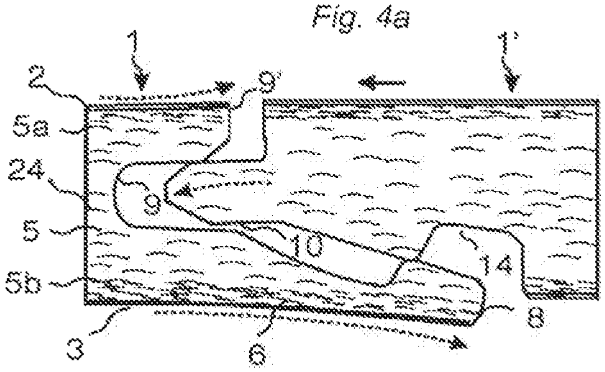
FIGS. 4*a*-4*f* illustrate bending of protruding parts.
Figure 4B:
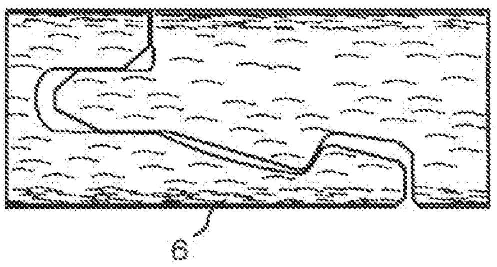

FIGS. 4*a* and 4*b* show a one piece locking system formed in a laminate floor panel comprising an HDF core. The locking system is locked with horizontal snapping. The HDF material comprises wood fibres 24 that during HDF production obtain an essentially horizontal position in the core material. The density profile is such that the upper 5*a* and the lower 5*b* parts of the core 5 have a higher density than the middle parts. These outer portions are also reinforced by the melamine resin from the impregnated paper of the surface 2 and in the balancing layers 3 that during lamination penetrates into the core 5. This allows that a strong and flexible strip 6 may be formed that, during locking, bends downwards. The snapping function is supported by the upper lip 9' that bends slightly upwards and the protruding tongue 10 that bends slightly downwards. The locking element may easily be formed with a high locking angle and with essentially vertical locking surfaces.

Figure 4C:
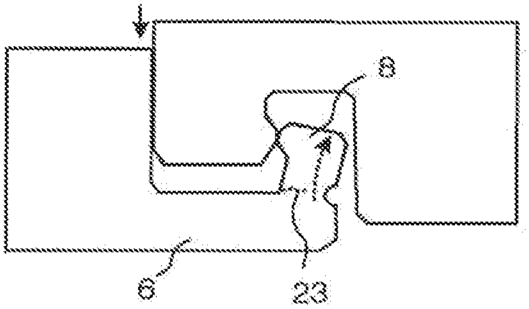
Figure 4D:
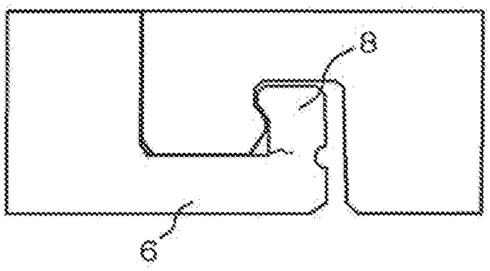
Figure 4E:
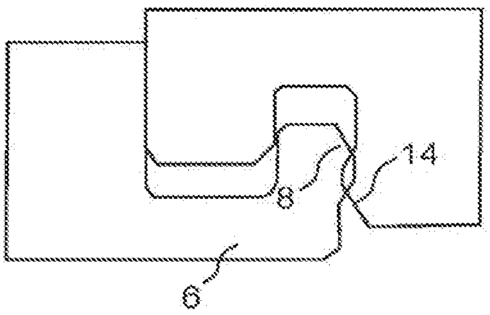
Figure 4F:
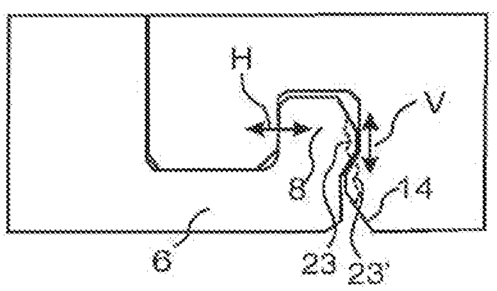

As a comparison, bending of vertically protruding locking elements 8 are shown in FIGS. 4*c*-4*f*. FIGS. 4*c* and 4*d* show a locking element 8 that during vertical displacement is bended outwardly. The bending takes place in the rather soft part of the HDF core and a crack 23 will generally occur in the lower part of the locking element 8. FIGS. 4*e* and 4*f* show a locking element 8 that is used to lock against a locking groove 14 in a horizontal H and a vertical direction V. The locking can only take place with material compression and this causes damages and cracks 23, 23' in the locking system.

Figure 5A:
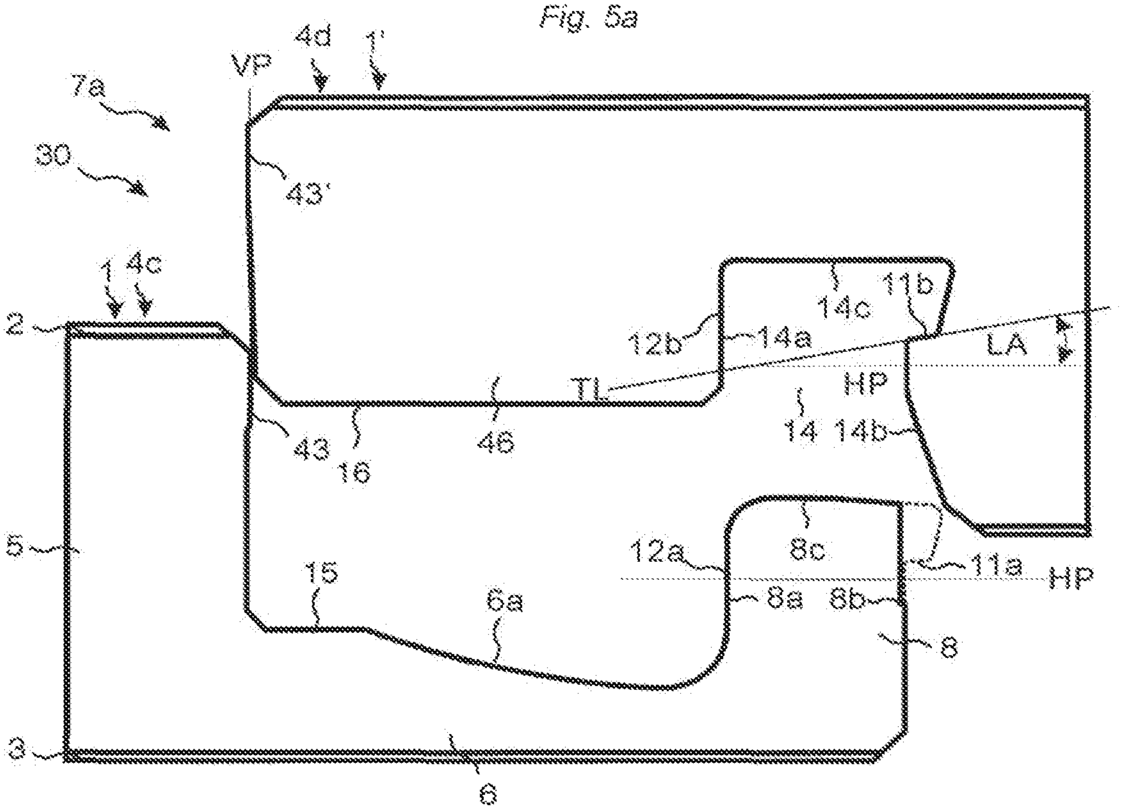
FIGS. 5*a*-5*b* illustrate a first and a second edge section of a locking system according to one embodiment.
Figure 5B:
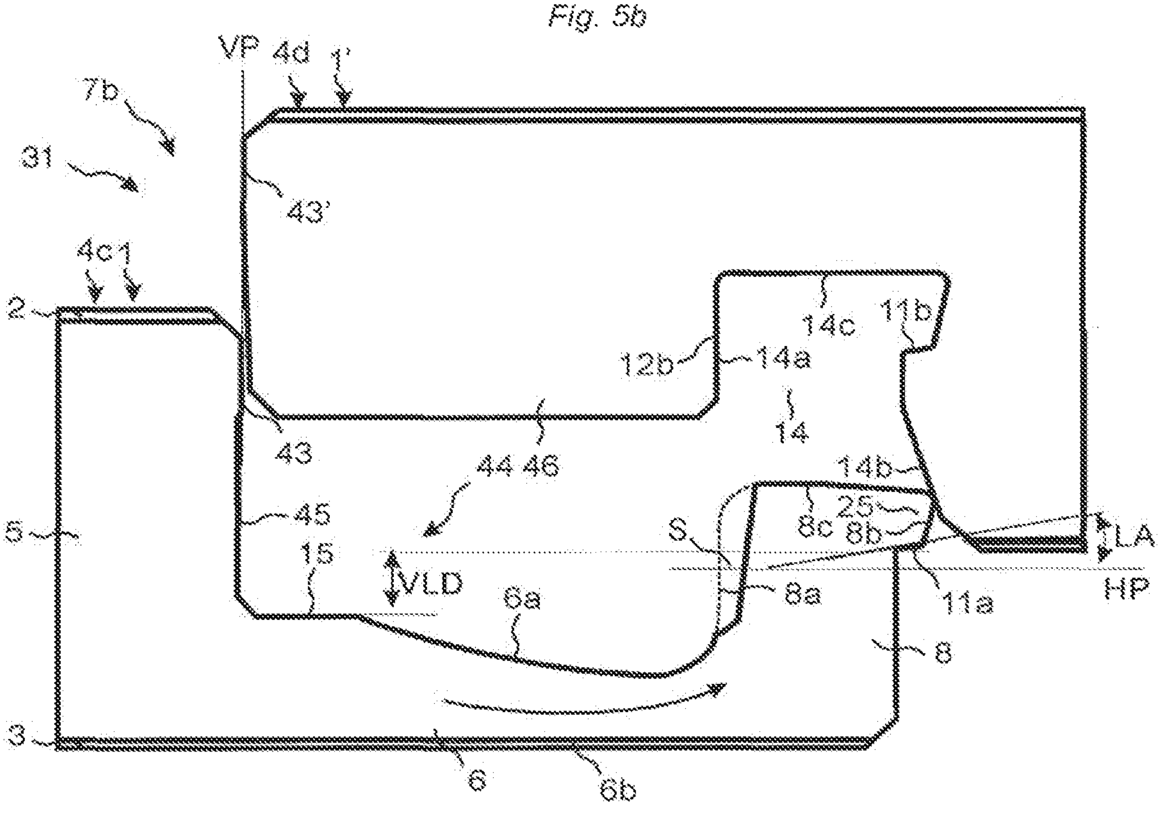

FIGS. 5*a* and 5*b* show a first embodiment of the disclosure according to a first main principle. A set of similar floor panels 1, 1' are provided, wherein each floor panel preferably comprises a surface layer 2, a core 5, a balancing layer 3 and a first and a second short edge. A first short edge 4*c* of a first floor panel 1 may be locked to an adjacent second short edge 4*d* of a similar second floor panel 1' with a vertical displacement of the second edge against the first edge. According to the present embodiment, the vertical displacement is a vertical scissor movement caused by the same angling action that is used to connect the long edges of the panels. The first short edge 4*c* comprises a horizontally protruding strip 6 with a vertically protruding locking element 8 at its outer part that cooperates with a downwardly open locking groove 14 formed in the adjacent second edge 4*d*.

Figure 6A:
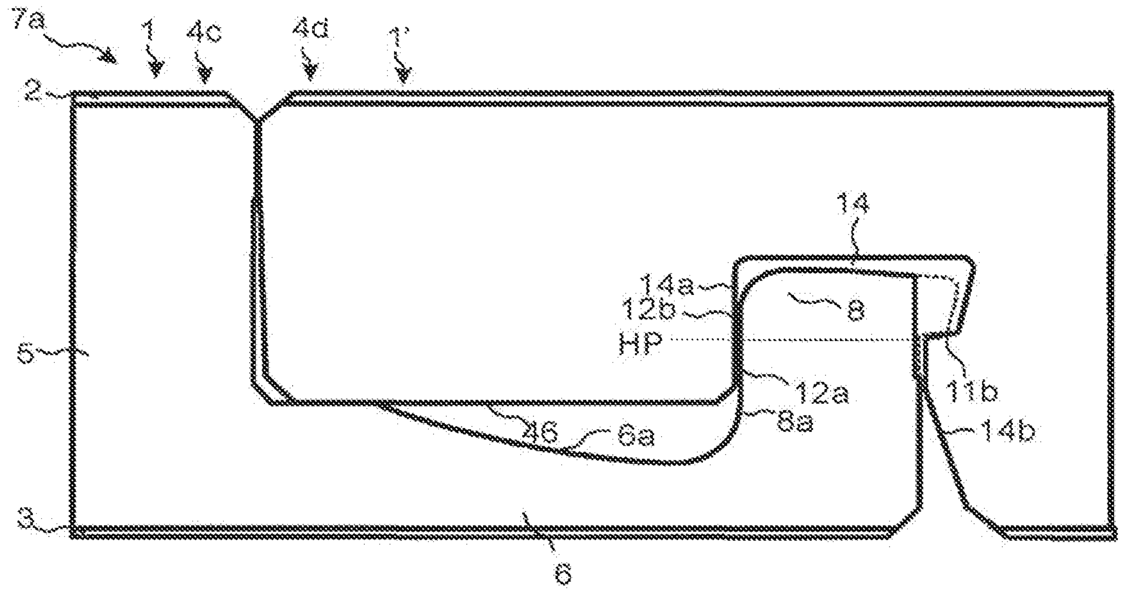
FIGS. 6*a*-6*b* illustrate the first and second edge sections of the locking system in FIGS. 5*a*-5*b* in a locked position.
Figure 6B:
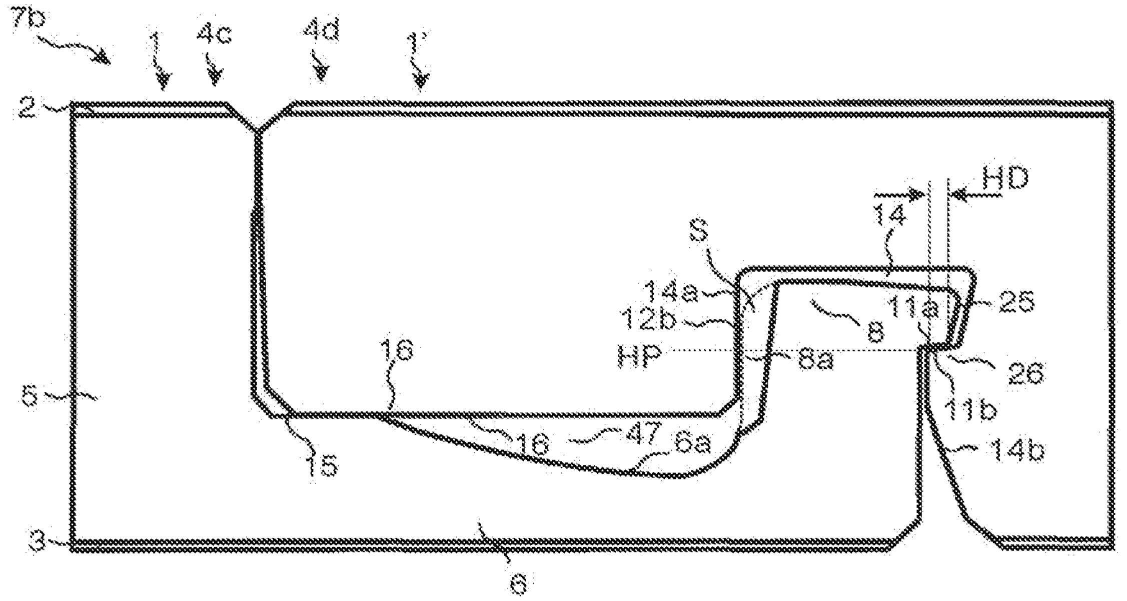

According to the present embodiment, the locking element 8 is essentially rigid and is not intended to be bended or compressed during locking that contrary to known technology is accomplished essentially with a horizontal displacement of the upper part of the locking element 8 towards the upper first edge 43. By essentially rigid is here meant that during locking the locking element itself is bended and/or compressed in a horizontal direction by a distance HD that is less than 50% of a horizontally protruding upper locking surface 11*a* located in the upper part of the locking element 8 as shown in FIG. 6*b*. The displacement of the locking element 8 is mainly accomplished with a bending and/or deformation of the strip 6. The locking element comprises an inner surface 8*a*, an outer surface 8*b* and an upper or top surface 8*c*. The inner surface 8*a* is closer to an upper edge 43 of the first panel 1 than the outer surface 8*b*. More specifically, a horizontal distance between the inner surface 8*a* and the upper edge 43 is smaller than a horizontal distance between the outer surface 8*b* and the upper edge 43. According to the present embodiment, the upper edge 43 is a portion of the first edge close to the front side of the first panel 1. Moreover, the upper edge 43 is provided in a side wall 45 of an indentation 44 which is provided in the first edge. The indentation 44 is upwardly open and, in a locked position, an upper support surface 16 of a projection 46 provided in the second edge engages with a lower support surface 15 of the indentation which is a portion of an upper strip surface 6*a* of the strip 6. The locking groove 14 comprises an outer groove wall 14*a*, an inner groove wall 14*b* and an upper groove wall 14*c*. The projection 46 is provided outside of the locking groove 14 and share the outer groove wall 14*a* with the locking groove 14. The outer groove wall 14*a* is closer to an upper edge 43' of the second panel 1' than the inner groove wall 14*b*. More specifically, a horizontal distance between the outer groove wall 14*a* and the upper edge 43' is smaller than a horizontal distance between the inner groove wall 14*b* and the upper edge 43'. The locking element 8 comprises an upper locking surface 11*a* formed in the outer surface 8*b* of the locking element 8 that cooperates with a lower locking surface 11*b* formed in the inner groove wall 14*b* and that locks the adjacent edges in a vertical direction. The upper 11*a* and the lower 11*b* locking surfaces are spaced vertically upwards from the upper surface 6*a* of the strip 6. For example, the upper 11*a* and the lower 11*b* locking surfaces may be spaced vertically upwards with a vertical locking distance VLD from the entire upper surface 6*a* or from an uppermost part of the upper surface 6*a*, e.g. the lower support surface 15 of the indentation 40. In non-limiting examples, VLD may be between 20% and 70%, e.g. 30%, 40% or 50%, of a thickness T of the floor panels in the vertical direction. The locking element 8 comprises a first locking surface 12*a* formed in the inner surface 8*a* of the locking element 8 that cooperates with a second locking surface 12*b* formed in the outer groove wall 14*a* and that locks the adjacent edges in a horizontal direction.

According to an alternative embodiment, the locking element 8 may be configured to bend during locking.

Adjacent edges comprise in locked position a first edge section 7*a* and a second edge section 7*b*. The edge sections are characterized in that a cross section of the locking groove 14 and/or a cross section of the locking element 8 varies along the adjacent edges of the panels 1, 1' which are formed with a basic geometry that is thereafter modified such that the first 7*a* and the second 7*b* cooperating edge sections are formed with different geometries and different locking functions. Here, the geometries and cross sections are specified in a side view of the panels as shown in FIGS. 5*a* and 5*b*.

The first edge section 7*a* is preferably a start section 30 that becomes active during a first initial step of the folding action and the second edge section 7*b* is preferably a subsequent section 31 or a middle section 31 that becomes active during a second step of the folding action.

It is clear that, according to an alternative embodiment, the second edge section 7*b* may be a start section 30 that becomes active during a first initial step of the folding action and that the first edge section 7*a* may be a subsequent section 31 or a middle section 31 that becomes active during a second step of the folding action. This is shown in FIG. 26*b*.

FIG. 5*a* shows a first cooperating edge section 7*a* that is used to prevent edge separation during locking and to lock adjacent edges horizontally in the locked position. The first edge section 7*a* has no vertical locking function since one of the locking surfaces, in this preferred embodiment the upper locking surface 11*a*, has been removed. The first 12*a* and the second 12*b* locking surfaces are preferably vertical and they are used to guide the second panel 1' during the vertical displacement along a vertical plane VP that intersects the upper and outer edge 21 of the first panel 1.

The first 12*a* and the second 12*b* locking surfaces may be inclined with respect to the vertical plane VP. Such geometry may be used to facilitate unlocking of the short edges with an angling action. A locking system with vertical first 12*a* and second 12*b* locking surfaces may be unlocked with a sliding action along the short edges.

FIG. 5*b* shows the second edge section 7*b* that is used to lock the adjacent edges vertically. The second edge section 7*b* cannot prevent edge separation and has no horizontal locking function since a part of the locking element 8 and/or the locking groove 14 has been removed in order to form a space S along a horizontal plane HP that allows a turning or displacement of the locking element 8 inwardly during locking when the second edge 1' is displaced vertically along the vertical plane VP. The turning of the locking element 8 is mainly caused by an upward bending of a part of the strip 6 within the second edge section **7*b* that takes place when a horizontal pressure is applied by a part of the inner groove wall 14*b* on the outer surface 8*b* of the locking element 8 during the vertical displacement of the second edge 4*d* against the first edge 4*c*. Such locking function provides major advantages. No material compression is required and the material properties of the protruding strip may be used to obtain the necessary flexibility that is needed to displace the upper part of the locking element 8 in order to bring the upper and lower locking surfaces 11*a*, 11*b*** in a locked position.

According to the present embodiment, the space S has a vertical extension substantially corresponding to a vertical extension of the inner surface **8*a* so that it extends down to the upper strip surface 6*a*. It is clear that, according to alternative embodiments (not shown), the space S may have a smaller vertical extension. Preferably, however, the space S is located at an upper part of the locking element 8. Moreover, the vertical extension is preferably larger than a vertical extension of an upper protruding part 25 formed on an outer and upper part of the locking element 8**, e.g. 1.5, 2 or 3 times larger.

In a first example, the vertical extension of the space S varies along the edge. The vertical extension may vary along the edge from a minimal vertical extension to a maximal vertical extension and then, optionally, back to a minimal vertical extension. The variation may be smooth.

In a second example, the vertical extension of the space S is constant along the edge. A first and a second wall of the space S that are spaced from each other along the edge may be vertical and parallel.

By way of example, the space S may be formed by means of milling, scraping, punching, perforation or cutting.

The strip 6 and the locking element 8 are during locking twisted along the first short edge. In the first edge section **7*a*, the strip 6 is essentially in a flat horizontal position during locking and in the second edge section 7*b* the strip 6 is bended upwards and the locking element 8** with its upper locking surface is turned and/or displaced inwardly during locking.

Optionally, or alternatively, at least portions of the strip 6 may be twisted and/or compressed during locking. For example, a portion between a lower part of the strip **6*b* and the upper strip surface 6*a* and/or the locking element 8 of the strip 6 may be twisted and/or compressed. The twisting may occur at least around an axis that is perpendicular to the vertical plane VP. The compression may occur at least inwardly in a horizontal direction that is perpendicular to the vertical plane VP. In particular, the strip 6 may be twisted in the transition regions between the first 7*a* and second 7*b* edge sections. Moreover, the strip 6 may become compressed in the second edge section 7*b* and such compression may facilitate a displacement of the locking element 8 even in rather rigid materials since the material content of the strip 6 is much larger than the material content of the locking element 8. As an example it may be mentioned that the locking element 8 may have a horizontal extension of about 4 mm and the strip 6 may protrude horizontally about 8 mm from the side wall 45 and to the inner surface 8*a*** of the locking element. At a compression of 1%, the locking element will contribute with 0.04 mm or with about ⅓ of a total compression and the strip with 0.08 mm or with about ⅔ of the total compression. Generally, the locking element in an HDF based laminate floor must be displaced horizontally with a distance of at least 0.2 mm in order to provide sufficient locking strength. 0.4 mm is even more preferred. Depending on the joint geometry and material properties about ⅓ of the necessary displacement may be accomplished with material compression and ⅔ with bending and turning or twisting of the strip and the locking element.

The upper **11*a* and lower 11*b*** locking surfaces are preferably essentially horizontal. The locking surfaces are in the showed embodiment inclined with respect to a horizontal plane HP with a locking angle LA that is about 20 degrees. The locking angle LA is preferably 0-45 degrees. Locking surfaces with low locking angles are preferred since they provide a stronger vertical locking. The most preferred locking angle LA is about 5-25 degrees. However it is possible to reach sufficient locking strength in some applications with locking angles between 45 and 60 degrees. Even higher locking angles may be used but such geometries will decrease the locking strengths considerably.

FIGS. **6*a* and 6*b* show the first 7*a* and the second 7*b* edge sections in a locked position. The first edge section 7*a* is configured such that the outer groove wall 14*a* of the locking groove 14 and the inner surface 8*a* of the locking element 8 are in contact with each other along a horizontal plane HP and lock the first short edge and the second short edge horizontally and the second edge section 7*b* is configured such that along the same horizontal plane HP there is a space S between the outer groove wall 14*a* of the locking groove 14 and the inner surface 8*a* of the locking element 8. The space S allows that the locking element 8 may be turned and/or displaced inwardly. The first edge section 7*a* is also preferably configured such that there is no vertical locking and no turning and/or displacement of the locking element 8 since at least one of the locking surfaces 11*a*, 11*b* has been removed and the second edge section 7*b* is configured such that it comprises upper 11*a* and lower 11*b* locking surfaces that lock the edges vertically and upper 25 and lower 26 protruding parts that during locking press, displace and/or turn the locking element 8** inwardly. Also compression and/or twisting are possible.

FIG. **6*a* shows the first edge section 7*a* in a locked position. The first locking surface 12*a* formed on the inner surface 8*a* of the locking element 8 is in contact with the second locking surface 12*b* formed on the inner groove wall 14*a* of the locking groove 14. The first 12*a* and the second 12*b* locking surfaces lock the adjacent edges horizontally and prevent a horizontal separation of the panels 1, 1'**.

FIG. **6*b* shows the second edge section 7*b* in a locked position. The upper locking surface 11*a* formed on the outer surface 8*b* of the locking element 8 is in contact with the lower locking surface 11*b* formed on the inner groove wall 14*b* of the locking groove 14. The upper 11*a* and lower 11*b* locking surfaces lock the adjacent edges vertically and prevent a vertical separation of the panels 1, 1'**.

According to the present embodiment, there is an intermediate cavity 47 provided between a portion of the upper support surface 16 and a portion of the upper strip surface **6*a*. Since a thickness of the strip 6 in this area is smaller than at the location of the lower support surface 15, the strip may be bended more easily. The upper support surface 16 preferably is a planar surface and the projection 50 preferably has a constant thickness in a direction perpendicular to the vertical plane VP as measured from its surface layer 2. The thickness is preferably also constant along the edge of the second panel 1'**.

According to an alternative embodiment (not shown), however, the thickness of the projection 50 may vary in a direction perpendicular to the vertical plane VP. Thereby, least a portion of the projection 46 may extend below the lower support surface 15.

The space S is an essential feature in this embodiment of the disclosure. A horizontal extension of the space S along a horizontal plane HP that intersects the upper 11*a* and lower 11*b* locking surfaces preferably exceeds a horizontal distance HD of the upper and lower locking surfaces. Here, the horizontal extension of the space S may be a maximal horizontal extension.

Figure 7A:
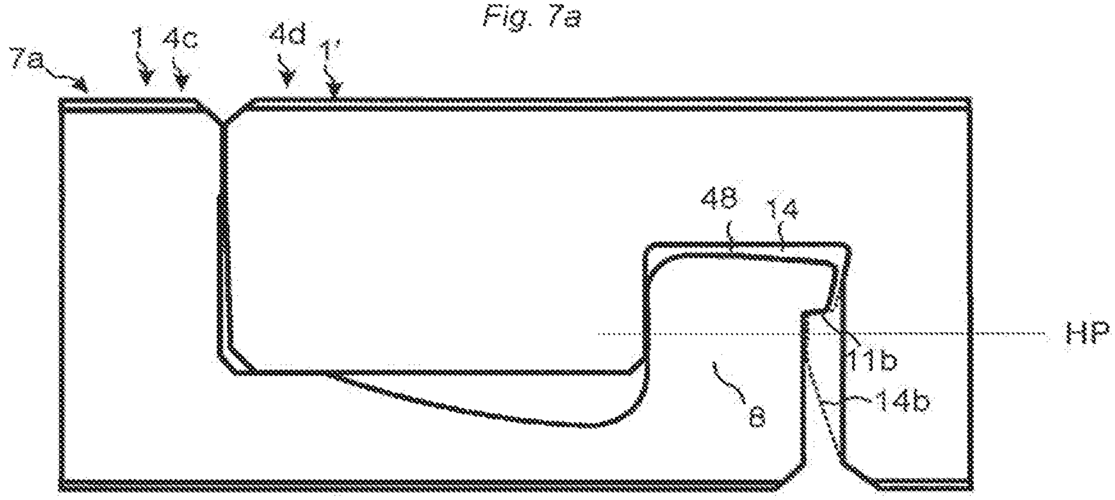
FIGS. 7*a*-7*d* illustrate alternative embodiments of the first and second edge sections.
Figure 7B:
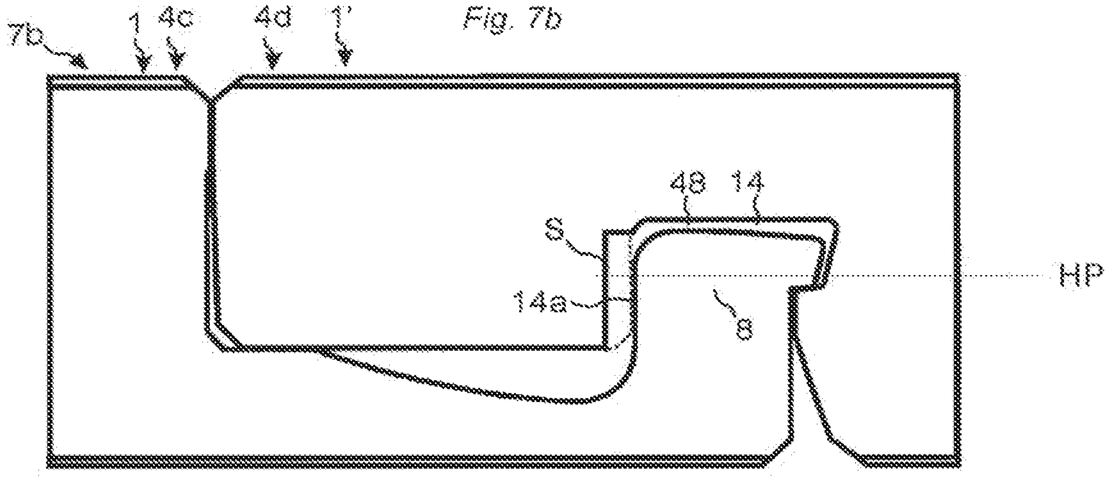

FIG. 7*a* shows a preferred embodiment of the first edge section 7*a* where a part of the inner groove wall 14*b* and the lower locking surface 11*b* have been removed. FIG. 7*b* shows a preferred embodiment of the second edge section 7*b* where a part of the outer groove wall 14*a* has been removed in order to form the space S that allows the locking element 8 to turn inwardly during locking.

According to the present embodiment, the space S has a vertical extension substantially corresponding to a vertical extension of the outer groove wall 14*a* so that it extends up to the upper groove wall 14*c*. It is clear that, according to alternative embodiments (not shown), the space S may have a smaller vertical extension. Preferably, however, the space S is located adjacent to the upper groove wall 14*c*. Moreover, the vertical extension is preferably larger than a vertical extension of the upper protruding part 25, e.g. 1.5, 2 or 3 times larger.

The vertical extension of the space S may vary or may be constant along the edge as explained above in relation to the embodiment in FIGS. 5*a-b*.

Figure 7C:
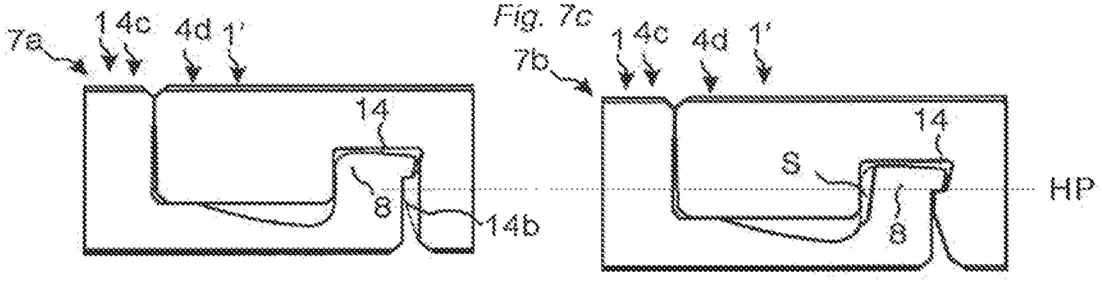
Figure 7D:
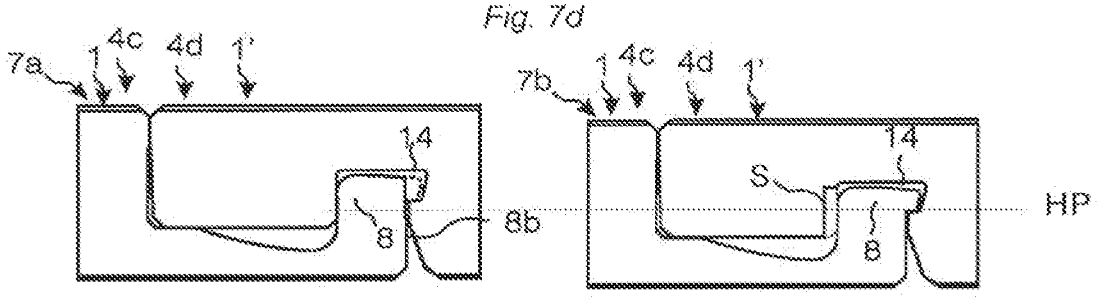

FIGS. 7*c* and 7*d* show that the embodiments shown in FIGS. 5*a*, 5*b* and 7*a*, 7*b* may be combined. As shown in FIG. 7*c*, the first edge section 7*a* configured to prevent edge separation and to lock horizontally may be formed according to FIG. 7*a* and the second edge section 7*b* comprising the space S and configured to bend and to lock vertically may be formed according to FIGS. 5*b* and 6*b*. Alternatively, as shown in FIG. 7*d*, the first edge 7*a* section may be formed according to FIG. 5*a* or 6*a* and the second edge section 7*b* may be formed according to FIG. 7*b*.

It is stressed that any of the additional and/or optional features described above in relation to the embodiments in FIGS. 5*a*-5*b*, 6*a*-6*b* and 7*a*-7*b* also may be combined with the embodiment according to FIGS. 7*c* and 7*d*.

In any of the embodiments in the present disclosure, there may also be an upper cavity 48 between the upper groove wall 14*c* and the upper surface 8*c* in a locked position of the first 1 and second 1' panel. The upper cavity 48 may be located in the second edge second 7*b* and optionally also in the first edge section 7*a*. Thereby, there is more space provided in the second edge section 7*b* for the upwardly bending locking element 8.

Additionally, it is clear that there may be at least one first edge section 7*a* and at least one second edge section 7*b*. In particular, there may be a plurality of first 7*a* and second 7*b* edge sections along the edge. The first 7*a* and second 7*b* edge sections may be arranged alternately. In particular, the edge sections may be arranged in a sequence along the edges such as {7*a*, 7*b*, 7*a*}, {7*a*, 7*b*, 7*a*, 7*b*, 7*a*} or {7*a*, 7*b*, 7*a*, 7*b*, 7*a*, 7*b*, 7*a*} with a first edge section 7*a* at the corners of the edges. Alternatively, there may be a second edge section 7*b* at the corners of the edges so that a sequence such as {7*b*, 7*a*, 7*b*}, {7*b*, 7*a*, 7*b*, 7*a*, 7*b*} or {7*b*, 7*a*, 7*b*, 7*a*, 7*b*, 7*a*, 7*b*} is provided along the edges.

Figure 8A:
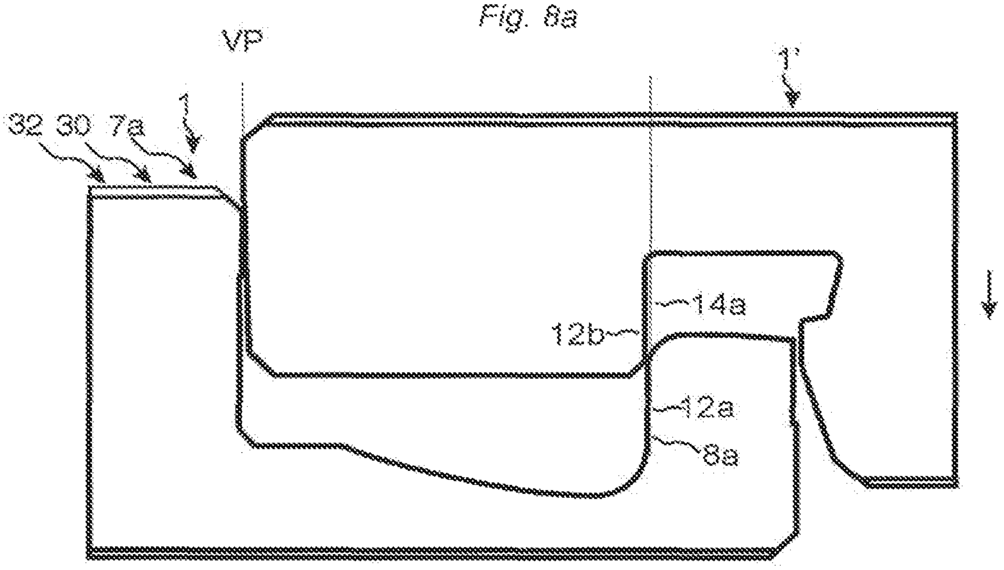
FIGS. 8*a*-8*c* illustrate a vertical displacement of a first edge section according to an embodiment.
Figure 8B:
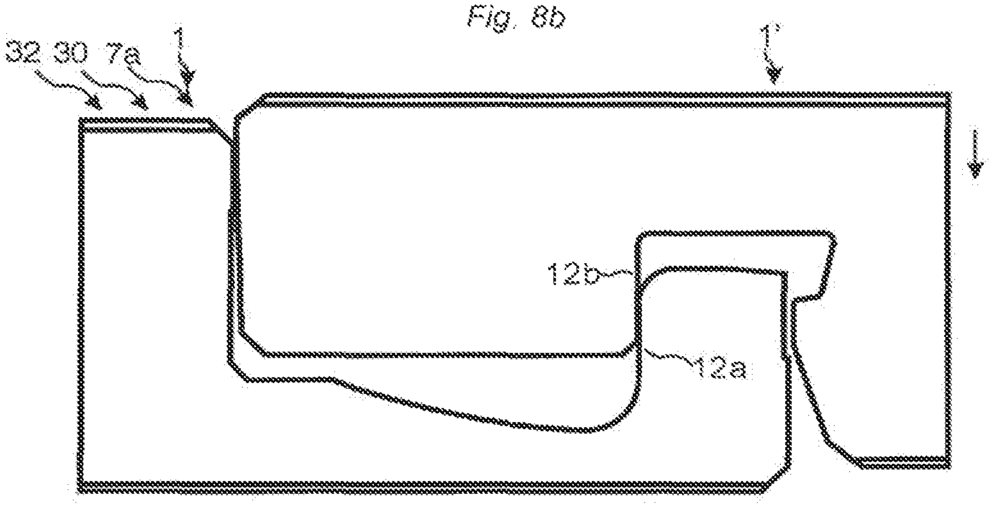
Figure 8C:
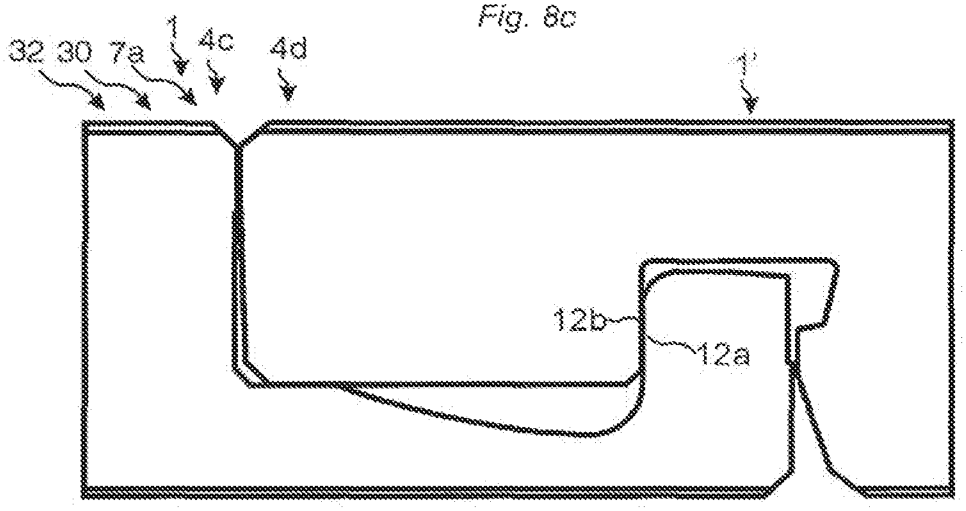

FIGS. 8*a*-8*c* show vertical displacement of the first edge section 7*a* that according to the present embodiment constitutes a start section 30 and that is active from an initial first step of the folding action. The embodiments in FIGS. 8*a*-8*c* and 9*a*-9*d* may be understood in conjunction with FIG. 13*a*. The end section 32 that is active during the final step of the folding action is preferably also formed with geometry similar or identical to the first edge section 7*a*. The start 30 and end 32 sections are arranged at a first and a second corner section, respectively, of the first 1 and second 1' panels, adjacent to their long edges 4*a*, 4*b*. A part of the inner surface 8*a* of the locking element 8 is formed as a first locking surface 12*a* that is essentially parallel with a vertical plane VP and a part of the outer groove wall 14*a* is formed as a cooperating second locking surface 12*b* that preferably is essentially parallel with the vertical plane VP. The first and the second locking surfaces 12*a*, 12*b* guide the edges of the panels 1, 1' during the folding action and counteract separation forces that are caused by the second edge section 7*b* that becomes active in a second step of the folding action when the major part of the first section 7*a* is in a horizontally locked position with the first 12*a* and the second 12*b* locking surfaces in contact with each other as shown in FIG. 8*b*. FIG. 8*c* shows the adjacent edges in a final locked position.

Figure 9A:
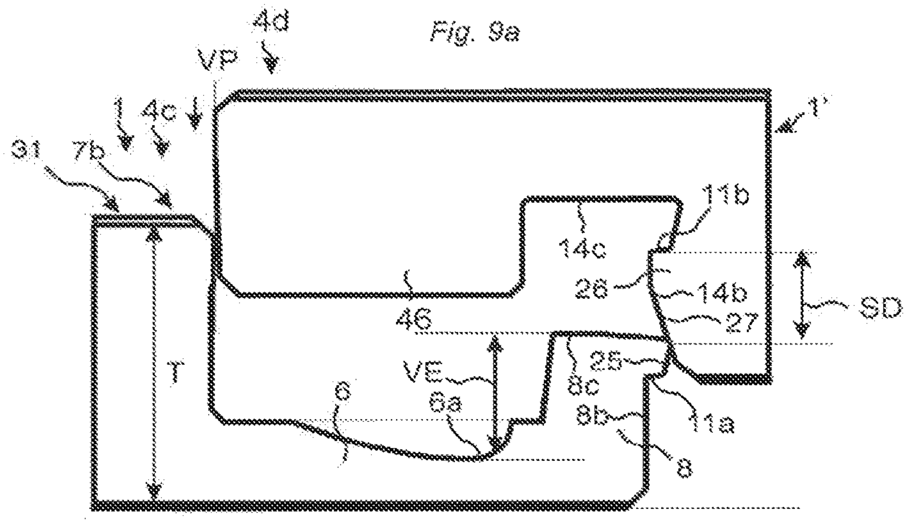
FIGS. 9*a*-9*e* illustrate a vertical displacement of a second edge section according to an embodiment.
Figure 9B:
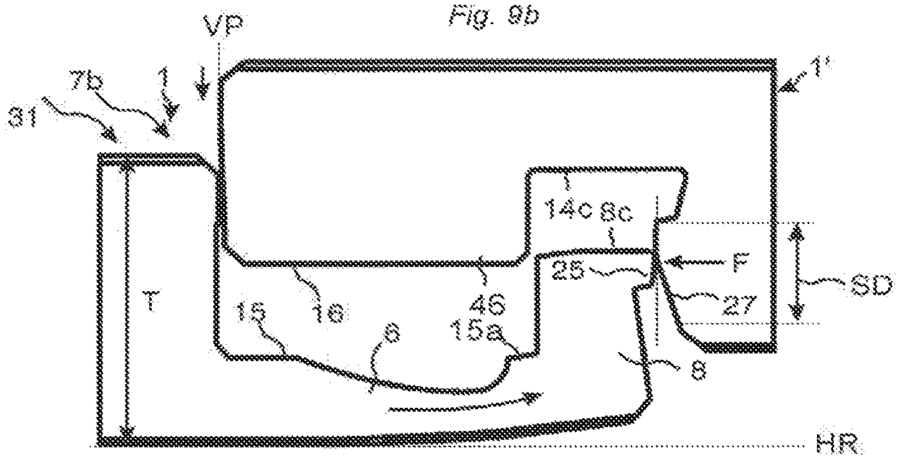

FIGS. 9*a*-9*d* show locking of the second edge section 7*b* that according to the present embodiment constitutes a middle section 31 and that is active from a second step of the folding action when the guiding and locking surfaces 12*a*, 12*b* of the first edge section 7*a* are active and in contact with each other. FIG. 9*a* shows that a horizontally extending upper protruding part 25 is formed on the outer and upper part of the locking element 8 and above the upper locking surface 11*a* and is in initial contact with a sliding surface 27 formed on a lower part of the inner groove wall 14*b*. The sliding surface 27 extends essentially vertically upwards to a horizontally extending lower protruding part 26 formed below the lower locking surface 11*b*. The sliding surface 27 will during the vertical displacement create a pressure force F against the upper protruding part 25 and this will press the locking element 8 inwardly towards the upper edge of the first panel 1 and bend the strip 6 upwards as shown in FIG. 9*b*.

The pressure against the locking element 8 will create separation forces tending to displace the second panel 1' horizontally away from the first panel 1, but that are counteracted by the first and the second locking surfaces 12*a*, 12*b* of the first edge section 7*a*. The pressure that is needed to lock the edges may be reduced if the sliding surface 27 is essentially vertical and extends over a substantial vertical sliding distance SD, measured vertically over a distance where the inner groove wall 14*b* is in contact with the outer surface 8*b* of the locking element during the vertical displacement, and/or if the vertical extension VE of the locking element 8, defined as the vertical distance from the lowest point on the upper surface of the strip 6*a* and to the upper surface 8*c* of the locking element 8, is large. Preferably, the inclination of the sliding surface 27 is 10-30 degrees in relation to a vertical plane VP and the vertical sliding distance SD is 0.2-0.6 times the size of floor thickness T. A vertical sliding distance SD of 0.3-0.5 times the size of floor thickness T is even more preferred. Preferably, the vertical extension VE of the locking element 8 is 0.1-0.6 times the size of floor thickness T. 0.2*T-0.5*T is even more preferred.

An upward bending of a strip is suitable for wood based cores, such as for example HDF, since the fibres in the upper part of the strip that are sensitive to pulling forces and shear stress will be compressed and the fibres in the lower and stronger part of the strip that are more resistant to pulling forces and shear stress will be stretched. A considerable amount of bending deflection 29 may be reached and a strip 6 that extends horizontally from the upper edge about 8 mm or with the same distance as the floor thickness T may be bended upwards about 0.05-1.0 mm, e.g. 0.1 mm or 0.5 mm. Here, a bending deflection 29 is defined as a vertical distance, in a direction perpendicular to the horizontal plane HP, from a horizontal plane HR being parallel and essentially coinciding with the rear side 60 of the first panel 1 in an unlocked state to an outermost and lowermost part of the strip 6. Thus, the bending deflection 29 typically varies along the edge of the first panel 1 and also varies during the various stages of the locking. A maximal bending deflection 29 may be located in a middle portion of a second edge section 7*b* along a length direction of the edges.

Figure 9C:
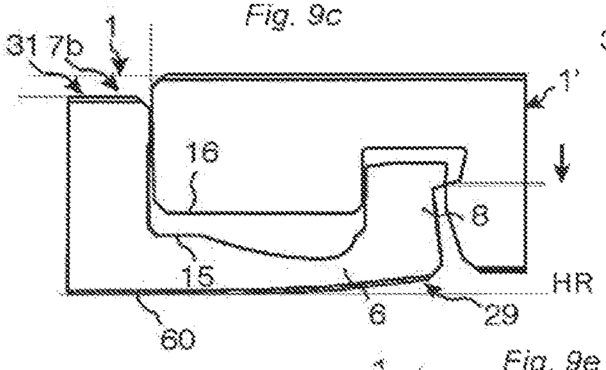
Figure 9D:
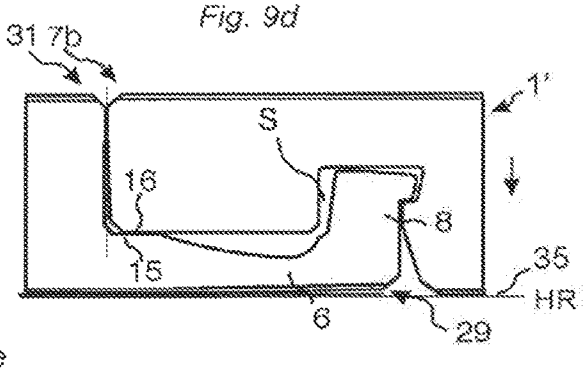

FIG. 9*c* shows an embodiment according to which the upper and lower locking surfaces 11*a*, 11*b* will start to overlap each other already when the upper surfaces of panels 1, 1' are still spaced vertically. This means that the strip 6 will pull the second panel 1' comprising an upper support surface 16 towards a lower support surface 15 formed on the edge of a first panel 1 to a final locked position and this will reduce the pressure force that is required to lock the panels 1, 1'. An additional advantage is that the vertical locking may be made with a pretension such that the strip 6 is slightly bended upwards in locked position as shown in FIG. 9*d*. The remaining bending deflection 29 in the locked position may be about 0.05-0.30 mm, e.g. 0.1-0.2 mm, when the lower and upper support surfaces 15, 16 are in contact with each other. According to this embodiment, the locking system is configured such that in the locked position a middle section 31 comprises a strip 6 that is upwardly bended compared to its unlocked position and a start section 30 that comprises a strip which is essentially in a similar locked position than in an unlocked position. It is understood that there may be transition parts between the first 7*a* and second 7*b* edge sections wherein the strip is upwardly bended. According to a different embodiment, the strip of the start section may even be slightly bended backwards in locked position.

Another advantage is that problems related to thickness tolerances of the panels may be avoided since even in the case that the second panel 1' is thicker than the first panel 1 and normally will hit the sub floor 35 before the upper surfaces are in the same horizontal plane, locking may be made with offset upper edges where the surface of the second edge is above the first edge and the strip will pull the panels to a correct position with horizontally aligned upper surfaces and upper and lower support surfaces 15, 16 in contact with each other. Such locking function is also favorable when the floor panels are installed on a soft underlay, such as foam, and a counter-pressure from the sub floor cannot be used to prevent a downward bending of the strip 6.

A strip formed in soft materials such as an LVT core comprising thermoplastic materials and filler may not snap back towards the initial position after the locking. This may be solved with a joint geometry where the upper groove wall 14*c* is formed to be in contact with the upper surface 8*c* of the locking element 8 during the final stage of the locking action such that the locking element 8 and the strip 6 are pressed downwards. The locking system may also be formed with an outer and lower support surface 15*a* that cooperates with the projection 46 during locking in order to press the strip 6 downward to or towards its initial position as shown in FIG. 9*b*.

Figure 9E:
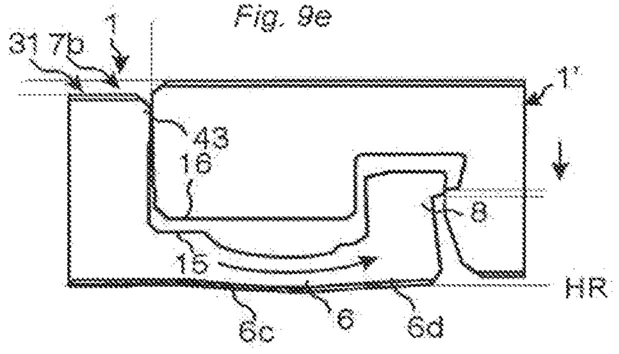

FIG. 9*e* shows that the strip 6 may be formed such that an inner part 6*c* is bended slightly downwards and an outer part 6*d* is bended slightly upwards. Such strip bending and compression will also bend and displace the locking element 8 inwards toward the first upper edge 43. The upper and lower locking surfaces 11*a*, 11*b* may even in this embodiment overlap each other during locking when the first and the second panels are still vertically displaced in relation to the final locked position with the second panel 1' spaced vertically upward from the first panel 1.

Figure 10A:
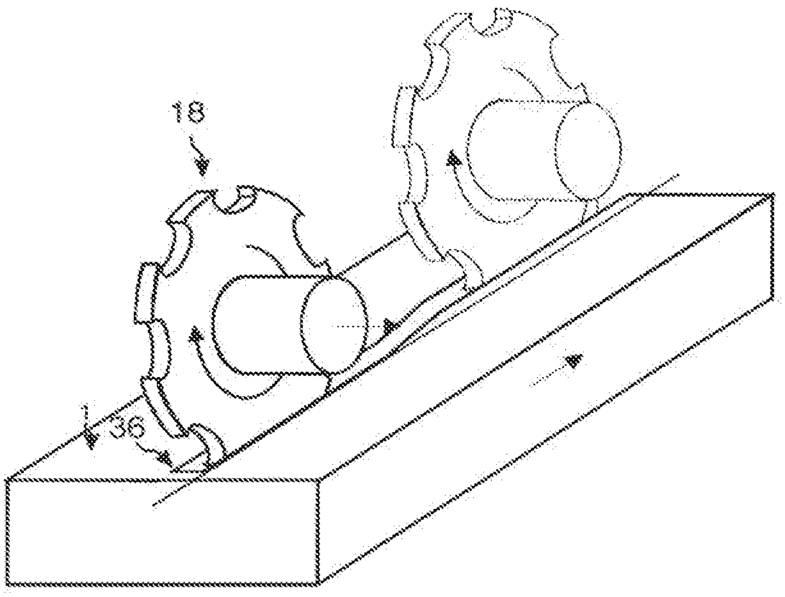
FIGS. 10*a*-10*c* illustrate jumping tool heads and rotating carving tools according to an embodiment.
Figure 10B:
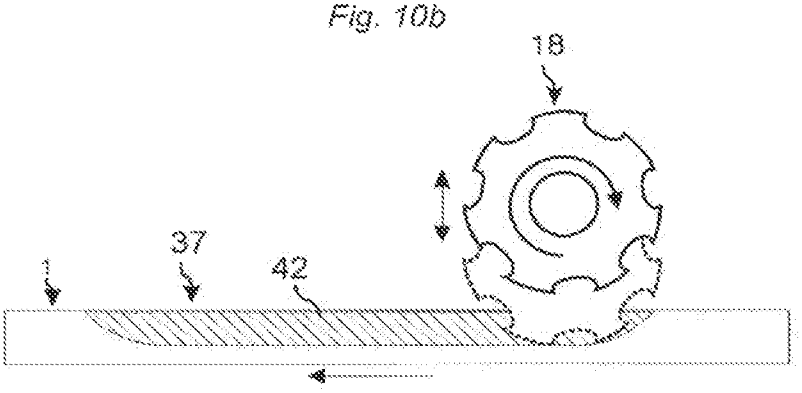
Figure 10C:
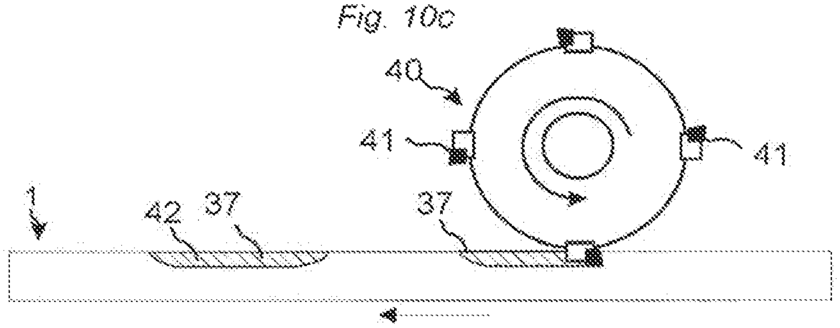
Figure 11A:
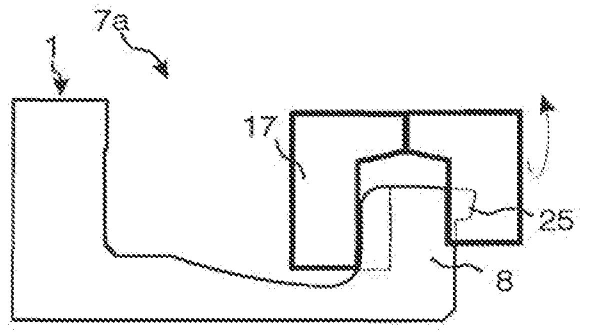
FIGS. 11*a*-11*f* illustrate forming of an edge section with jumping tool heads according to an embodiment.
Figure 11B:
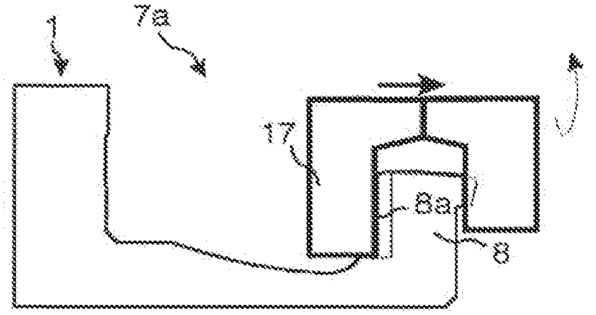
Figure 11C:
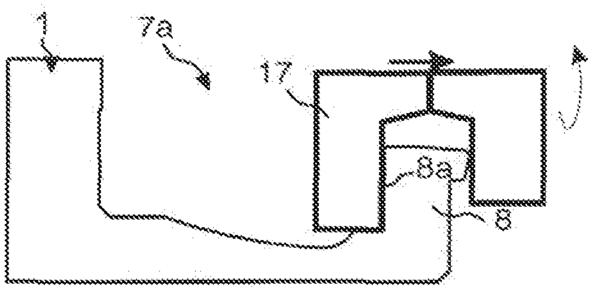
Figure 11D:
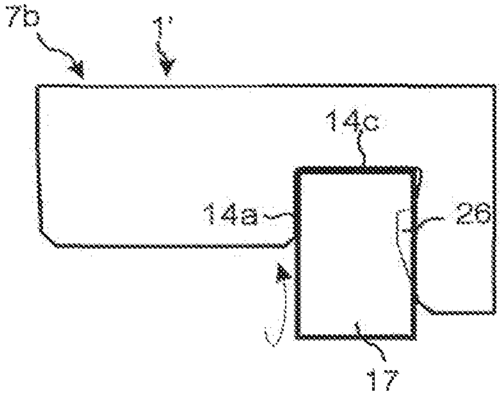
Figure 11E:
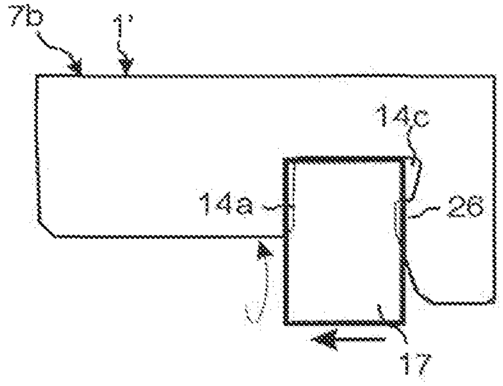
Figure 11F:
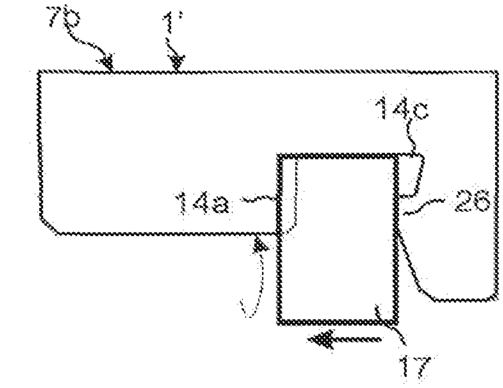

FIGS. 10*a* and 10*b* show that rotating jumping tool heads 18 may be displaced horizontally and may be used to form cavities 42, nonlinear grooves 36 or may be displaced vertically and may be used to form grooves 37 with different depths in a panel 1. FIG. 10*c* shows another cost efficient method to form cavities 42 or grooves 36, 37 with a rotating carving tool 40. A tool rotation of the rotating carving tool 40 is synchronized with a displacement of the panel 1 and each tooth 41 forms one cavity 42 at a predetermined position and with a predetermined horizontal extension along an edge of a panel 1. It is not necessary to displace the carving tool 40 vertically. A carving tool 40 may have several sets of teeth 41 and each set may be used to form one cavity. The cavities 42 may have different cross sections depending on the geometry of the teeth. The panel 1 may be displaced with or against the tool rotation.

This production technology may be used to form the first 7*a* and the second 7*b* edge sections.

FIGS. 11*a*-11*f* show that a rotating tool 17 may be displaced horizontally along the locking element 8 or the locking groove 14 and a first 7*a* and a second 7*b* edge section will be formed when the tool initially removes the upper protruding part 25 of the locking element and then a part of the inner surface 8*a* of the locking element, or initially removes the lower protruding part 26 of the locking groove 14 and then a part of the outer groove wall 14*a* of the locking groove 14. This method may be used to form the edge sections in a very efficient way. The horizontal displacement of the rotation tool 17 may be at or less than about 1.0 mm, e.g. 0.5 mm or 0.2 mm.

Figure 12A:
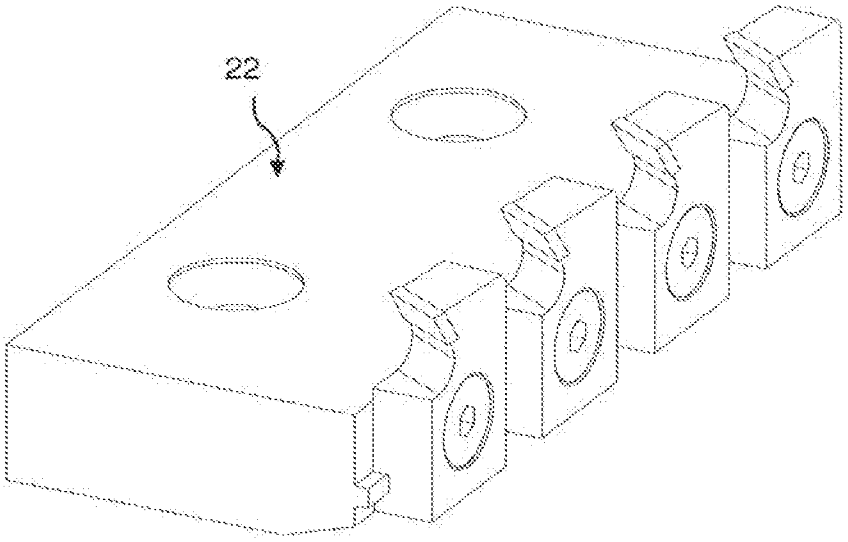
FIGS. 12*a*-12*b* illustrate forming with carving tools according to different embodiments.
Figure 12B:
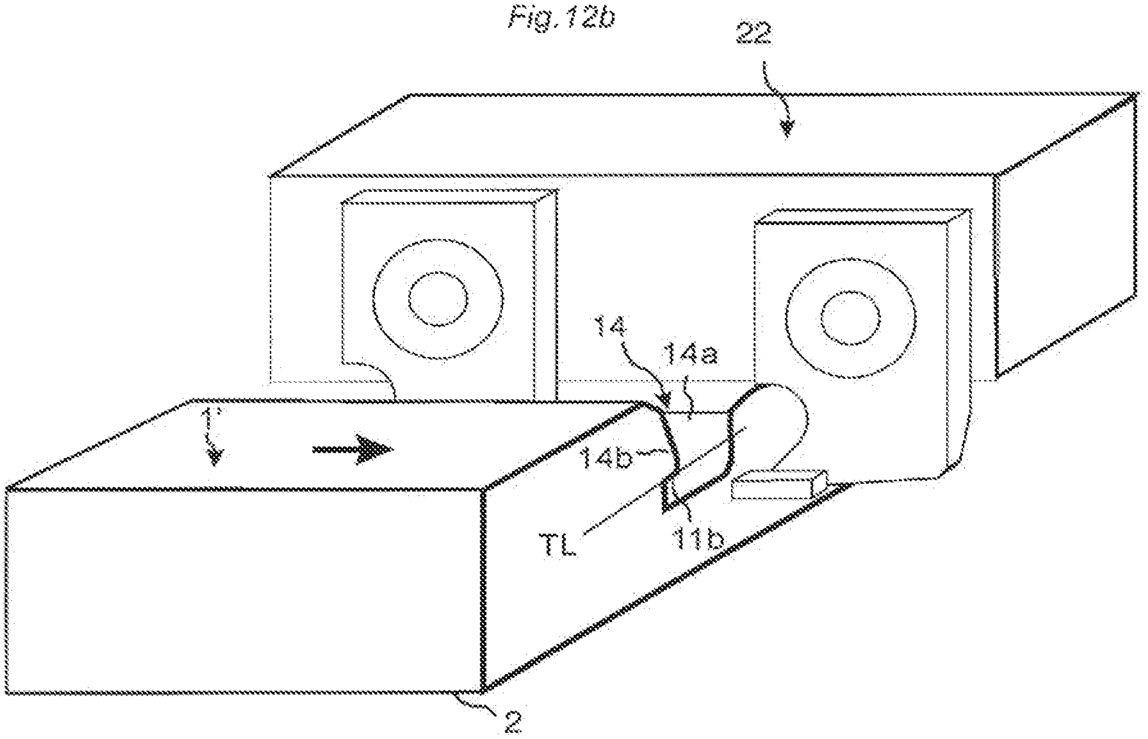

FIGS. 12*a*-12*b* show a fixed carving tool 22 and a part of the edge of the second panel 1' that is shown with the surface layer 2 pointing downwards. Carving may be used to form an essentially horizontal locking surface 11*b* in an inner groove wall 14*b* of the locking groove 14 even when the locking surface 11*b* comprises a tangent line TL that intersects the outer groove wall 14*a*. A more detailed description of carving may be found in WO 2013/191632.

Figure 13A:
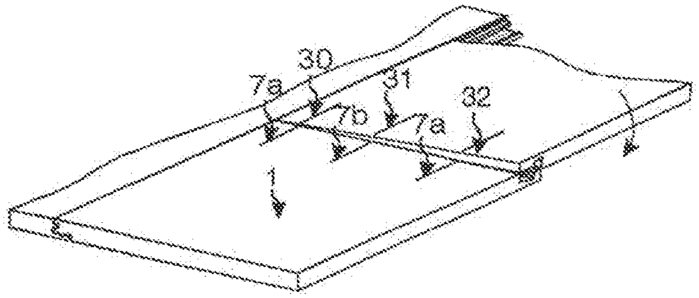
FIGS. 13*a*-13*e* illustrate a panel edge comprising a first and a second edge section according to an embodiment.
Figure 13B:
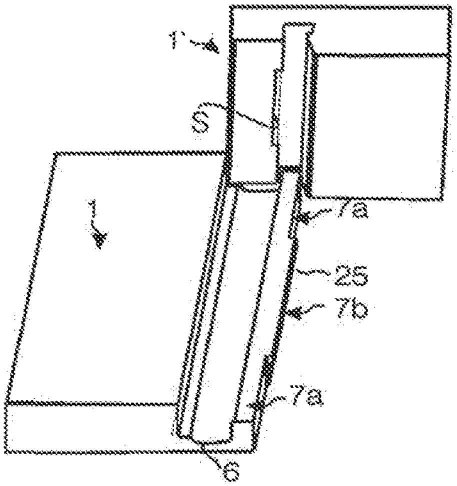
Figure 13C:
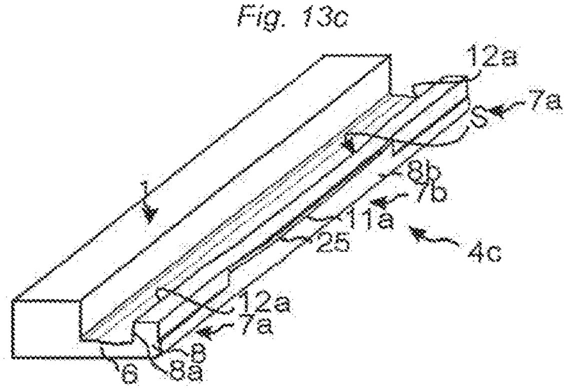
Figure 13D:
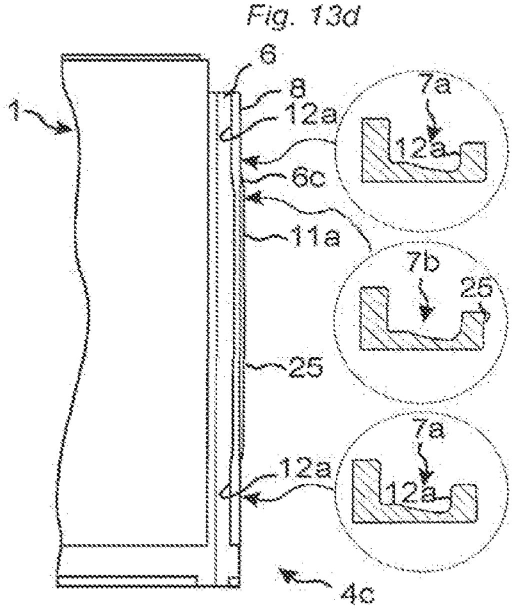
Figure 13E:
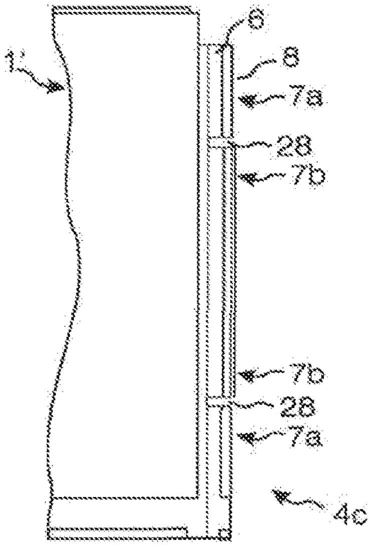

FIG. 13*a* shows a vertical folding of a second panel 1' against a first panel 1, comprising a locking system according to FIGS. 8*a-c* and 9*a-d*. The edges comprise a start section 30 that is formed as a first section 7*a*, a middle section 31 that is formed as a second section 7*b* and an end section 32 that is formed as a first section 7*a*. The first 12*a* and second 12*b* locking surfaces are guiding surfaces of the start section that prevent separation and the panels 1, 1' are folded together with upper edges in contact. FIG. 13*b* shows an embodiment of a short edge 4*c* of the first panel 1 comprising a middle section being a second edge section 7*b* and having an upper protruding part 25 with an upper locking surface 11*a* and a first edge section 7*a* on each side of the middle section 7*b* comprising guiding surfaces 12*a*. A part of the inner surface 8*a* of the locking element 8 has been removed at the middle section 7*b* in order to form a space S that allows an inward turning of the locking element 8, cf. FIG. 5*b*. FIG. 13*c* is a top view of the short edge 4*c* of the first panel 1 as shown in FIGS. 13*a* and 13*b* and shows that a part of the strip 6 at a transition part 6*c*, located between the first 7*a* and the second 7*b* edge section, is twisted during the vertical folding since the strip is flat in the first edge section 7*a* and bended upwards in the second section 7*b*. The twisting increases the locking pressure that has to be used to lock the edges. Twisting may be reduced or even eliminated if needed with a horizontal cavity 28 formed in the strip 6 between the first 7*a* and the second 7*b* edge sections as shown in FIG. 13*d*.

Figure 14A:
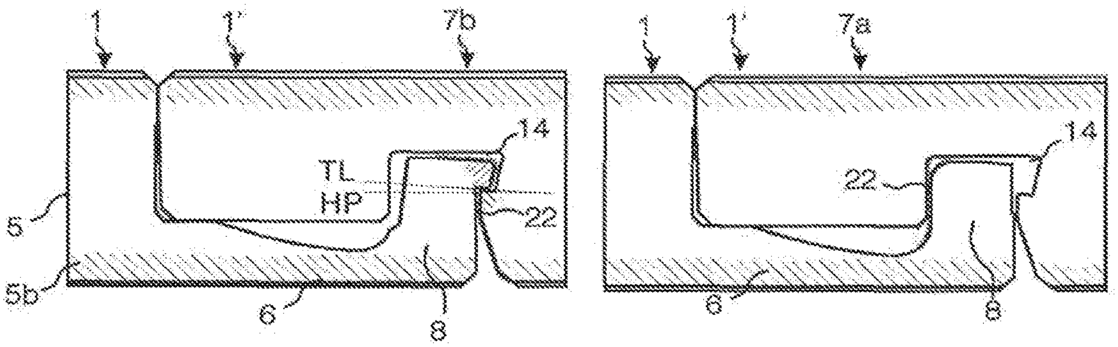
FIGS. 14*a*-14*e* illustrate different embodiments of locking systems and their formation.

FIGS. 14*a*-14*e* show different embodiments of the disclosure. The embodiments in FIGS. 14*a-e* may be combined with any of the embodiments of the disclosure. FIG. 14*a* shows floor panels comprising an HDF core 5 and a strip 6 which is essentially formed in the lower part 5*b* of the core 5 that has a higher density than the middle part. At least parts of the locking groove 14 and/or the locking element 8 may be coated with a friction reducer 22 in order to reduce friction during locking. For example, the friction reducer 22 may comprise wax. Other exemplary friction reducing substances include oils. Parts of the locking groove 14 and/or the locking element 8 may be impregnated with a reinforcement agent, e.g. resins, in order to reinforce parts adjacent to upper and lower locking surfaces 11*a*, 11*b*. Exemplary reinforcement agents include a thermoplastic, a thermosetting resin or a UV curing glue.

Figure 14B:
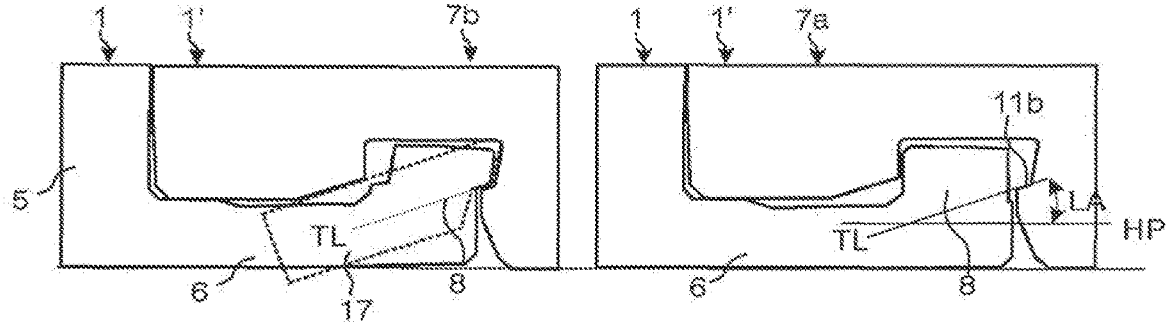

FIG. 14*b* shows a locking system formed in a rather soft core 5. The strip 6 and the locking element 8 have been made larger. A lower essentially horizontal locking surface 11*b* may be formed by an inclined rotating tool 17 and with a locking angle LA that may be as low as 20 degrees. It is clear that other locking angles LA are equally conceivable. In non-limiting examples, a locking angle LA between 0° and 45° may be formed by the inclined tool 17.

Figure 14C:
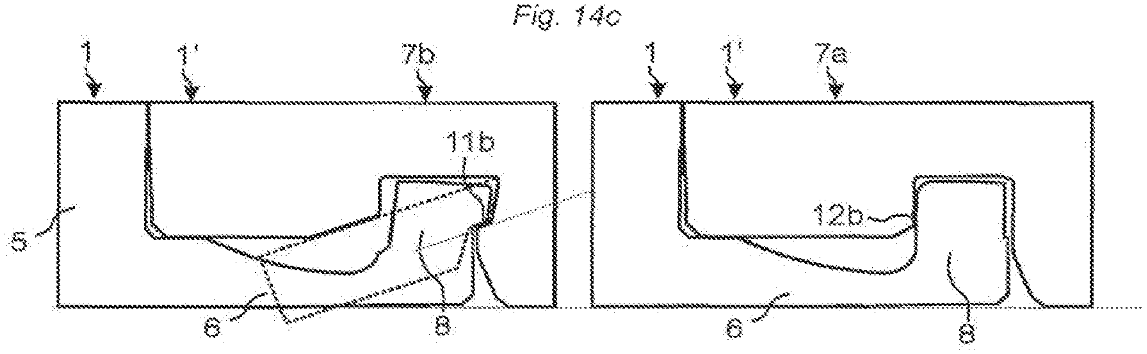

FIG. 14*c* shows that forming of the lower locking surface 11*b* may be made with a rotating jumping tool that only removes material mainly within the second edge section 7*b*. An advantage is that the lower locking surface 11*b* may be formed with a rotating tool that will not reduce the vertical extension of the second locking surface 12*b*.

Figure 14D:
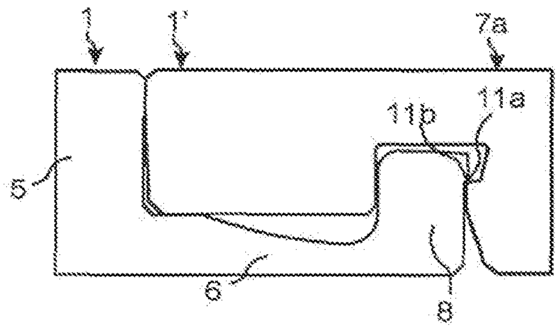

FIG. 14*d* shows that in some embodiments the first section 7*a* may comprise locking means 11*a*, 11*b* that lock the edges vertically, preferably mainly by material compression. The locking means may be locking surfaces 11*a*, 11*b*. In general, the edge sections 7*a*, 7*b* may comprise complementary locking means as described in FIGS. 1*a*-1*e*, for example a small tongue 10 and groove 9 at the adjacent edges as shown in FIG. 1*a*.

Figure 14E:
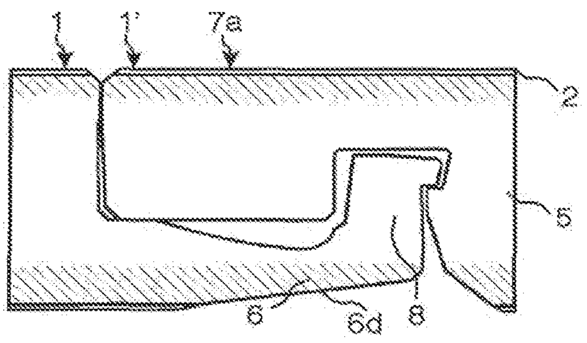

FIG. 14*e* shows that panels 1, 1' with different thicknesses may be produced with the same tool position in relation to the surface layer 2. This means that the strip 6 will be thicker and more rigid in thicker panels. This may be compensated by removal of materials at the lower part 6*d* of the strip 6 and all panels may comprise a strip 6 with similar flexibility and deflection properties.

Figure 15A:
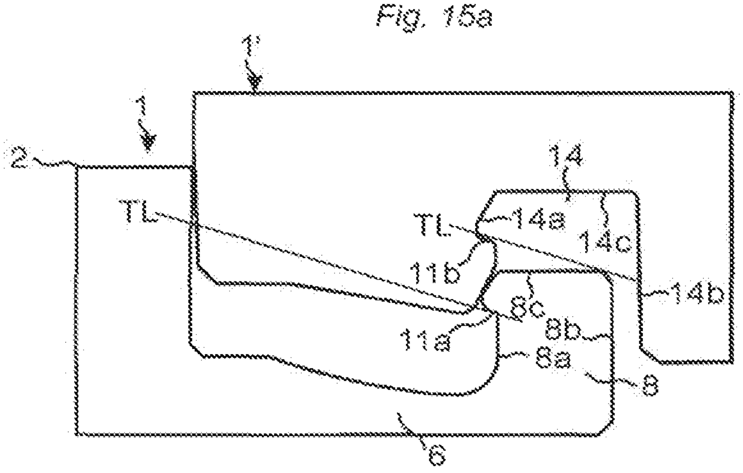
FIGS. 15*a*-15*d* illustrate a locking system according to a second principle.
Figure 15B:
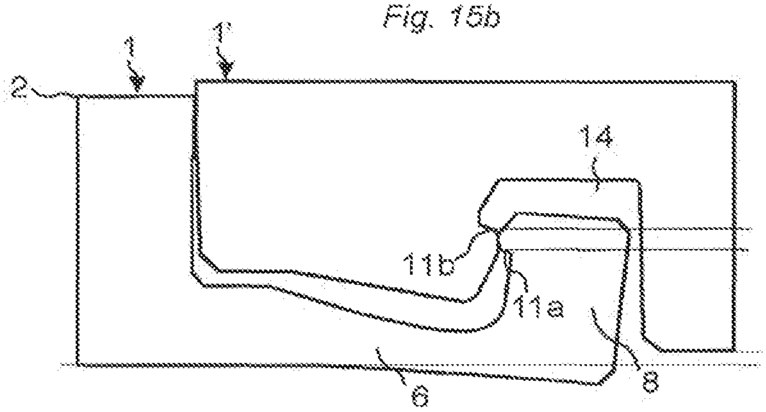
Figure 15C:
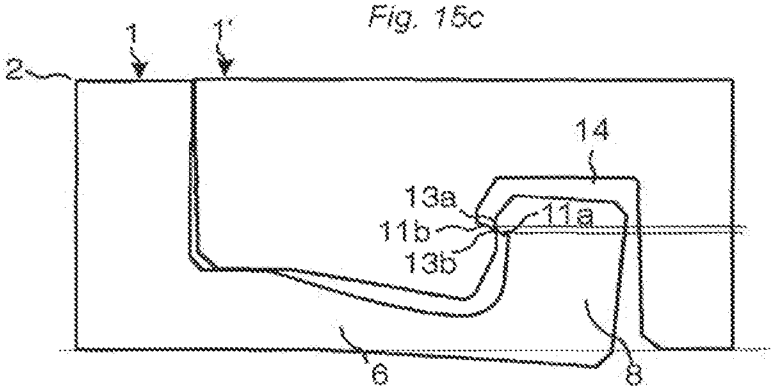
Figure 15D:
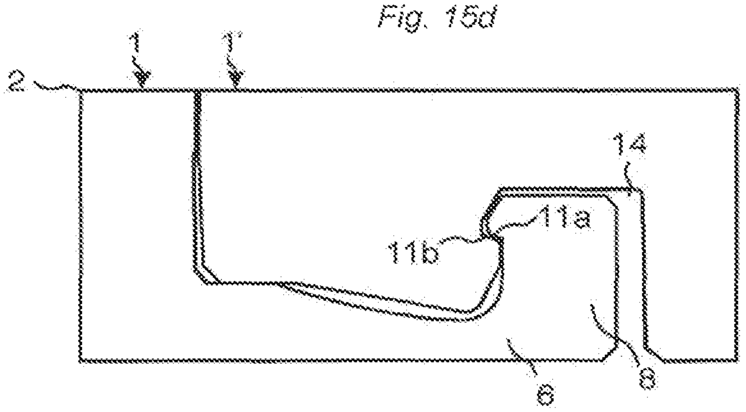

FIGS. 15*a*-15*d* show a second principle of the disclosure. The locking element 8 comprises an upper locking surface 11*a* formed at the inner surface 8*a* and the locking groove 14 comprises a lower locking surface 11*b* formed in the outer groove wall 14*a*. A strong vertical locking may be accomplished if the locking surfaces 11*a*, 11*b* are essentially horizontal, e.g., within 20 degrees of horizontal. Preferably, a tangent line TL of the upper locking surface 11*a* intersects an adjacent wall of the upper edge. Moreover, a tangent line TL of the lower locking surface 11*b* preferably intersects an adjacent wall of the locking groove 14. Locking is accomplished with a downward bending of the strip 6 wherein the locking element 8 is turned outwards as shown in FIG. 15*b*. A problem is that the strip 6 may still be in a backward bended position and the locking surfaces 11*a*, 11*b* may be spaced vertically when the upper edges of the panels 1, 1' are aligned horizontally as shown in FIG. 15*c*. An upper guiding surface 13*a* is therefore formed as an extension of the upper locking surface 11*a* and a lower guiding surface 13*b* is formed as an extension of the lower locking surface 11*b*. The locking surfaces 11*a*, 11*b* and the guiding surfaces 13*a*, 13*b* are configured such that the guiding surfaces 13*a*, 13*b* overlap each other during locking and during the downward bending of the strip 6 when the upper surface 2 of the second panel 1' is spaced vertically upwards from the upper surface 2 of the first panel 1.

Figure 16A:
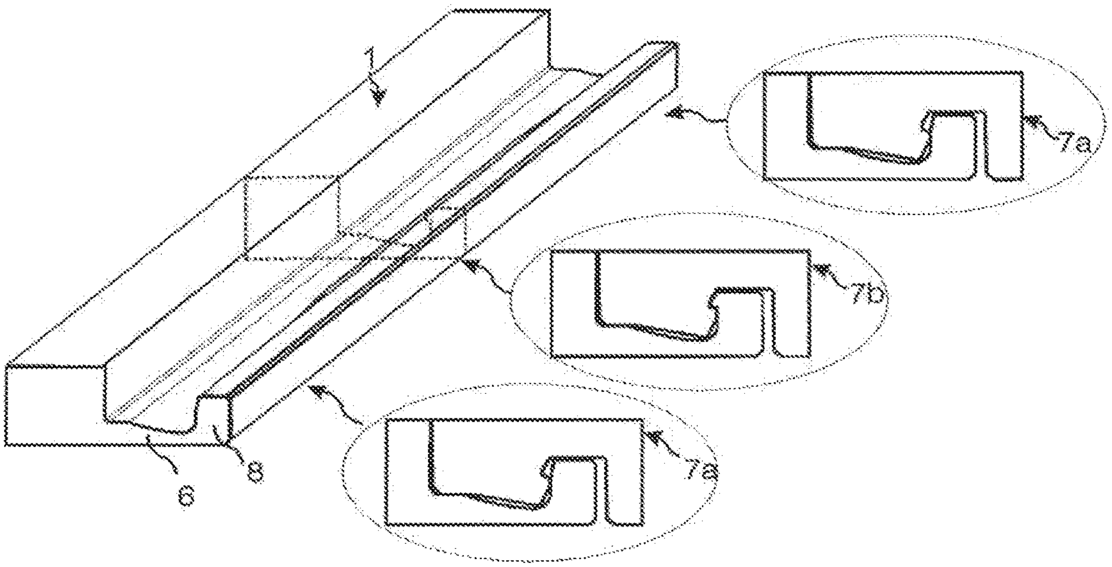
FIGS. 16*a*-16*c* illustrate a locking system edge section according to the second principle.
Figure 16B:
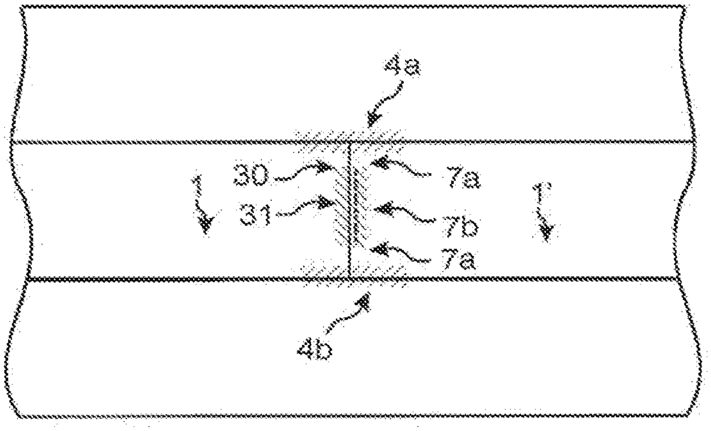
Figure 16C:
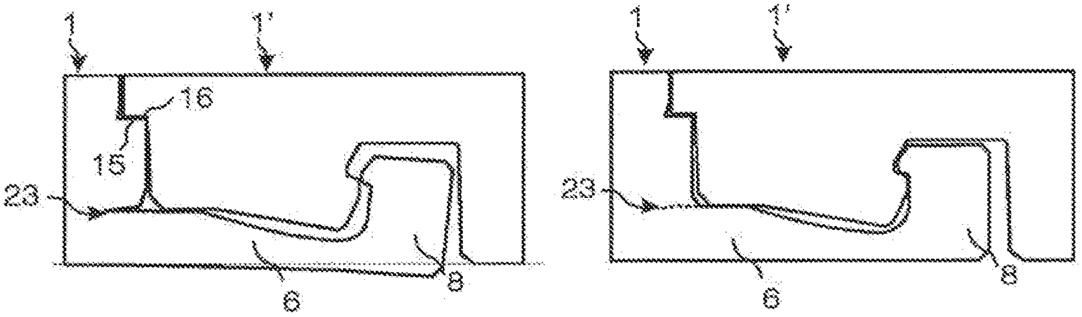

FIGS. 16*a*-16*b* show that a locking system according to the second principle may comprise a first 7*a* and a second edge section 7*b* such that the geometry of the locking element 8 and/or the locking groove 14 varies along the edge. Preferably, the first edge section 7*a* comprises only locking means that lock the edges in a horizontal direction and the second edge section 7*b*, that according to this embodiment is a middle section 31, comprises horizontal and vertical locking means. According to the present embodiment, a start section 30 and an end section 32 both are first edge sections 7*a*. An advantage of the present embodiment is that the locking may be made with a lower pressure force that only has to be applied when the second panel 1' is folded to a rather low locking angle that may be about 5 degrees or lower. The removal of the upper 11*a* and/or lower 11*b* locking surfaces within the first edge sections 7*a* may only have a marginal negative influence on the vertical locking strength since the part of the edges that constitutes a first edge section 7*a* is locked vertically by the adjacent long edges 4*a*, 4*b* as shown in FIG. 16*b*. FIG. 16*c* shows that the locking system may be configured such that a controlled crack 23 occurs in the material of the core 5, e.g. a material comprising wood fibres. In non-limiting examples, the material may be HDF material or material from a particle board. Moreover, the crack 23 may be provided parallel to a fibre direction of the material. The crack 23 may extend to a depth of about 1 mm to about 5 mm. The crack 23 may extend along the entire edge of the first panel 1 or, alternatively, only along a part thereof, e.g. in a middle part. The advantage is that the strip 6 will be easier to bend downward during locking than upwards in the locked position. According to the embodiment in FIG. 16*c*, lower and upper support surfaces 15, 16 are formed in an upper part of the panels 1, 1'.

Figure 17A:
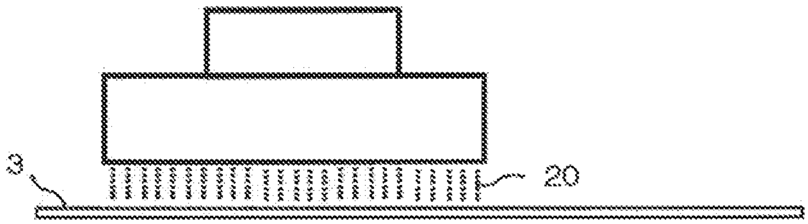
FIGS. 17*a*-17*d* illustrate a method to strengthen a protruding part according to an embodiment.
Figure 17B:
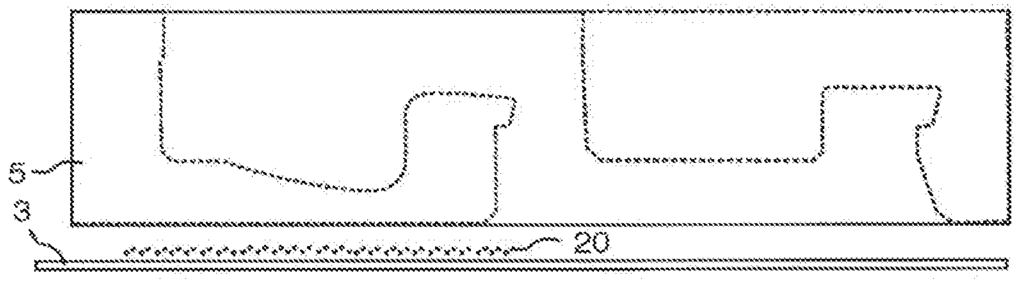
Figure 17C:
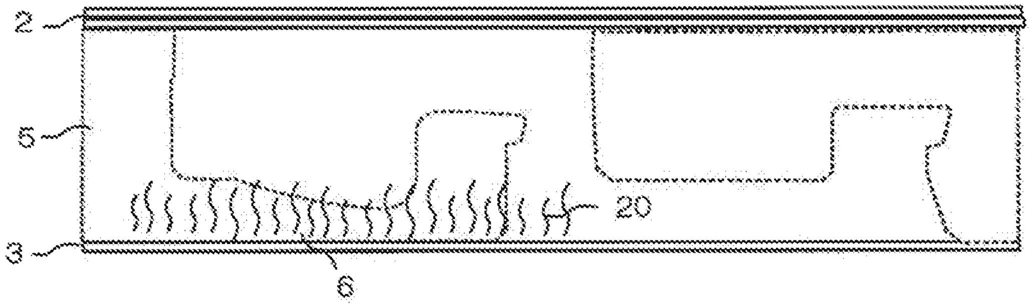
Figure 17D:
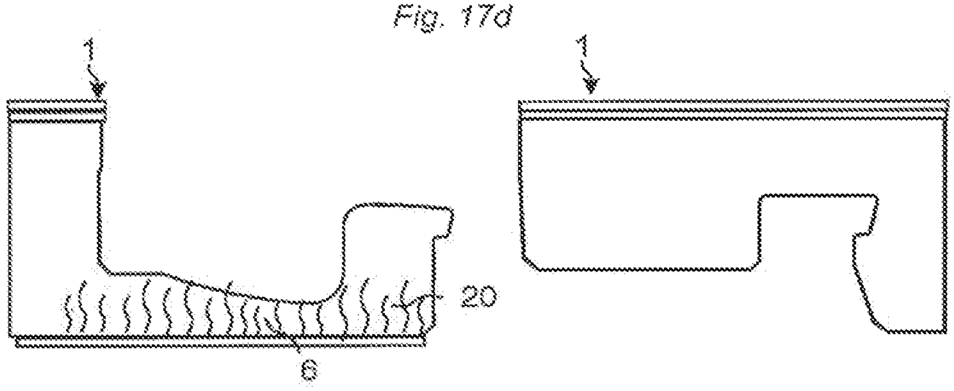
Figure 18A:
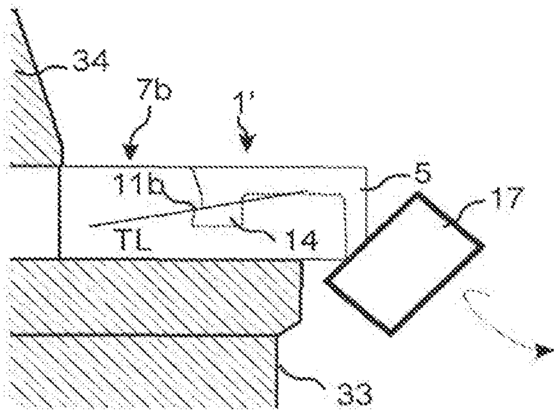
FIGS. 18*a*-18*f* illustrate an embodiment of a production method to form a locking system.
Figure 18B:
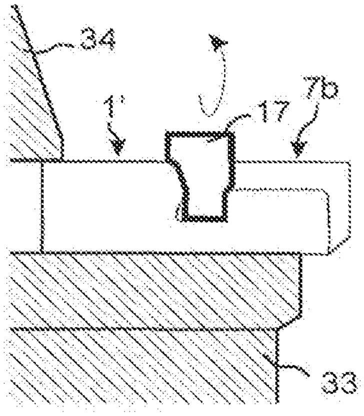
Figure 18C:
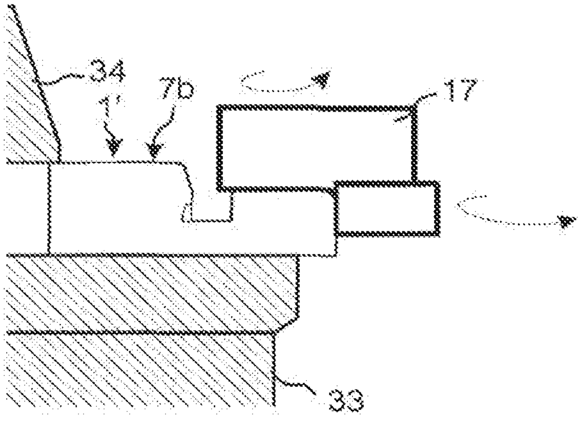
Figure 18D:
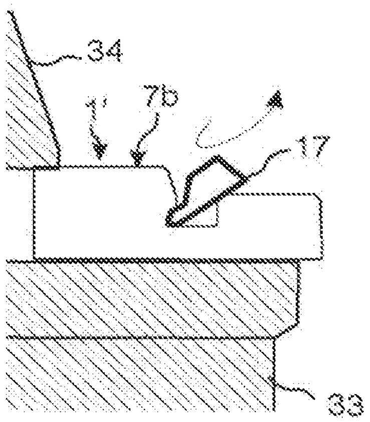
Figure 18E:
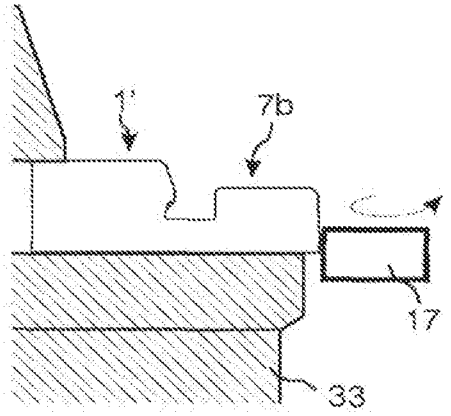
Figure 18F:
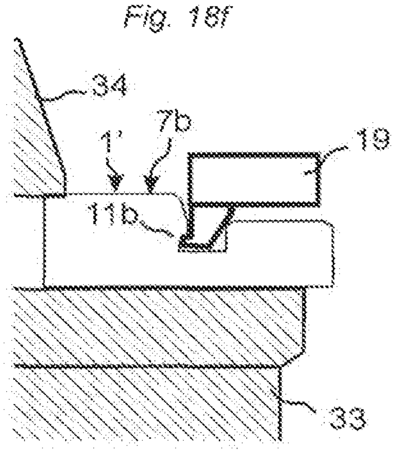

FIGS. 17*a*-17*d* show that a core material 5 may be locally modified such that it becomes more suitable to form a flexible and strong strip 6. Such a modification may be used in all embodiments of the disclosure. FIG. 17*a* shows that a resin 20, for example a thermosetting resin 20 such as, for example, melamine formaldehyde, urea formaldehyde or phenol formaldehyde resin, may be applied in liquid or dry powder form on a balancing paper 3 or directly on a core material 5. For example, the balancing paper 3 may be a melamine formaldehyde impregnated balancing paper 3. The resin may also be locally injected into the core 5 with high pressure. FIG. 17*b* shows that a core material 5, preferably a wood based panel for example an HDF board or a particle board, may be applied on impregnated paper 3 with the added resin 20 prior to lamination. FIG. 17*c* shows a floor board after lamination when the surface layers 2 and the balancing layer 3 have been laminated to the core 6. The resins 20 have penetrated into the core 5 and cured during lamination under heat and pressure. FIG. 17*d* shows an edge of a first panel 1 comprising a strip 6 formed in one piece with the core 5. The strip 6 is more flexible and comprises a higher resin content than other parts of the core 5. The increased resin content provides a material that is very suitable to form a strong flexible strip 6 that during locking may be bent.

FIGS. 18*a*-18*f* show that the entire edge of the second panel 1' comprising an essentially horizontal lower locking surface 11*b* having a tangent line TL that intersects a wall of the locking groove 14 may be formed with rotating tools 17 that are angled away from the chain 33 and the belt 34 and a carving tool 19 that preferably as a last machining step forms the locking surface 11*b*.

Figure 19A:
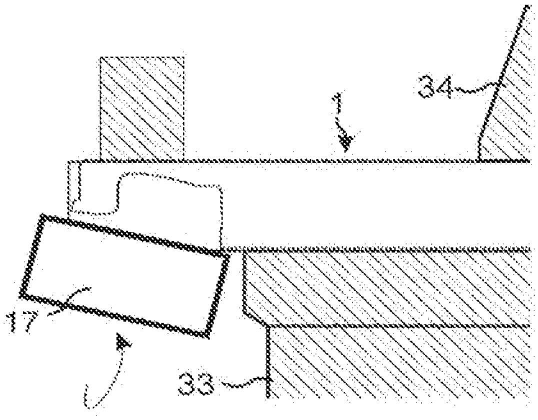
FIGS. 19*a*-19*f* illustrate another embodiment of a production method to form a locking system.
Figure 19D:
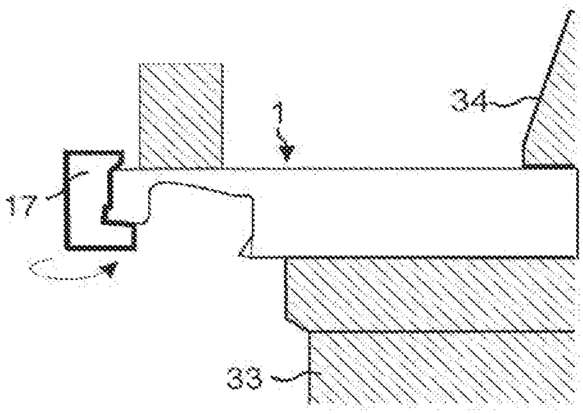
Figure 19B:
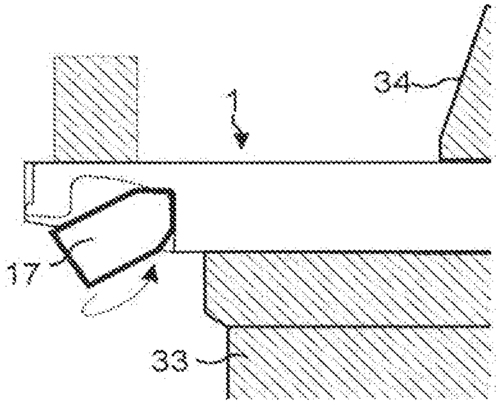
Figure 19E:
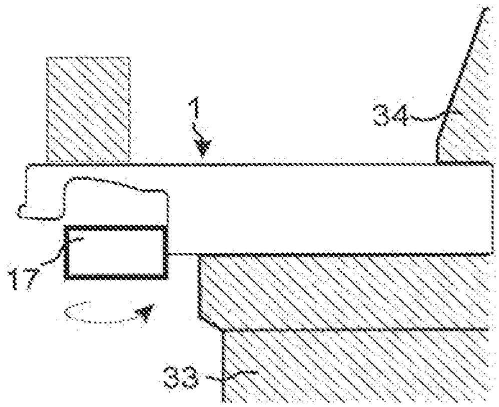
Figure 19C:
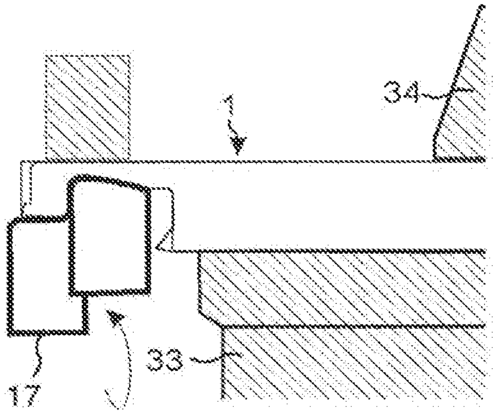
Figure 19F:
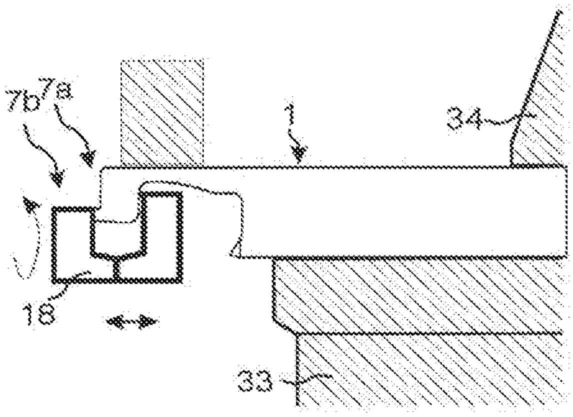

FIGS. 19*a*-19*e* show that the edge of the first panel 1 may be formed initially with large rotating tools 17 that are angled away from the chain 33 and the belt 34. The first and the second edge sections 7*a*, 7*b* are formed with a jumping tool 18 as shown in FIG. 19*f*. A rotating scraping tool may also be used.

Figure 20A:
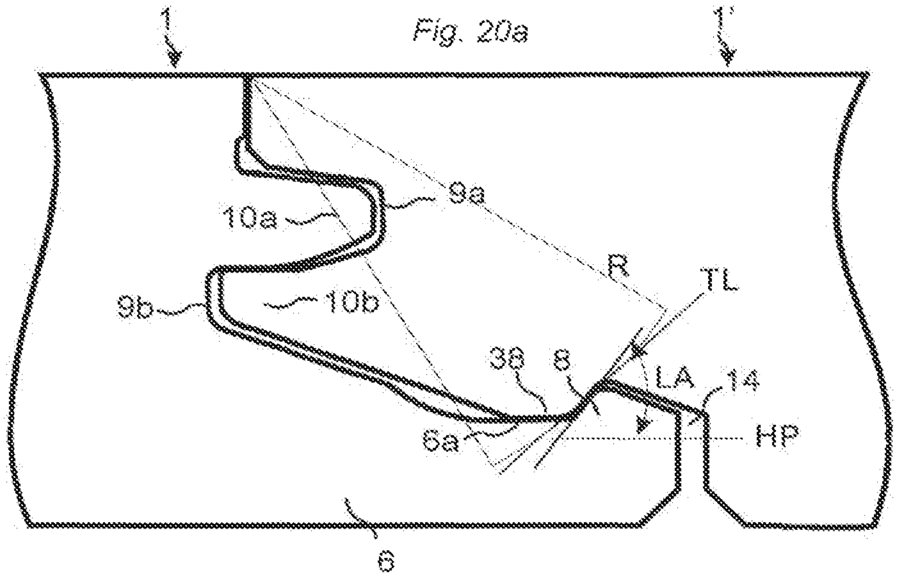
FIGS. 20*a*-20*d* illustrate locking of long and short edges according to an embodiment and forming of a locking system according to an embodiment.
Figure 20B:
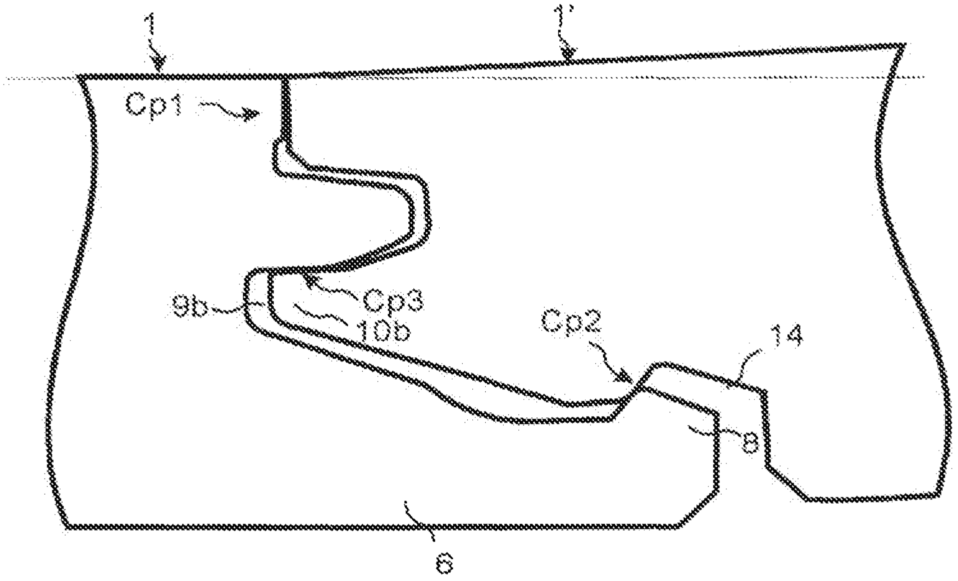
Figure 20C:
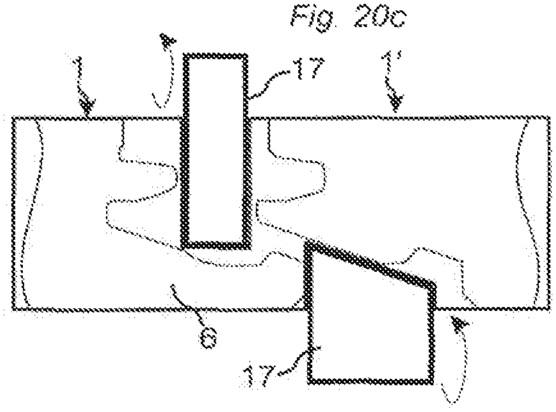
Figure 20D:
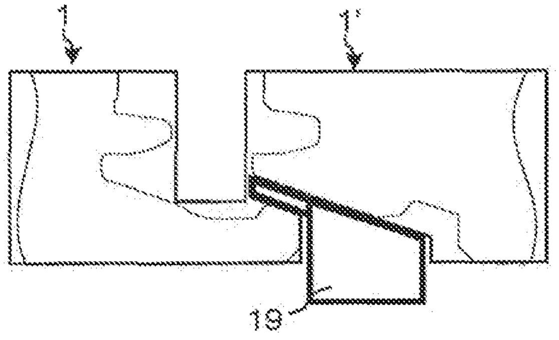

FIGS. 20*a*-20*d* show a locking system that is particularly suitable and adapted to be used on the long edges of panels 1, 1' that are locked with a fold down system according to an embodiment of the disclosure. The locking system comprises an upper 10*a* and a lower tongue 10*b* that cooperate with an upper 9*a* and a lower 9*b* tongue groove and that lock the edges vertically at least in a first direction upwards. A locking strip 6 with a locking element 8 cooperates with a locking groove 14 in an adjacent panel and locks the panel edges horizontally. A lower protrusion 38 is formed on an edge of the second panel 1' and an upper part 6*a* of the strip 6 locks the edges in a second vertical direction downwards. The locking system is configured such that a high friction is obtained between the long edges and along the edges when they are in an almost locked position and when the first and second locking surfaces 12*a*, 12*b* of the first edge section 7*a* of the short edge locking system are in contact with each other and the upper 11*a* and lower 11*b* locking surfaces of the second edge section 7*b* are spaced vertically such that no separation forces are active. This is explained more in detail in FIGS. 21*a*-21*e*. The high friction is mainly obtained with locking surfaces formed on the locking element 8 and the locking groove 14 that are more inclined with respect to a horizontal plane HP and comprises a higher locking angle LA than the so called "free angle" defined by a tangent line TL to a circle with a radius R equal to the distance from the locking surfaces of the locking element and the locking groove to the upper part of the adjacent edges. FIG. 20*b* shows that the locking system is configured such that in an up angled and locked position there are at least three contact points where the edges are pressed against each other: a first contact point Cp1 between the upper edges, a second contact point Cp1 between the locking element 8 and the locking groove 14, and a third contact point Cp3 between the lower tongue 10*b* and the lower tongue groove 9*b*. Alternatively, the contact points may be contact surfaces. It is understood that each of the contact points forms a contact line or a contact surface along the edges. FIGS. 20*c* and 20*d* show that the locking system may be formed with a low material waste in connection with the first cutting step comprising large rotating saw blades 17 and carving tools 19 when a large laminated board is separated into individual panels 1, 1'.

Figure 21A:
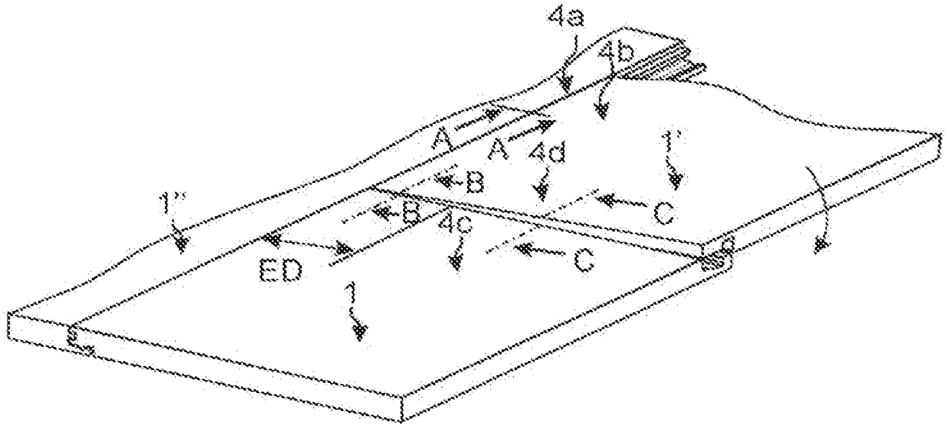
FIGS. 21*a*-21*e* illustrate a long edge locking system according to an embodiment.
Figure 21B:
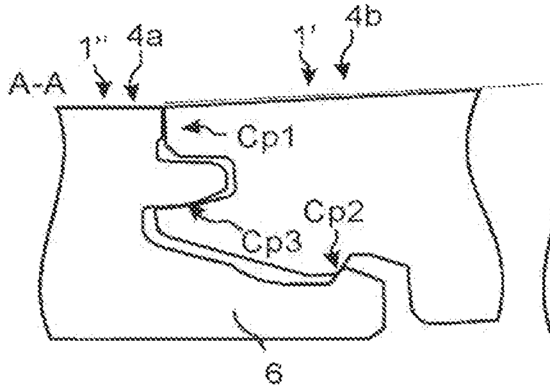
Figure 21C:
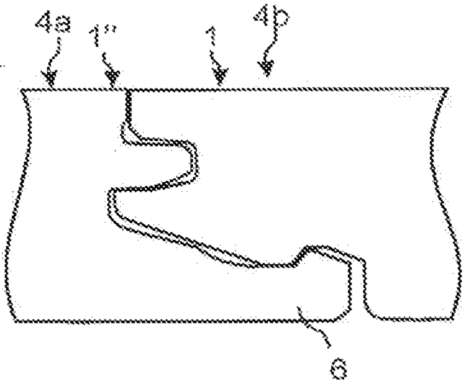
Figure 21D:
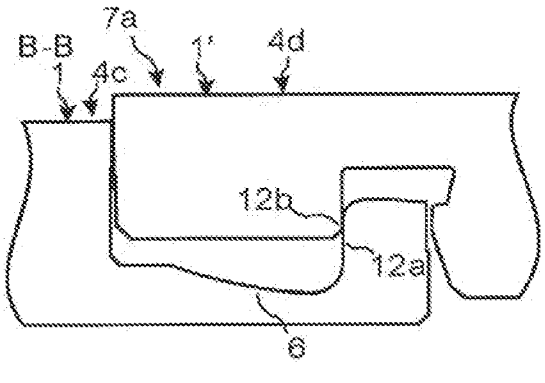
Figure 21E:
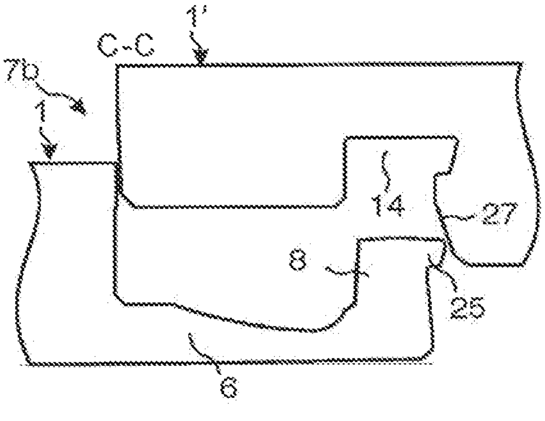
Figure 22A:
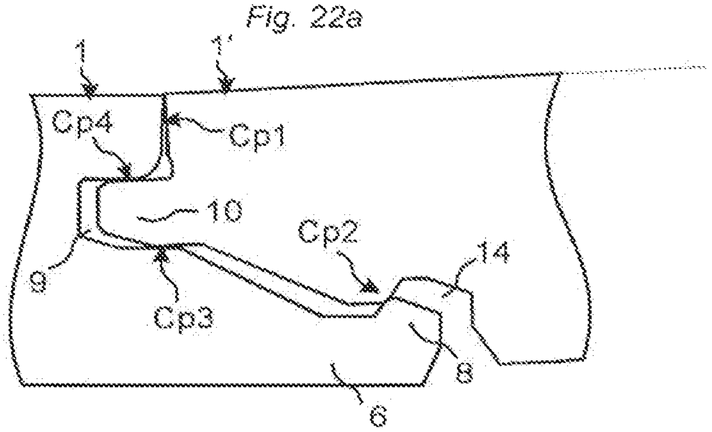
FIGS. 22*a*-22*d* illustrate a long edge locking system according to an embodiment.
Figure 22B:
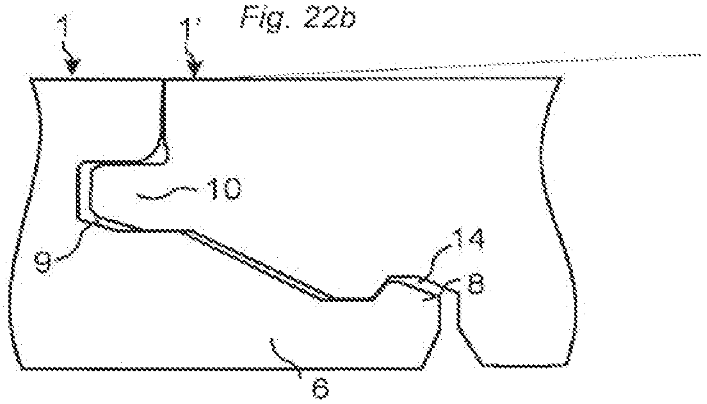
Figure 22C:
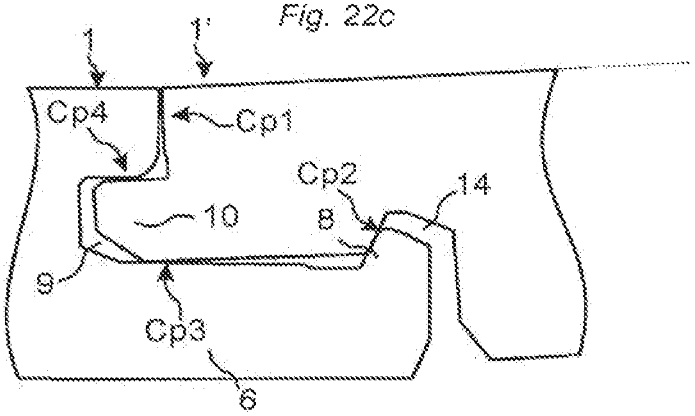
Figure 22D:
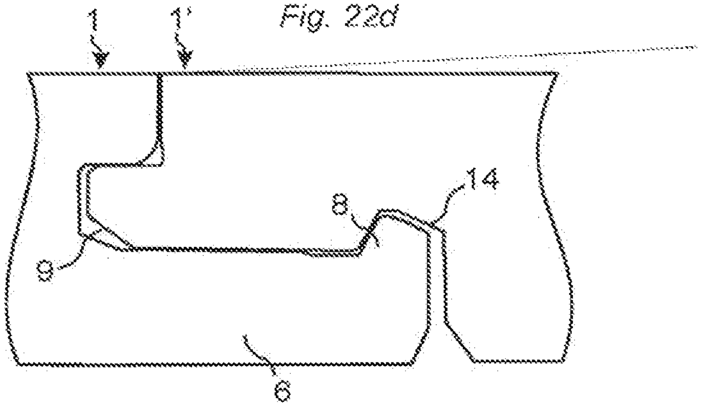

FIGS. 21*a*-21*e* show the position of the long 4*a*, 4*b* and short edges 4*c*, 4*d* during the vertical folding. FIG. 21*a* shows a second panel 1' that is angled with its long edge 4*b* against a long edge 4*a* of previously installed panel 1" in a previous row and folded with its short edge 4*d* against a short edge 4*c* of an installed first panel 1 in the same row. FIG. 21*b* shows the long edges 4*a*, 4*b* of the second 1' and the previously installed panel 1" in a partly locked and up angled position when three contact points Cp1, Cp2, Cp3 are pressed against each other in order to create a friction along the long edges in an up angled position. FIG. 21*c* shows the long edges 4*a*, 4*b* of the previously installed panel 1" and the first panel 1 in a completely locked position. FIG. 21*d* shows that the first and second locking surfaces 12*a*, 12*b* are in contact with each other in the first edge section 7*a* and FIG. 21*e* shows that at the same time the locking element 8 and its upper protruding part in the second edge section 7*b* is spaced from the locking groove 14 and its sliding surface 27 such that no separation forces are active. This means that the separation forces created by the second edge section 7*b* and the bending of the strip 6 are counteracted by the first and second locking surfaces 12*a*, 12*b* of the first edge section 7*a* and the friction along the long edges 4*a*, 4*b* created by a pretension and a contact preferably at three contact points Cp1, Cp2, Cp3 along the long edge locking system. As an example, it may be mentioned the locking system may be formed with a first edge section 7*a* that extends with an edge distance ED of about 2-8 cm, for example 5 cm, from a long edge 4*a* as shown in FIG. 21*a* and with a locking element comprising a vertical extension of about 0.5-6 mm, for example 2, 3 or 4 mm. The second edge section 7*b* may start at a horizontal distance from a long edge of about 15-35%, e.g. 20%, of the length of the edge. The long edges may be folded to an angle of about 1-7 degrees, for example 3 degrees, before the locking element 8 is in contact with the locking groove 14 and such a low angle may be used to form a long edge locking system that creates a very high friction along the long edges in a partly locked position where the upper part of the locking element 8 of one long edge overlaps vertically a lower part of the locking groove 14 of an adjacent long edge. Preferably, the long edge locking system is configured such that a locking angle of 3-5 degrees may be reached before the locking element and the locking groove of the second section 7*b* are in contact with each other.

FIGS. 22*a*-22*d* show embodiments of locking systems that may be formed with pretension in a partly locked position as described above. The locking systems according to FIGS. 22*a*-22*d* are particularly suitable and adapted to be used on the long edges of panels 1, 1'. The shown locking systems in FIGS. 22*a*-22*d* illustrate that the locking systems in FIGS. 21*b* and 21*c* may be formed with a fourth contact point Cp4 located at an upper part of a tongue 10 and a tongue groove 9.

Figure 23A:
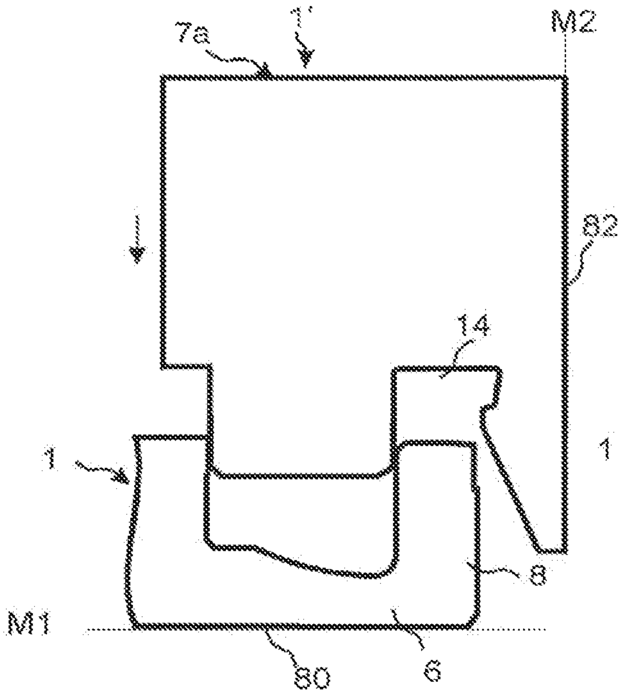
FIGS. 23*a*-23*d* illustrate locking of furniture components according to an embodiment.
Figure 23B:
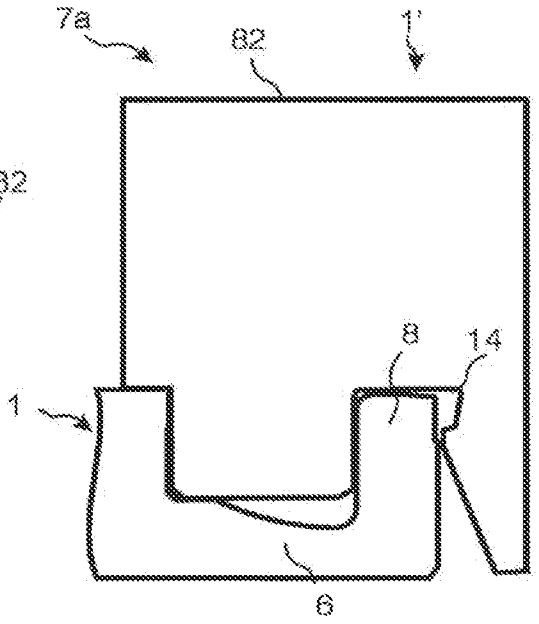
Figure 23C:
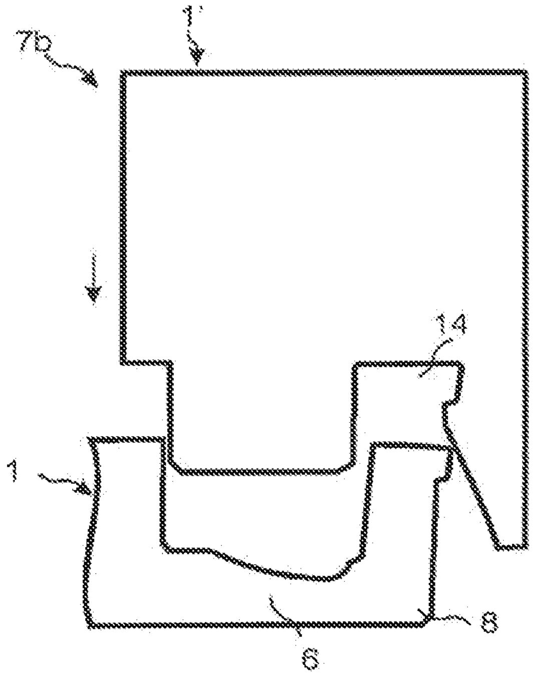
Figure 23D:
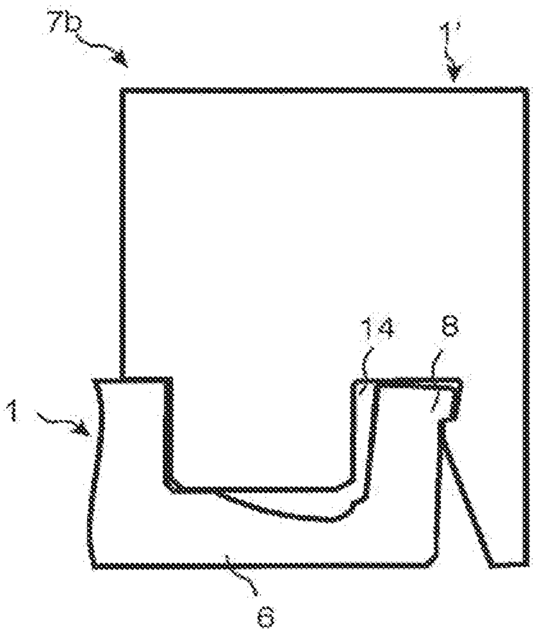

FIG. 23*a*-23*d* show that all embodiments of the disclosure may be used to lock for example furniture components where a second panel 1' comprising a locking groove 14 is locked vertically and perpendicularly to a first panel 1 comprising a strip 6 and with a locking element 8. The strip 6 may initially bend upwards or downwards during the vertical displacement of the second panel 1' against the first panel 1 and the locking element 8 may comprise locking means that lock horizontally parallel to a main plane M1 of the first panel and vertically parallel to the a plane M2 of the second panel 1'. The main plane M1 of the first panel 1 may be defined as a horizontal plane that is essentially parallel with a lower side 80 of the first panel 1. The main plane M2 of the second panel 1' may be defined as a vertical plane that is essentially parallel with an outer side 82 of the second panel 1'. The panels 1, 1' may have a first 7*a* and a second 7*b* edge section as described above. The first edge section 7*a* may be formed such that the locking element 8 is in contact with the locking groove 14 when the locking element 8 and the locking groove 14 of the second section 7*b* are spaced from each other as shown in FIGS. 23*a* and 23*c*.

Figure 24A:
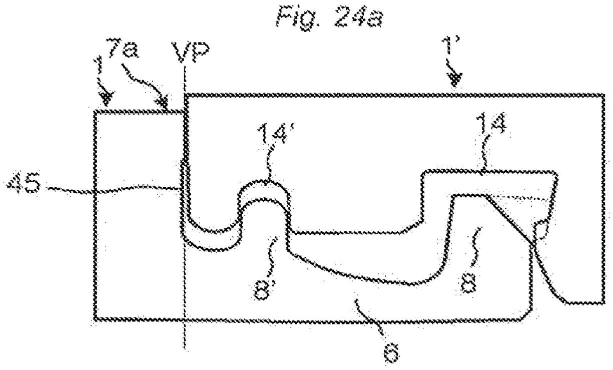
FIGS. 24*a*-24*f* illustrate a locking system formed according to a third principle.
Figure 24B:
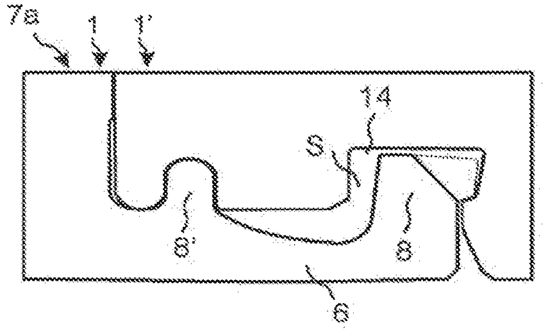
Figure 24C:
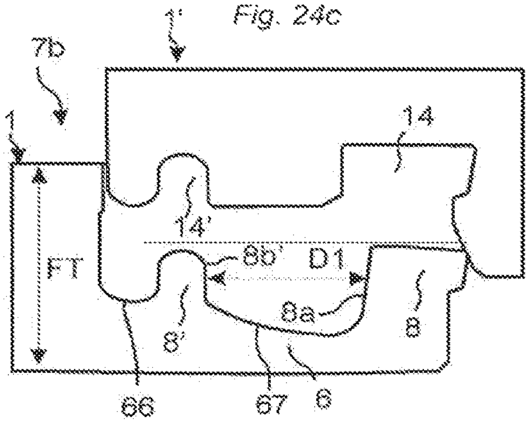
Figure 24D:
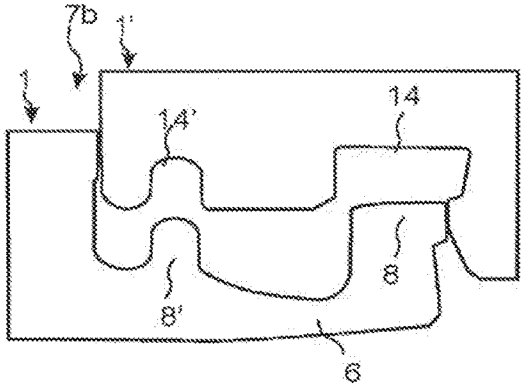
Figure 24E:
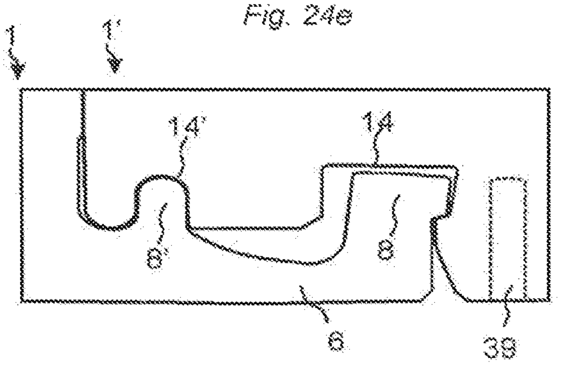

FIGS. 24*a*-24*e* show that the locking system of a first 1 and a second 1' panel may be formed with a first and a second locking element 8, 8' and a first and a second locking groove 14, 14'. According to the present embodiment, the first 8 and second 8' locking elements and the first 14 and second 14' locking grooves extend along the entire edge of the first panel 1 and second panel 1', respectively. Alternatively, however, the second locking element 8' and the second locking groove 14' may extend along a part of the edge of the first panel 1 and second panel 1', respectively, wherein an extension of the second locking element 8' is smaller than or substantially equal to an extension of the second locking groove 14'. The second locking element 8' and the second locking groove 14' may be used to prevent edge separation and to lock the panels horizontally and may replace the first and second locking surfaces 12*a*, 12*b*. Preferably, the lower and inner part(s) of the second locking groove 14' and the upper and outer part(s) of the second locking element 8' comprise guiding surfaces, for example rounded parts as shown in FIG. 24*a*, that engage with each other and press the upper edges towards each other such that separation forces are counteracted. As an alternative, the one or both overlapping locking surfaces 11*a*, 11*b* may be removed or the entire first locking element 8 may be removed at a corner section of first edge, e.g. between 5% and 20% of a total length of the first edge.

A vertical extension of the second locking element 8' and/or the second locking groove 14' may vary along the first and/or second edge, respectively. The vertical extension may vary from a maximal extension to a minimal extension. The variation may be periodic. At the maximal extension, a top surface of the second locking element 8' may engage with an upper groove wall of the second locking groove 14'. At the minimal extension, there may be a cavity between the top surface of the second locking element 8' and the upper groove wall of the second locking groove 14'.

A vertical flex groove 39 may be formed adjacent to and preferably inwardly of the locking groove 14 in all embodiments of the disclosure.

This embodiment offers the advantages that continuous grooves and locking elements without any edge sections may be used and this will simplify the forming of the locking system. A locking system with high vertical and horizontal locking strength may be formed. The space S between the first locking element 8 and the first locking groove 14 allows a turning and/or displacement of the locking element 8 as described in the previous embodiments. The horizontal distance D1 between the inner surfaces 8*a* of the first locking element 8 and the outer surface 8*b*' of the second 8' locking element is preferably at least about 30% the floor thickness FT in order to provide sufficient flexibility and locking strength. The horizontal distance D1 may be as small as about 20% of the floor thickness. More generally, D1 may be between 20% and 80% of FT. An upper part of the first locking element 8 is preferably located closer to the panel surface than an upper part of the second locking element 8'. Alternatively, however, the upper part of the first locking element 8 may be located closer to the panel surface than the upper part of the second locking element 8'. This may reduce separation forces since the second locking element 8' will become active before the first element 8 is in contact with the locking groove 14.

Figure 24F:
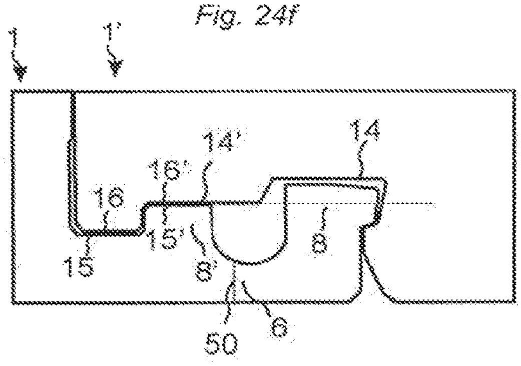

FIG. 24*f* shows a more compact version wherein the first 14 and the second 14' locking grooves are connected to each other. The second locking groove 14' forms an outer part of the first locking groove 14. The locking system may have one or a plurality of pairs lower and upper support surfaces that are configured to cooperate in a locked state of the panels. For example, support surfaces 15, 16 may be provided between the inner and lower part of the first panel 1 and the outer and lower part of the second panel 1', and/or support surfaces 15', 16' may be provided between the upper part of the second locking element 8' and the upper part of the second locking groove 14'. A part of the locking strip 6 and the second locking element 8' protruding beyond an outer strip portion 50, preferably outside the second locking element 8', may be removed at a corner section of the first edge in order to eliminate separation forces during the initial stage of the locking when the second panel 1' is angled down towards the first panel 1.

Figure 25A:
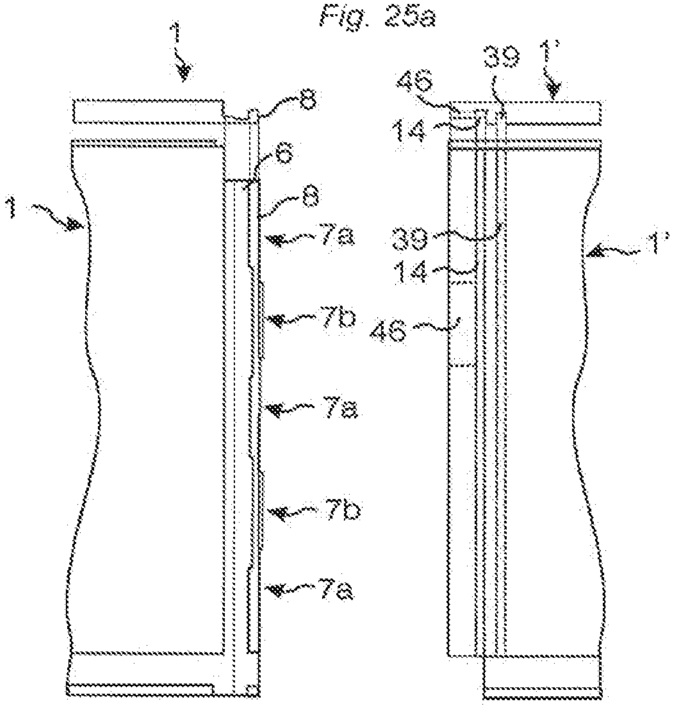
FIGS. 25*a*-25*d* illustrate various embodiments of flex grooves provided in the second floor panel.

FIGS. 25*a*-25*e* illustrate various embodiments of one or a plurality of flex grooves 39 For simplicity, the second locking element 8' and the second locking groove 14' are not shown but may be formed in the edge of the first 1 and second panel 1' in all embodiments of FIGS. 25*a*-25*d* and 26*a*-26*d*. FIG. 25*a* shows a first panel 1 with a plurality of first and second edge sections 7*a*, 7*b* and a flex groove 39 that extends along the entire edge of the second panel 1'. FIG. 25*a* also shows that at least a part of the projection 46 may be removed and this may in some embodiments simplify the forming of second edge section 7*b*.

Figure 25B:
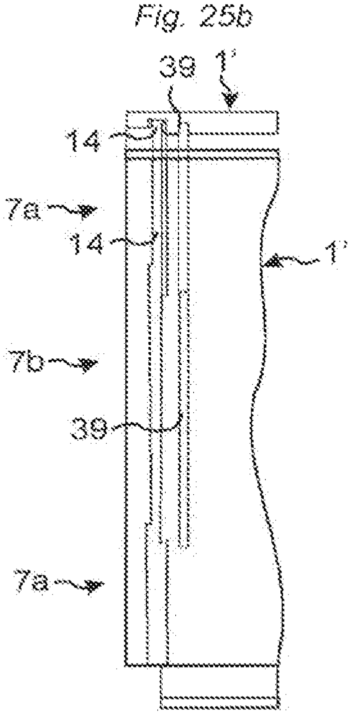
Figure 25C:
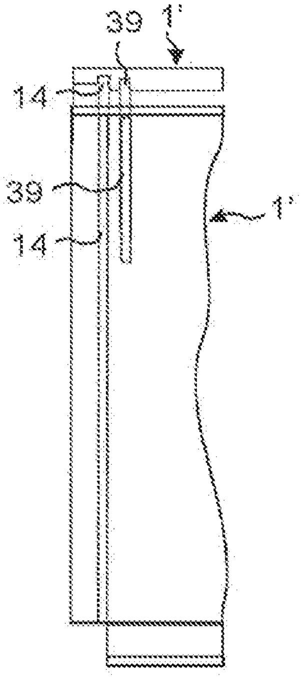
Figure 25D:
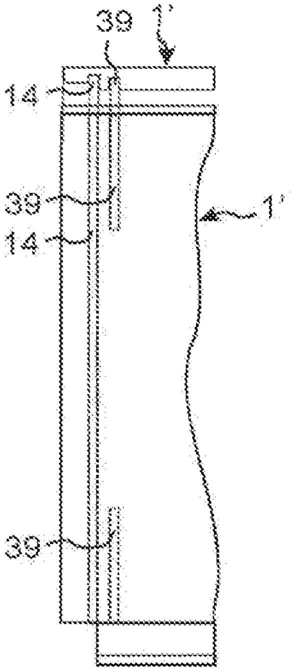

The flex groove 39 may also extend along a part of the edge of the second panel 1'. In the embodiment in FIG. 25*b* the flex groove 39 has two walls in a direction along the edge and is located in a center portion of the edge in the length direction thereof. Preferably the flex groove is formed in a center portion that corresponds to the location of the second edge portion(s) 7*b* where the bending of the strip 6 and vertical locking takes place. FIG. 25*b* shows that the first 7*a* and the second 7*b* edge portions may be formed by removal of material in the locking groove 14 only. An advantage is that only one jumping tool or rotating carving tool is needed at one short edge in order to form the first and second section. In the embodiment in FIG. 25*c* the flex groove 39 is at least partly open towards one edge side and only has one wall in a direction along the edge so that it is located in a peripheral portion of the edge in the length direction thereof.

Generally, it is noted that each wall of the flex groove may be vertical or, alternatively, have a transition region so that a depth of the flex groove increases along the edge from a minimal depth to a maximal depth.

Moreover, there may be two or more flex grooves 39 arranged along the edge. In the embodiment in FIG. 25*d* there are two flex grooves 39 which are at least partly open towards a respective side edge, each having one wall in a direction along the edge, and located in opposite peripheral portions of the edge in the length direction thereof.

Preferably, the flex groove 39 does not extend entirely through the second panel 1'. By way of example, the flex groove 39 may have a vertical extension between 30% and 60% of a maximal thickness of the panel, e.g. 40% or 50%.

Figure 26A:
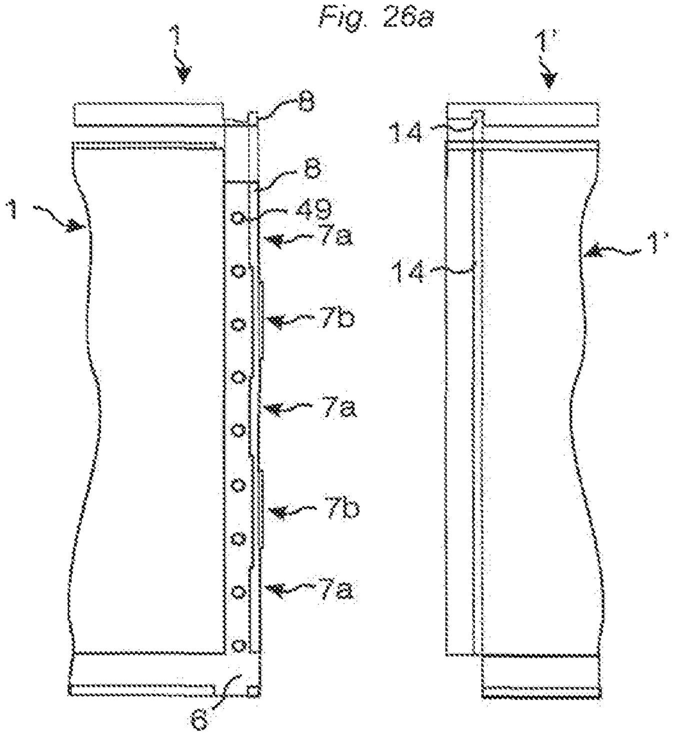
FIGS. 26*a*-26*b* illustrate various embodiments of slits provided in the first floor panel.
Figure 26B:
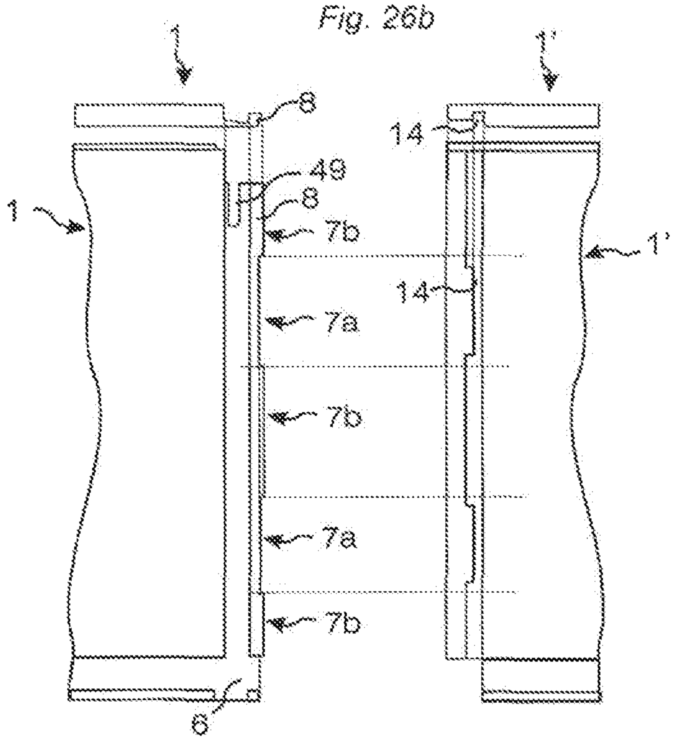

As shown in the top views of the first panel 1 in FIGS. 26*a*-26*b*, one or a plurality of slits 49 may be formed in the strip 6 along the edge of the first panel 1 in order to increase the flexibility of the strip while still maintaining sufficient locking strength. A cross-sectional shape of the slit 49 may be rectangular, square, circular, oval, triangular, polygon shaped, etc. Preferably, the shapes of the slits 49 are the same along the edge, but varying shapes are also conceivable. The slits may be formed in a cost efficient way with a rotating punching tool. The slits 49 may be provided in all embodiments described in the disclosure. Such slits and the previously described flex grooves 39 may be combined in all embodiments of the disclosure. The first panel 1 may have a slit 49 and the second panel may have a flex groove 39. The slits 49 are preferably provided inwardly of the locking element 8. Preferably, the slits 49 extend entirely through the strip 6 to the rear side 60. Alternatively, however, the slits 49 may not extend through the strip. The slits may have a vertical extension between 30% and 60% of a minimal thickness of the strip. The slits may be provided in the upper strip surface 6*a*. In the embodiment in FIGS. 24*a*-24*d* the slits 49 may be provided in a strip surface 66 connecting the side wall 45 and the second locking element 8' or in a strip surface 67 connecting the first locking element 8 and the second locking element 8'. Alternatively, or additionally, the slits may be provided in the rear side 60 of the first panel 1.

In the embodiment in FIG. 26*b*, the slit 49 is open towards one edge side and has only one wall in a direction along the edge. Such slit offers the advantage that the second section 7*b* may be used as a start section. The slit 49 will increase the flexibility of the strip and separation forces will be lower during the initial stage of the locking until the first edge section 7*a* becomes active. A similar slit 49 may be formed in the opposite side edge.

Generally, it is noted that each wall of the slits may be vertical, i.e. parallel with a direction perpendicular to the horizontal plane. For example, in the embodiment in FIG. 26*b* wherein the slits 49 have a circular shape, the inner surface of the slit 49 may be cylindrical. Alternatively, however, the wall may have a transition region so that a depth of the slit increases from a minimal depth to a maximal depth. For example, in the embodiment in FIG. 26*b*, the inner surface of the slit 49 may be frustoconical.

Figure 27A:
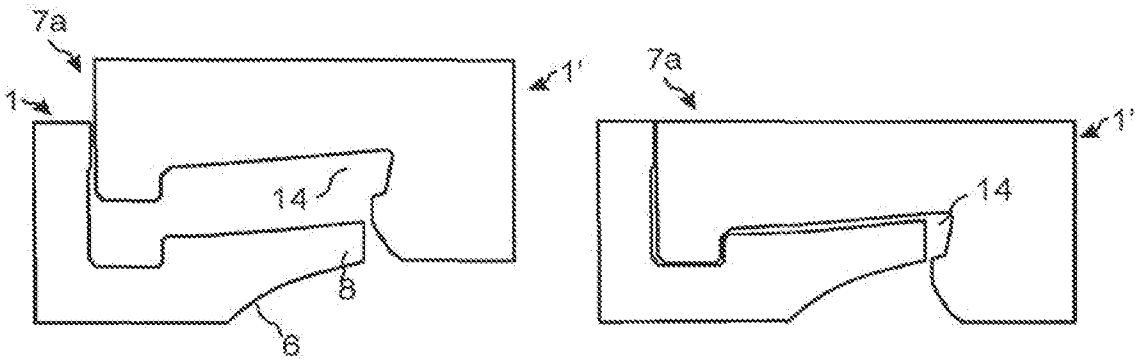
FIGS. 27*a*-27*c* illustrate an embodiment with a flexible and a bendable locking element.
Figure 27B:
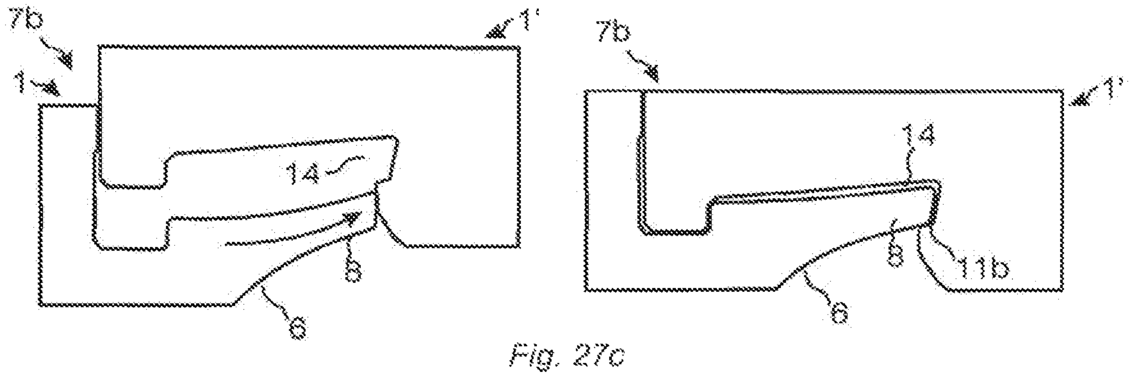
Figure 27C:
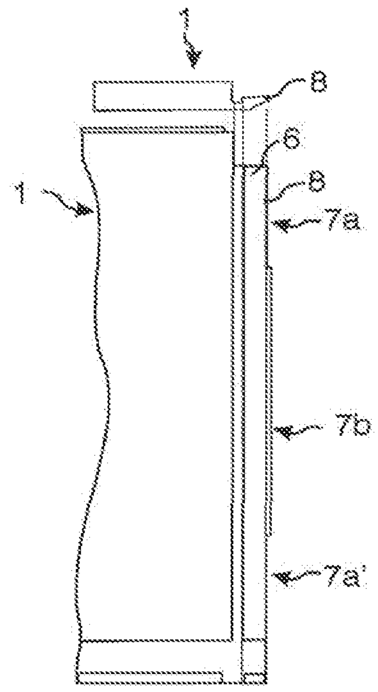

FIGS. 27*a*-27*c* show an embodiment comprising a flexible locking element 8 that may be bended and/or compressed inwardly during locking. The flexible locking element 8 is provided at an outer part of the strip 6 and is configured to engage with the locking groove 14. An outer, lower part of the locking element 8 engages with a locking surface 11*b* of the second panel 1' in the second edge section 7*b*. Moreover, an outer part of the locking element 8 is free with respect to the locking surface 11*b* in the first edge section 7*a*. Alternative embodiments of the locking surfaces have been described above in relation to other embodiments of the disclosure wherein reference is made thereto. In particular, the outer part of the locking element 8 may be constant along the first edge and the locking surface 11*b* may be shortened in the first edge sections 7*a*, cf. the embodiment in FIG. 7*a*-7*b*. Optionally, the flexible locking element may also be bended upwards and/or downwards during locking.

Such embodiments may be used in floor panels with flexible core materials, for example a core comprising thermosetting plastic material, but may also be used in other applications. As already noted, the locking system may be formed according to any previous embodiment of the disclosure. A horizontal extension of the locking element 8 may be larger than a horizontal extension of the upper surface of the strip 6*a*. Outer parts of the locking element 8 may have a smaller vertical extension than inner parts of the locking element for increasing the flexibility of the locking element. The major difference as compared to the embodiments disclosed above is that no space S is needed since the locking element 8 may be bended upwards and/or compressed inwardly as shown in FIG. 27*b*. The first 7*a*, 7*a'* and the second edge sections 7*b* may be formed with a simple removal of material located at the outer part of the locking element 8, as shown in FIG. 27*c*, or at the inner part of the locking groove 14 (not shown).

The first edge section 7*a'* in FIG. 27*c* is optional and may be replaced by a second edge section 7*b*. In other words, the second edge section 7*b* may extend all the way to one side edge of the first panel 1.

The invention claimed is:

1. A set of floor panels provided with a mechanical locking system and comprising a first panel and a second panel, the second panel being configured to be locked to the first panel by angling, wherein the mechanical locking system comprises:

a strip extending horizontally from a lower part of a first edge of the first panel and a downwardly open locking groove formed in a second edge of the second panel, the strip comprising an upwardly protruding locking element configured to cooperate with the locking groove for locking the first edge and the second edge in a horizontal direction parallel to a main plane of the floor panels, an upper tongue and a lower tongue configured to cooperate with an upper tongue groove and a lower tongue groove, respectively, for locking the first edge and the second edge vertically at least in a first direction upwards, and a lower protrusion provided in the second edge of the second panel configured to contact a contacting surface of an upper part of the strip for locking the first edge and the second edge in a second vertical direction downwards, wherein the contacting surface is inclined upward toward the locking element or is substantially horizontal, wherein the locking element includes a locking surface extending from and angled with respect to the contacting surface of the upper part of the strip, the locking surface being located between the contacting surface of the upper part of the strip and an upper part of the locking element, and wherein the upper tongue is spaced from an upper wall of the upper tongue groove in a locked position of the first edge and second edge.

2. The set of floor panels according to claim 1, wherein the lower tongue extends horizontally beyond an upper portion of the second edge.

3. The set of floor panels according to claim 1, wherein the upper tongue is configured to be spaced from an upper wall of the upper tongue groove during locking when the second panel is angled with respect to the first panel, when the upper tongue is provided in the upper tongue groove, and when an uppermost edge of the first edge and an uppermost edge of the second edge cooperate with each other.

4. The set of floor panels according to claim 1, wherein in a locked position of the first edge and second edge there is a space extending below the lower tongue, from the lower tongue to the lower protrusion.

5. The set of floor panels according to claim 1, wherein the first and second panels each have a long edge and a short edge shorter than the long edge, and wherein the first and second edges are the long edges of the first and second panels, respectively.

6. The set of floor panels according to claim 5, wherein the long edges are configured to be folded to an angle of about 1-7 degrees before the locking element is in contact with the locking groove.

7. The set of floor panels according to claim 5, further comprising a short-edge locking system provided on the short edges of the first and second panels, the short edges of the first and second panels including a first short edge of the first panel and a second short edge of the second panel, wherein the short-edge locking system comprises a short-edge strip extending horizontally from a lower part of the first short edge and a downwardly open short-edge locking groove formed in the second short edge, the short-edge strip comprising an upwardly protruding locking element configured to cooperate with the short-edge locking groove for locking the first short edge and the second short edge in a horizontal direction parallel to a main plane of the floor panels, wherein at least one of a cross section of the locking element and a cross section of the locking groove varies along the first and second short edges.

8. The set of floor panels according to claim 1, wherein the contacting surface is inclined upward toward the locking element.

9. The set of floor panels according to claim 1, wherein the locking surface of the locking element and a locking surface of the locking groove are inclined with respect to a horizontal plane.

10. The set of floor panels according to claim 9, wherein said locking surfaces of the locking element and the locking groove comprise a higher locking angle than a free angle defined by a tangent line to a circle with a radius equal to a distance from the locking surfaces of the locking element and the locking groove to an upper part of the adjacent edges.

11. The set of floor panels according to claim 1, wherein upper edges of the first and second edges further provide locking of the first edge and the second edge in the horizontal direction.

12. A set of floor panels provided with a mechanical locking system and comprising a first panel and a second panel, the second panel being configured to be locked to the first panel by angling, wherein the mechanical locking system comprises:

a strip extending horizontally from a lower part of a first edge of the first panel and a downwardly open locking groove formed in a second edge of the second panel, the strip comprising an upwardly protruding locking element configured to cooperate with the locking groove for locking the first edge and the second edge in a horizontal direction parallel to a main plane of the floor panels, an upper tongue and a lower tongue configured to cooperate with an upper tongue groove and a lower tongue groove, respectively, for locking the first edge and the second edge vertically at least in a first direction upwards, and a lower protrusion provided in the second edge of the second panel configured to cooperate with an upper part of the strip for locking the first edge and the second edge in a second vertical direction downwards, wherein the upper tongue is spaced from an upper wall of the upper tongue groove in a locked position of the first edge and second edge, and wherein the mechanical locking system is configured such that both in an up-angled position and in a locked position there are at least three contact points such that the first edge and the second edge are pressed against each other, a first contact point being provided between upper edges of the first and second edges, a second contact point being provided between the locking element and the locking groove, and a third contact point being provided between the lower tongue and the lower tongue groove.

13. The set of floor panels according to claim 12, wherein said contact points are contact surfaces.

14. The set of floor panels according to claim 12, wherein the three contact points are configured to be pressed against each other in a partly locked position and in the up-angled position in order to create a friction along the first edge and the second edge in the up-angled position.

15. A set of floor panels provided with a mechanical locking system and comprising a first panel and a second panel, the second panel being configured to be locked to the first panel by angling, wherein the mechanical locking system comprises:

a strip extending horizontally from a lower part of a first edge of the first panel and a downwardly open locking groove formed in a second edge of the second panel, the strip comprising an upwardly protruding locking element configured to cooperate with the locking groove for locking the first edge and the second edge in a horizontal direction parallel to a main plane of the floor panels, an upper tongue and a lower tongue configured to cooperate with an upper tongue groove and a lower tongue groove, respectively, for locking the first edge and the second edge vertically at least in a first direction upwards, and a lower protrusion provided in the second edge of the second panel configured to cooperate with an upper part of the strip for locking the first edge and the second edge in a second vertical direction downwards, wherein the upper tongue is spaced from an upper wall of the upper tongue groove in a locked position of the first edge and second edge, the first and second panels each have a long edge and a short edge shorter than the long edge, and wherein the first and second edges are the long edges of the first and second panels, respectively, wherein the mechanical locking system further comprises a short-edge locking system provided on the short edges of the first and second panels, the short edges of the first and second panels including a first short edge of the first panel and a second short edge of the second panel, wherein the short-edge locking system comprises a short-edge strip extending horizontally from a lower part of the first short edge and a downwardly open short-edge locking groove formed in the second short edge, the short-edge strip comprising an upwardly protruding locking element configured to cooperate with the short-edge locking groove for locking the first short edge and the second short edge in a horizontal direction parallel to a main plane of the floor panels, wherein at least one of a cross section of the locking element and a cross section of the locking groove varies along the first and second short edges, and wherein said mechanical locking system is configured such that a friction is obtained between and along the long edges when the long edges are in an almost locked position, when first and second locking surfaces of a first edge section of the short-edge locking system are in contact with each other, and when upper and lower locking surfaces of a second edge section of the short-edge locking system are spaced vertically, such that no separation forces are active.

* * * * *